(12) United States Patent
Prophete et al.

(10) Patent No.: US 10,963,477 B2
(45) Date of Patent: Mar. 30, 2021

(54) DECLARATIVE SPECIFICATION OF VISUALIZATION QUERIES

(71) Applicant: salesforce.com, inc., San Francisco, CA (US)

(72) Inventors: Didier Prophete, San Francisco, CA (US); Fred Im, San Carlos, CA (US); Vijayasarathy Chakravarthy, Mountain View, CA (US)

(73) Assignee: salesforce.com, inc., San Francisco, CA (US)

( * ) Notice: Subject to any disclaimer, the term of this patent is extended or adjusted under 35 U.S.C. 154(b) by 374 days.

(21) Appl. No.: 16/019,877

(22) Filed: Jun. 27, 2018

(65) Prior Publication Data

US 2018/0365303 A1 Dec. 20, 2018

Related U.S. Application Data

(63) Continuation of application No. 14/512,263, filed on Oct. 10, 2014, now Pat. No. 10,049,141.

(51) Int. Cl.
*G06F 16/248* (2019.01)
*G06F 16/904* (2019.01)
*G06F 16/2455* (2019.01)
*G06F 40/205* (2020.01)

(52) U.S. Cl.
CPC ........ *G06F 16/248* (2019.01); *G06F 16/2455* (2019.01); *G06F 16/904* (2019.01); *G06F 40/205* (2020.01)

(58) Field of Classification Search
CPC .... G06F 3/04842; G06F 16/248; G06F 16/26; G06F 16/904; G06F 3/04845; G06F 3/04847; G06F 16/287; G06K 9/46
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,999,192 A | 12/1999 | Selfridge et al. |
| 6,092,083 A | 7/2000 | Brodersen et al. |

(Continued)

OTHER PUBLICATIONS

"Response to Office Action", filed in connection with U.S. Appl. No. 14/598,157, dated May 1, 2017, 25 pages (SALE 1097-1).

(Continued)

*Primary Examiner* — Yuk Ting Choi
(74) *Attorney, Agent, or Firm* — Holland & Hart LLP

(57) ABSTRACT

The technology disclosed relates to a platform for ultra-fast, ad-hoc data exploration and faceted navigation on integrated, heterogeneous data sets. The disclosed method of declarative specification of visualization queries, display formats and bindings represents queries, widgets and bindings combined on a dashboard in real time, with flexible display options for analyzing data and conveying analysis results.

20 Claims, 45 Drawing Sheets

(56) References Cited

U.S. PATENT DOCUMENTS

| | | |
|---|---|---|
| 6,105,051 A | 8/2000 | Borkenhagen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,212,544 B1 | 4/2001 | Borkenhagen et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Lcernans |
| 6,405,220 B1 | 6/2002 | Brodersen et al. |
| 6,434,550 B1 | 8/2002 | Warner et al. |
| 6,480,878 B1 | 11/2002 | Rehg et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,128 B2 | 8/2003 | Diec |
| 6,604,117 B2 | 8/2003 | Lim et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,697,935 B1 | 2/2004 | Borkenhagen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,754,681 B2 | 6/2004 | Brodersen et al. |
| 6,757,689 B2 | 6/2004 | Battas et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,995,768 B2 | 2/2006 | Jou et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,228,352 B1 | 6/2007 | Yaguchi et al. |
| 7,278,115 B1 | 10/2007 | Conway et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,356,840 B1 | 4/2008 | Bedell et al. |
| 7,380,213 B2 | 5/2008 | Pokorny et al. |
| 7,401,094 B1 | 7/2008 | Kesler |
| 7,412,455 B2 | 8/2008 | Dillon |
| 7,508,789 B2 | 3/2009 | Chane |
| 7,571,191 B2 | 8/2009 | Dill et al. |
| 7,590,641 B1 | 9/2009 | Olson |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,711,750 B1 | 5/2010 | Dutta et al. |
| 7,756,335 B2 | 7/2010 | Sternby |
| 7,779,475 B2 | 8/2010 | Jakobson et al. |
| 7,818,728 B1 | 10/2010 | Olson |
| 7,836,178 B1 | 11/2010 | Bedeli et al. |
| 7,840,518 B1 | 11/2010 | Rubin |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,041,670 B2 | 10/2011 | Bakalash et al. |
| 8,045,800 B2 | 10/2011 | Tang et al. |
| 8,073,850 B1 | 12/2011 | Hubbard et al. |
| 8,082,301 B2 | 12/2011 | Ahlgren et al. |
| 8,086,585 B1 | 12/2011 | Brashers et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,271,992 B2 | 9/2012 | Chatley et al. |
| 8,275,836 B2 | 9/2012 | Beaven et al. |
| 8,285,709 B2 | 10/2012 | Candea et al. |
| 8,302,020 B2 | 10/2012 | Louch et al. |
| 8,321,865 B2 | 11/2012 | Amini et al. |
| 8,326,848 B2 | 12/2012 | Dettinger et al. |
| 8,375,041 B2 | 2/2013 | Webster |
| 8,510,664 B2 | 3/2013 | Rueben et al. |
| 8,448,170 B2 | 5/2013 | Wipfel et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,521,758 B2 | 8/2013 | Nachnani et al. |
| 8,549,602 B2 | 10/2013 | Vaeth |
| 8,555,286 B2 | 10/2013 | Flores et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 8,793,759 B2 | 7/2014 | Nishizawa et al. |
| 8,805,971 B1 | 8/2014 | Roth et al. |
| 8,826,390 B1 | 9/2014 | Varda |
| 8,839,087 B1 | 9/2014 | Hayden |
| 8,976,955 B2 | 3/2015 | Liberman Ben-Ami et al. |
| 9,128,995 B1 | 9/2015 | Fletcher et al. |
| 9,449,188 B2 | 9/2016 | Schneider et al. |
| 9,536,107 B2 | 1/2017 | Soman et al. |
| 9,646,150 B2 | 5/2017 | Toth |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0144868 A1 | 7/2003 | MacIntyre et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0200436 A1 | 10/2003 | Eun et al. |
| 2003/0204427 A1 | 10/2003 | Gune et al. |
| 2003/0206192 A1 | 11/2003 | Chen et al. |
| 2003/0225730 A1 | 12/2003 | Warner et al. |

(56) References Cited

U.S. PATENT DOCUMENTS

| | | |
|---|---|---|
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027368 A1 | 2/2004 | Berg et al. |
| 2004/0085316 A1 | 5/2004 | Malik |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0236726 A1 | 11/2004 | Ewing et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0097060 A1 | 5/2005 | Lee et al. |
| 2005/0177570 A1 | 8/2005 | Dutta et al. |
| 2005/0182684 A1 | 8/2005 | Dawson et al. |
| 2005/0262073 A1 | 11/2005 | Reed et al. |
| 2006/0021019 A1 | 1/2006 | Hinton et al. |
| 2007/0283287 A1 | 12/2007 | Taylor et al. |
| 2008/0104531 A1 | 5/2008 | Stambaugh |
| 2008/0109740 A1* | 5/2008 | Prinsen .......... G06F 3/0486 715/764 |
| 2008/0163099 A1 | 7/2008 | Gu et al. |
| 2008/0165970 A1 | 7/2008 | Chung et al. |
| 2008/0249972 A1 | 10/2008 | Dillon |
| 2009/0049013 A1 | 2/2009 | Kumbi et al. |
| 2009/0063415 A1 | 3/2009 | Chatfield et al. |
| 2009/0096812 A1* | 4/2009 | Boixel .......... G06T 3/0093 345/646 |
| 2009/0100342 A1 | 4/2009 | Jakobson |
| 2009/0106656 A1 | 4/2009 | Handy et al. |
| 2009/0177744 A1 | 7/2009 | Marlow et al. |
| 2009/0187586 A1 | 7/2009 | Olson |
| 2009/0189915 A1 | 7/2009 | Mercer et al. |
| 2010/0036893 A1 | 2/2010 | Serval et al. |
| 2010/0070968 A1 | 3/2010 | Poulsen et al. |
| 2010/0161643 A1 | 6/2010 | Gionis et al. |
| 2010/0169268 A1 | 7/2010 | John et al. |
| 2010/0177051 A1 | 7/2010 | Bilow |
| 2011/0035374 A1 | 2/2011 | Vadrevu et al. |
| 2011/0078708 A1 | 3/2011 | Dokovski et al. |
| 2011/0106853 A1 | 5/2011 | Baker et al. |
| 2011/0119251 A1 | 5/2011 | Yu |
| 2011/0167256 A1 | 7/2011 | Lee et al. |
| 2011/0218958 A1 | 9/2011 | Warshavsky et al. |
| 2011/0247051 A1 | 10/2011 | Bulumulla et al. |
| 2011/0295841 A1 | 12/2011 | Sityon et al. |
| 2011/0314047 A1 | 12/2011 | Koronthaly et al. |
| 2012/0042218 A1 | 2/2012 | Cinarkaya et al. |
| 2012/0089902 A1 | 4/2012 | Sheflin |
| 2012/0144332 A1 | 6/2012 | Sola |
| 2012/0233137 A1 | 9/2012 | Jakobson et al. |
| 2012/0290407 A1 | 11/2012 | Hubbard et al. |
| 2012/0310931 A1 | 12/2012 | Oliver et al. |
| 2012/0331536 A1 | 12/2012 | Chabbewal et al. |
| 2013/0079911 A1* | 3/2013 | Dong .......... G06T 13/80 700/94 |
| 2013/0086870 A1 | 4/2013 | Pong |
| 2013/0103538 A1 | 4/2013 | Scholl et al. |
| 2013/0132091 A1 | 5/2013 | Skerpac |
| 2013/0141428 A1 | 6/2013 | Gipson |
| 2013/0144868 A1 | 6/2013 | Ickman et al. |
| 2013/0179769 A1 | 7/2013 | Gurfinkel et al. |
| 2013/0212497 A1 | 8/2013 | Zelenko et al. |
| 2013/0247216 A1 | 9/2013 | Cinarkaya et al. |
| 2013/0275904 A1 | 10/2013 | Bhaskaran et al. |
| 2013/0300743 A1 | 11/2013 | Degrell et al. |
| 2013/0311454 A1 | 11/2013 | Ezzat |
| 2014/0033019 A1 | 1/2014 | Zhang et al. |
| 2014/0052713 A1 | 2/2014 | Schauer et al. |
| 2014/0053091 A1 | 2/2014 | Hou et al. |
| 2014/0074771 A1 | 3/2014 | He et al. |
| 2014/0089318 A1 | 3/2014 | Liu et al. |
| 2014/0157106 A1 | 6/2014 | Bertram et al. |
| 2014/0172776 A1 | 6/2014 | Liu et al. |
| 2014/0258970 A1 | 9/2014 | Brown et al. |
| 2014/0289408 A1 | 9/2014 | Ishrto |
| 2014/0310232 A1 | 10/2014 | Plattner et al. |
| 2014/0372319 A1 | 12/2014 | Wolovitz |
| 2015/0032620 A1 | 1/2015 | Castinado et al. |
| 2015/0047003 A1 | 2/2015 | Khan |
| 2015/0058931 A1 | 2/2015 | Miu et al. |
| 2015/0088807 A1 | 3/2015 | Toppin et al. |
| 2015/0120567 A1 | 4/2015 | Van Rooyen et al. |
| 2015/0229638 A1 | 8/2015 | Loo |
| 2015/0317748 A1 | 11/2015 | Roberts et al. |
| 2016/0044040 A1 | 2/2016 | Caffary, Jr. |

OTHER PUBLICATIONS

"Response to Final Office Action", filed in connection with U.S. Appl. No. 14/512,274, dated Jun. 27, 2017, 16 pages (SALE 1104-1).

United States Patent and Tradmark Office, "Final Office Action", issued in connection with U.S. Appl. No. 14/598,157, dated May 26, 2017, 98 pages, (SALE 1097-1).

Salesforce.com, "Salesforce Analytics Cloud Implementation and Data Integration Guide" <https://jjra.talendforge.org/secure/allachmenl/74327/Analytics%20Cloud%20Implementation%20Guide.pdf> Sep. 23, 2014, 87 pages.

United States Patent and Trademark Office, "Non-final Office Action", issued in connection with U.S. Appl. No. 14/512,267, dated Sep. 1, 2017, 26 pages (SALE 1103-1).

United States Patent and Trademark Office, "Non-final Office Action", issued in connection with U.S. Appl. No. 15/229,024, dated Sep. 22, 2017, 34 pages (SALE 1099-2).

"Response to Final Office Action", filed in connection with U.S. Appl. No. 14/598,1 dated Oct. 27, 2017, 23 pages (SALE 1097-1).

United States Patent and Trademark Office, "Non-final Office Action", issued in connection with U.S. Appl. No. 14/512,274, dated Nov. 3, 2017, 27 pages (SALE 1104-1).

"Response to Office Action", filed in connection with U.S. Appl. No. 14/512,240, dated Jan. 16, 2016, 13 pages. (SALE 1098-1).

United States Patent and Trademark Office, "Notice of Allowance", issued in connection with U.S. Appl. No. 15/229,024, dated Dec. 7, 2017, 9 pages (SALE 1099-2).

"Response to Non-final Office Action", filed in connection to U.S. Appl. No. 14/512,267, dated Sep. 1, 2017 filed Nov. 30, 2017, 25 pages (SALE 1103-1).

"Response to Non-final Office Action", filed in connection to U.S. Appl. No. 14/512,274, dated Nov. 3, 2017, filed Jan. 26, 2018, 18 pages (SALE 1104-1).

Davis Chris, Graphite Documentation Release 0.10.0.,Sep. 16, 2014, 135 pgs.

GitHub exbz Description of Graphite UI, 2014, 13 pgs., [Retrieved Sep. 16, 2014 3:06:56 PM]. Retrieved from Internet: <https://github.com/ezbz/graphitus>.

ExactTarget, "The Future of Marketing Starts Here", Mar. 1, 2013, [retrieved Mar. 1, 2013]. Retrieved from Internet <http://www.exacttarget.com>, http://web.archive.org/web/20130301133331/http://www.exacttarget.com/.

Agrawala, Maneesh, "Animated Transitions in Statistical Data Graphics", Sep. 22, 2009, 3 pgs. [Retrieved Sep. 12, 2014 9:00:30 AM] Retrieved from Internet https://www.youtube.com/watch?v=vLk7mlAtEXl&feature=youtu.be>.

Segel, Edward et al., "Narrative Visualization: Telling Stories with Data", Mar. 31, 2010, http://vis.stanford.edu/papers/ narrative. 10 pgs.

Heer, Jeffrey. et al., "Animated Transitions in Statisical Data Graphics", Mar. 31, 2007,10 pgs.

Schneider, Donovan et al., U.S. Appl. No. 14/512,230—"Row-Level Security Integration of Analytical Data Store with Cloud Architecture", Oct. 10, 2014, 39 pgs (SALE 1096-1/1451US).

(56) References Cited

OTHER PUBLICATIONS

Schneider, Donovan et al., U.S. Appl. No. 14/512,240—"Low Latency Architecture with Directory Service for Integration of Transactional Data System with Analytical Data Structures", filed Oct. 10, 2014, 35 pgs (SALE 1098-1/1453US).
Schneider, Donovan et al., U.S. Appl. No. 14/512,249—"Integration User for Analytical Access to Read Only Data Stores Generated from Transactional Systerns", Oct. 10, 2014, 35 pgs (SALE 1099-1/1454US).
Demiralp, C. et al., "Visual Embedding. A Model for Visualization", Visualization Viewpoints, IEEE Computer Graphics and Applications, Jan./Feb. 2014, pp. 6-11.
Stanford Vis group/Papers. "Visualization Papers. 2014-2001", retrieved from http://vis.stanford.edu/papers on Sep. 12, 2014, 8 pgs.
Prophete, Didier et al., U.S. Appl. No. 14/512,258—U.S. Non-provisional Application titled "Visual Data Analysis with Animated Information al Morphing Replay", Oct. 10, 2014, 56 pages (SALE 1100-1/1455US).
"Salesforce Analytics Cloud Implementation and Data Integration Guide", Summer '14 Pilot—API version 31.0, last updated: Sep. 8, 2014, 87 pgs.
Prophete, Didier et al., U.S. Appl. No. 14/512,267—"Dashboard Builder with Live Data Updating Without Exiting and Edit Mode", Oct. 10, 2014, 55 pgs (SALE 1103-1/1458US).
"Ocassionally Connected Applications (Local Database Caching)", Downloaded on Sep. 11, 2014, from http://msdn.microsoft.com/en-us/library/vstudio/bb384436(v=vs.100).aspx, 3 pgs.
Im, Fred et al., U.S. Appl. No. 14/512,274—"Offloading Search Processing Against Analytic Data Stores", Oct. 10, 2014, 40 pgs (SALE 1104-1/1459US).
EdgeSpring Legacy Content, (approx. 2012), 97 pages.
Dumais et al., "Stuff I've Seen: A System for Personal Information Retrieval and Re-Use," IN: SIGIR '03 (2003) Available at: ACM.
Pedersen et al., "Query Optimization for OLAP-XML Federations" ACM, Nov. 8, 2002, pp. 57-64.
Rao et al., "Spatial Hierarchy and OLAP-Favored Search in Spatial Data Warehouse", ACM, New Orleans, LA., Nov. 7, 2003, pp. 48-55.
United States Patent and Trademakr Office, "Office Action", issued in connection with U.S. Appl. No. 14/512,240, dated Oct. 15, 2015, 17 pgs.
United States Patent and Trademark Office "Notice of Allowance", issued in connection with U.S. Appl. No. 14/512,240, dated Mar. 16, 2016, 10 pages. (SALE 1098-1).
United States Patent and Tradmark Office, "Office Action", issue in connection with U.S. Appl. No. 14/512,249, dated Dec. 18, 2015, 15 pages (SALE 1099-1).
"Response to Office Action", filed in connection with U.S. Appl. No. 14/512,249, dated Apr. 18, 2016, 10 pages (SALE 1099-1).
United States Patent and Trademark Office, "Notice of Allowance", issued in connection with U.S. Appl. No. 14/512,249, dated May 11, 2016, 14 pgs. (SALE 1099-1).
Salesforce.com, "SOAP API Developers Guide", <https://resources.docs.saleforce.com/200/latest/en-us/sfdc/pdf/apen_api.pdf> version prior to Oct. 10, 2013.
Salesforce.com, "Row-Level Security for Datasets", <https://help.salesforce.com/apex/HTViewHelpDoc?d=bi_security_datasets_row_level.htm> version prior to Oct. 10, 2013.
Salesforce.com, "Salesforce Security Guide" <http://resources.docs.salesforce.com/2007/17/en-us/sfdc/pdf/salesforce_security_impl_guide.pdf> version prior to Oct. 10, 2013.
Salesforce.com, "Salesforce Analytics Cloud Implementation and Data Integration Guide" <https://jjra.talendforge.org/secure/attachment/74327/Analytics%20Cloud%20Implementation%20Guide.pdf> version prior to Oct. 10, 2013.
United States Patent and Trademark Office, "Office Action"issued in connection with U.S. Appl. No. 14/512,230, dated Apr. 27, 2016, 8 pages (SALE 1196-1).
RLS Core Predicate Template, about Jun. 2014, 2 pages.
Security Implementation Guide, salesforce.com, inc., version 23, Aug. 30, 2013, 112 pages.
United States Patent and Trademark Office, "Notice of Allowance", issued in connection with U.S. Appl. No. 14/512,230, dated Nov. 8, 2016, 21 pages (SALE 1096-1/1451 US).
United States Patent and Trademark Office, "Office Action", issued in connection with U.S. Appl. No. 14/512,267, dated Sep. 21, 2016, 29 pgs (SALE 1103-1).
SOAP API Developers Guide, salesforce.com, inc., version 28, Aug. 23, 2013, 1344 pages.
Analytics Cloud Implementation and Data Integration Guide, salesforce.com, Inc., Sep. 23, 2014, 87 pages.
United States Patent and Trademark Office, "Office Action", issued in connection with U.S. Appl. No. 14/512,274, dated Jan. 13, 2017, 24 pages (SALE 1104-1).
United States Patent and Trademark Office, "Office Action", issued in connection with U.S. Appl. No. 14/598,157, dated Jan. 30, 2017, 78 pages (SALE 1097-1).
Shimada et al, "Proposing a New Task Model toward Many-Core Architecture", ACM, pp. 45-48, 2013.
Du, "Modeling, Querying and Reasoning about OLAP Databases: A Functional Approach ", ACM, pp. 1-8, 2005.
Papadakis et al, "A System to Measure, Control and Minimize End-To-End Head Tracking Latency N Immersive Simulations", ACM, pp. 581-584, 2011.
Nang et al, "Efficient Task Replication for Fast Response Time in Parallel Computation", ACM, pp. 599-600, 2014.
United States Patent and Trademark Office, "Office Action", issued connection with U.S. Appl. No. 14/512,258, dated Sep. 9, 2016, 22 pages (SALE 1100-1).
"Response to Office Action", filed in connection with U.S. Appl. No. 14/512,258, dated Jan. 9, 2017, 11 pages (SALE 110-1).
"Response to Office Action", filed in connection with U.S. Appl. No. 14/512,267, filed Jan. 23, 2017, 14 pages (SALE 1103-1).
United States Patent and Trademark Office, "Final Office Action", issued in connection with U.S. Appl. No. 14/512,267, dated Feb. 15, 2017, 17 pages (SALE 1103-1).
"Response to Office Action", filed in connection with U.S. Appl. No. 14/512,230, dated Aug. 25, 2016, 15 pages (SALE 1096-1).
"Response to Final Office Action", filed in connection with U.S. Appl. No. 14/512,267, dated Apr. 13, 2017, 17 pages (SALE 1103-1).
"Response to Office Action", filed in connection with U.S. Appl. No. 14/512,274, dated Apr. 5, 2017, 16 pages (SALE 1104-1).
United States Patent and Trademark Office, "Final Office Action", issued in connection with U.S. Appl. No. 14/512,274, dated Apr. 21, 2017, 39 pages (SALE 1104-1).

\* cited by examiner

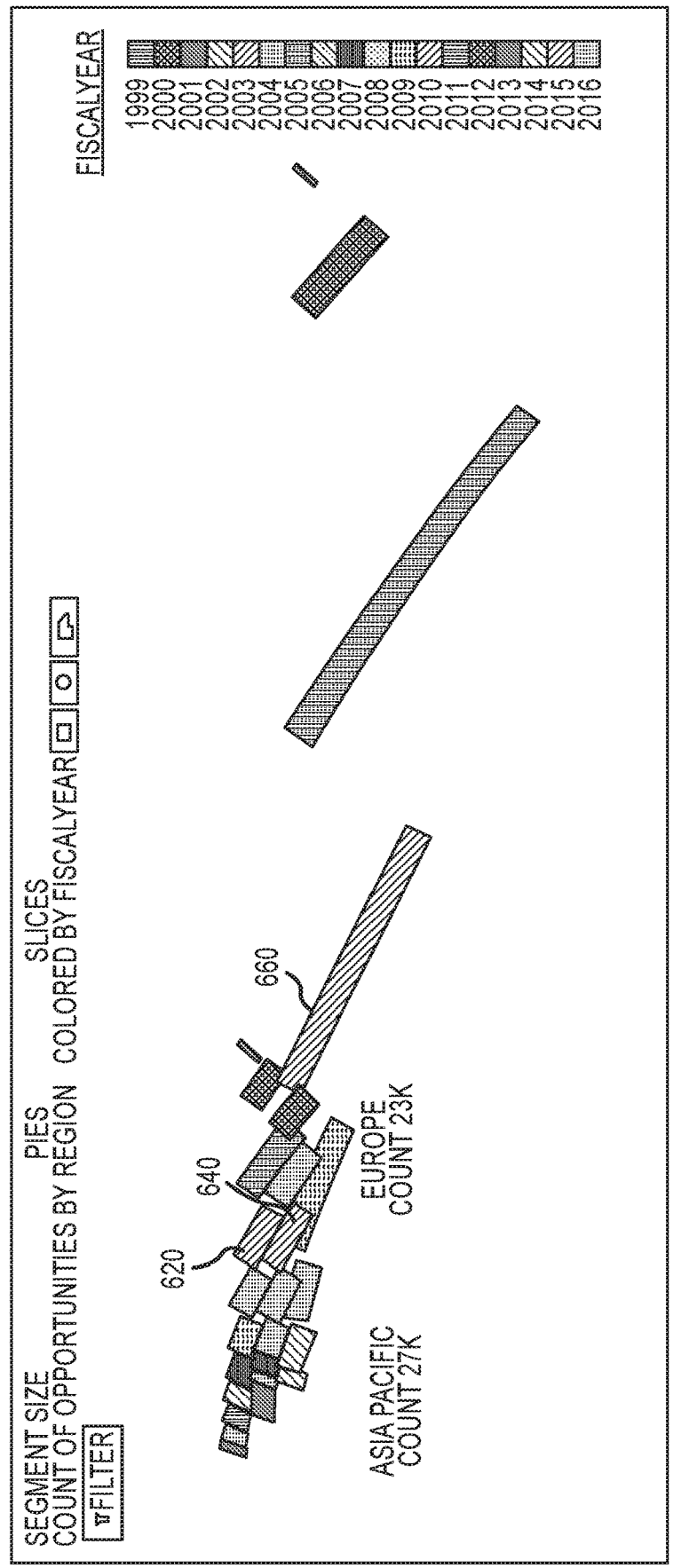

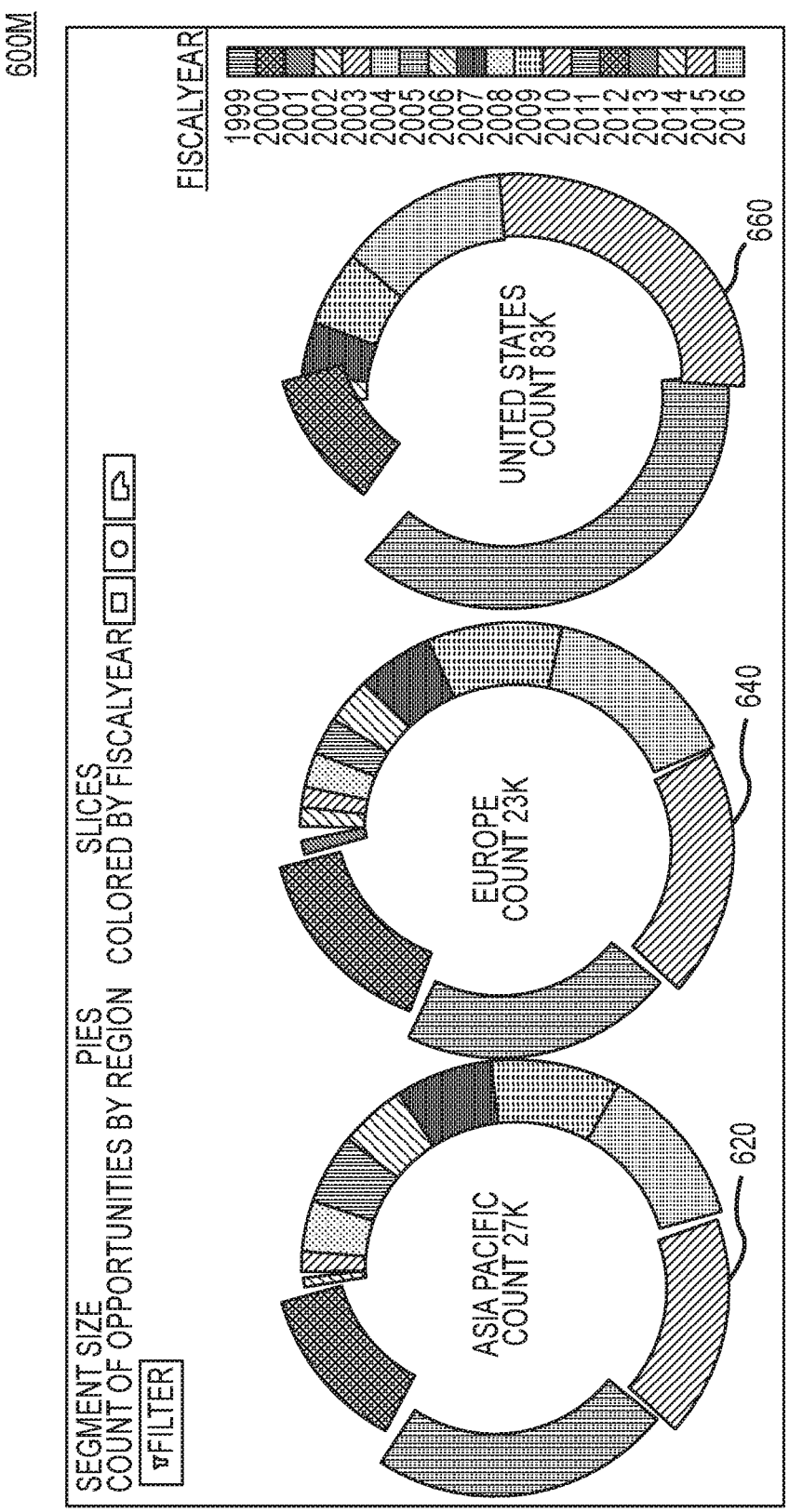

900

910 — Receive a query against an analytic data structure with a first grouping and return results of the query in data that represents a first chart or graph 920 — Receive a segment selection filter signal and a regrouping control signal and responsively generate a second query based on the selected segment and regrouping, subdivide the selected segment to correspond to results of the second query; and morph the selected segment from an initial appearance through a first animation sequence to a second appearance that corresponds to the results of the second query, and return data that represents the first animation sequence 930 — Receive a regrouping control signal and responsively generate a third query based on the selected regrouping; subdivide segments of the first chart or graph to correspond to results of the third query; morph the segments from an initial appearance through a second animation sequence to a third appearance that corresponds to the results of the second query; and return data that represents the second animation sequence.

940 — Record the received control signals and the queries to rerun against the analytic data structure; and responsive to a replay request signal, replay the received control signals and the queries and with the animated morphing and return data that represents the animation sequences

FIG. 9

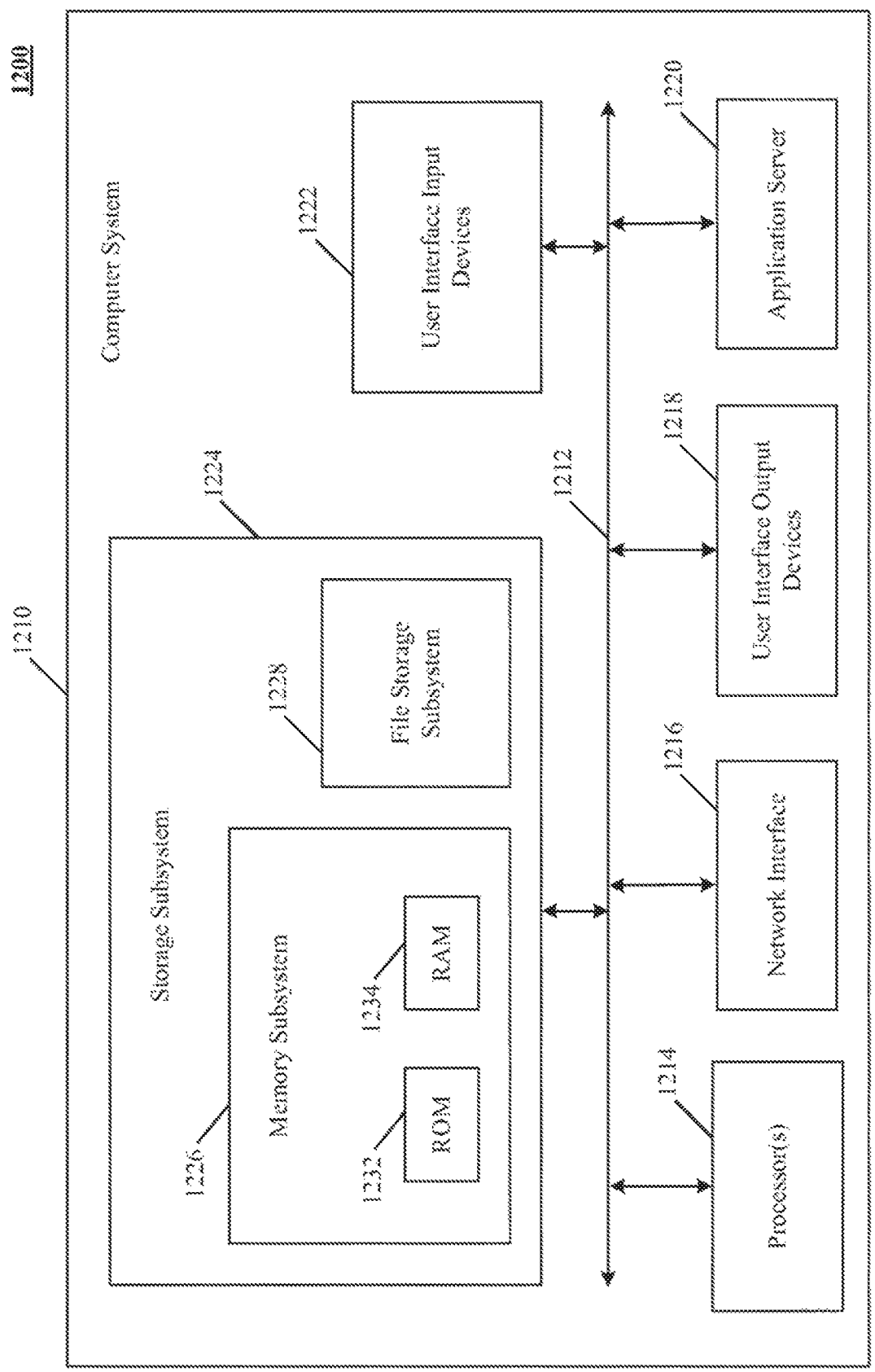
FIG. 12 – Computer System ized as they are designed. Drilling

DECLARATIVE SPECIFICATION OF VISUALIZATION QUERIES

CROSS REFERENCES

The present Application for Patent is related to the following U.S. Patent Applications: Row-Level Security Integration Of Analytical Data Store With Cloud Architecture (U.S. Pat. No. 10,671,751), Low Latency Architecture With Directory Service For Integration Of Transactional Data System With Analytical Data Structures (U.S. Pat. No. 9,396,018), Integration User For Analytical Access To Read Only Data Stores Generated From Transactional Systems (U.S. Pat. No. 9,923,901), Visual Data Analysis With Animated Information Morphing Replay (U.S. Pat. No. 9,767,145), Dashboard Builder With Live Data Updating Without Exiting An Edit Mode (U.S. Pat. No. 10,852,925) and Offloading Search Processing Against Analytic Data Stores (U.S. patent application Ser. No. 14/512,274), assigned to the assignee hereof, and expressly incorporated by reference herein.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Businesses need the ability to query and to view query results in real time, for large data sets being analyzed, in order to make informed business decisions. The disclosed technology relates to a platform for ultra-fast, ad-hoc data exploration and faceted navigation on integrated, heterogeneous data sets.

Existing systems do not typically provide business analytics "live" for large volumes of data. The disclosed apparatus and methods for visual data analysis with animated informational morphing replay provide live data rendering on a live dashboard, with flexible display options for analyzing data and conveying analysis results. Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 9 illustrates a flowchart of one implementation of visual data analysis with animated informational morphing replay;

FIG. 12 is a block diagram of an example computer system capable of visual data analysis with animated informational morphing replay.

DETAILED DESCRIPTION

Introduction

Figure 1:
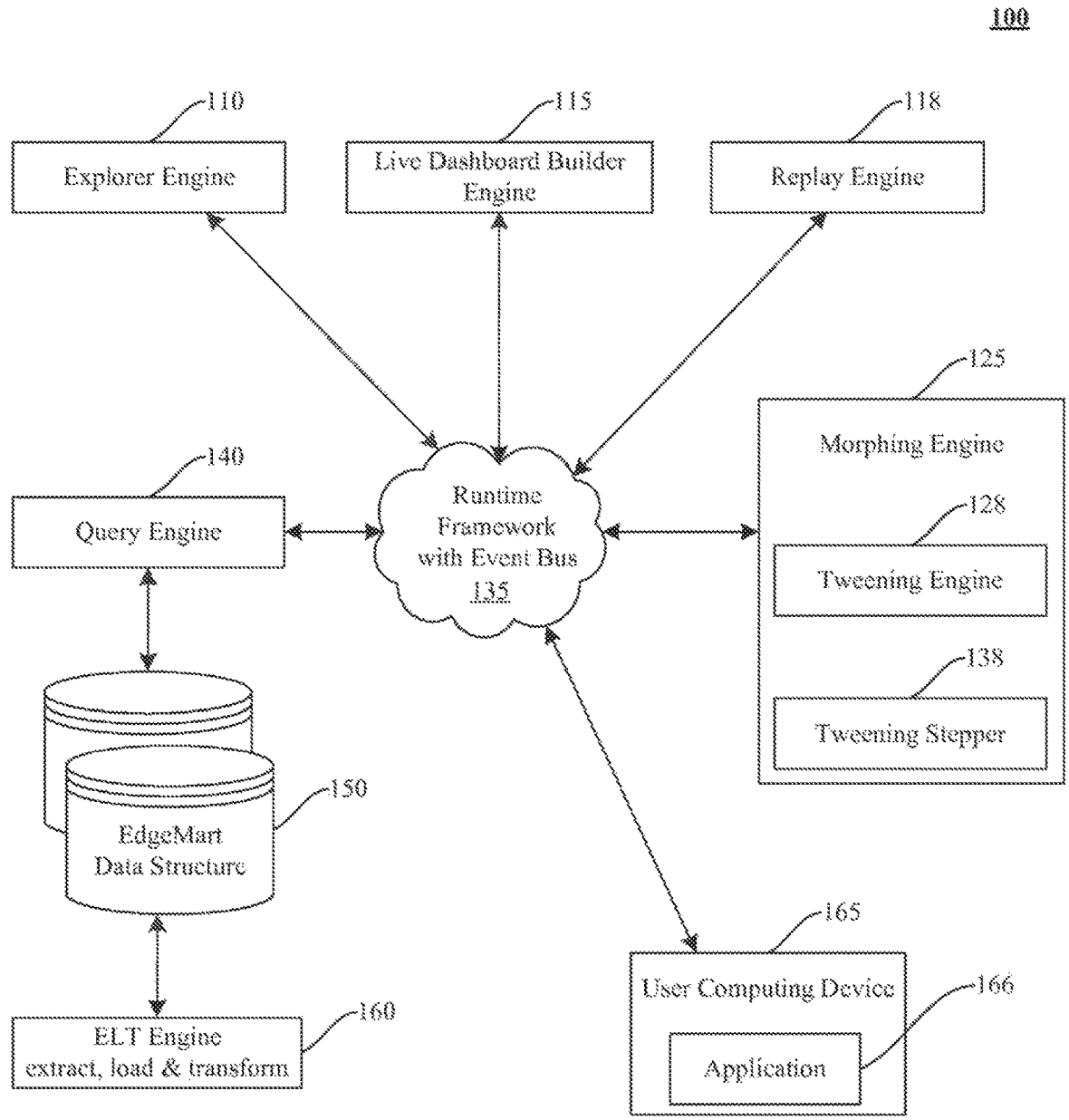
FIG. 1 illustrates an example business information and analytics architecture environment.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Insight data analysis supports data exploration, dashboard building, and declarative representation of data visualizations. During exploration and replayed exploration, changes in data filtering, grouping and presentation format are animated, showing how a change redistributes data values. Singularly and in combination, these features can contribute to successful data analysis and presentation.

During single panel data exploration and replay, new data visualizations are animated as they are designed. Drilling down on a data segment, for instance, causes the original data segment to subdivide according to the selected regrouping and visually progress through animated subdivision growth and rearrangement into a more granular data visualization. This helps the analyst understand the data, and subsequently, explain important data segments to colleagues who are interested in the process as well as the numbers.

Analysts can assemble dashboards of three or more panels that provide alternative visualizations of linked data. As an analyst creates a new panel, the system immediately applies the declared queries, widgets and bindings to the Edge-Mart(s) involved to generate a data visualization. Notional or generic representations of pie and bar charts are replaced when applying this technology by live data visualizations, without requiring a user to switch from authoring/editing mode into an execution or user mode. (In this disclosure, "pie" and "donut" are used interchangeably to refer to a circular chart with wedges or segments. We recognize that many readers would call the charts in the figures donuts instead of pies.)

An assembled dashboard can be compactly represented by declarative data objects that fully describe panels by their properties. A widget that implements a panel is capable of translating the declarative data object into a data visualization. A selected widget, such as a pie chart widget, has a handful of properties that control how the widget binds to a query and displays data.

Exploration, both original and replay, benefits from animated visualization. Consider drill down and regrouping as a first example. Consider regional win rates on sales proposals worldwide. If Asia Pacific has the best success, an analyst can drill down into the Asia Pacific data several different ways to see what drives success. The analyst looks at a pie chart, for instance, and selects the Asia Pacific segment, choosing to group the data by industry type, with a bar chart visualization. The system responds by subdividing the Asia Pacific arc by industry type and animating the projection of sub-arcs into the bars of a bar chart. The sub-arcs lengthen, straighten and reposition during the animation. The analyst can see in the animation how the industry type bar chart visualization is derived from the regional data. The animation speed can be delivered more slowly or quickly, as suits the circumstances.

In a second example that extends the first, a trio of automotive supply-related bars on the chart show particularly successful results, so the analyst wants to find someone with whom to talk. The analyst selects the automotive supplier bar, grouping by sales representative, and chooses a stacked bar chart, accumulating sales in related industry segments. To do this, the analyst lassos, rubber bands or control-selects the three industry segments. Pull down menus are used to select grouping and visualization types. As soon as selections are complete, derivation of the regrouped visualization is animated. Each of the three bars is subdivided by sales representative. Parts of the bars extend and move to positions in a stacked bar chart. Animation of the segment to bar chart derivations can be staggered, so that the base of the stacked bar is constructed first, then subsequent layers. From the resulting visualization, two names stick out and the analyst knows who to contact. On replay, the analyst can reuse the queries that led to the contacts and retain or change the visualization types. This progression can produce a dashboard.

The regional pie chart, industry type bar chart, and sales representative stacked bar chart can be combined as three linked panels in a dashboard. Immediate data presentation, without shifting out of a develop-edit mode, enhances the development process. Suppose that the analyst first places the regional pie chart onto a fresh dashboard and selects the Asia Pacific segment. When the analyst creates a linked-industry type bar chart, the selection of the Asia Pacific segment can be specified as the data context by applying a facet property to the linked graphs. The specialized development environment provided by this technology immediately populates the linked-industry-type bar chart with live data from the same analytic data store that provides the pie chart with its data (or from a second data store joined with the first).

If the analyst-developer changes the segment selection in the pie chart to Europe, the industry-type bar chart updates without user action, without the user needing to shift from a develop or edit mode into a display mode. When the analyst creates a third panel with a sales representative stacked bar chart, segments selected in the other dashboard panels can be specified as the source of the data and applied to filter data grouped and illustrated in the new sales representative panel. The analyst benefits from seeing that the story being told is well represented in graphs of actual data, immediately upon adding the new graph panel to the dashboard. Mistakes in panel configuration and size issues with visualization are immediately apparent.

The system generates declarative data objects to represent the visualizations, both for replay of data exploration and for dashboards. Dashboards and exploration sequences can be recreated from declarative objects that represent the queries, visualizations, groupings and bindings explored by an analyst-author. Declarative objects specify properties to be applied and values of the properties. A single panel or a dashboard of panels is represented by a set of declarative objects. Declaration of these objects allows the runtime to create a limited but powerful set of data visualizations during exploration, creation, replay and user dashboard viewing. The vocabulary for declarative data objects is manageable because the declarative objects are special purpose with options capable of specifying queries, bindings and facets that the provided widgets understand and can consume to produce specific data visualizations. Properties of declarative objects can be specified using key-value pairs, as illustrated in the text that follows.

Examples of systems, apparatus, and methods according to the disclosed implementations are described in a "sales opportunity" context. The examples of sales contacts such as leads, prospects and accounts are used solely to add context and aid in the understanding of the disclosed implementations. In other instances, data with numerous elements may include airline flight arrival and departure times, insurance claims, customer service call routing, etc. or any data that would have a significant number of features. Other applications are possible, so the following examples should not be taken as definitive or limiting either in scope, context or setting. It will thus be apparent to one skilled in the art that implementations may be practiced in or outside the "sales opportunity" context.

Architecture Environment

FIG. 1 shows an example analytics architecture environment in which a runtime framework with event bus 135 manages the flow of requests and responses between an Explorer engine 110, a query engine 140, and a live dashboard engine 115. Data acquired (extracted) from large data repositories is used to create "raw" EdgeMart data structures 150—read-only data structures for analytics—that can be augmented, transformed, flattened, etc. before being published as customer-visible EdgeMarts for business entities. A query engine 140 uses optimized data structures and algorithms to operate on these highly-compressed EdgeMarts 150, delivering exploration views of this data. Accordingly, an opportunity arises to analyze large data sets quickly and effectively.

Visualization queries are implemented using a declarative language to encode query steps, widgets and bindings to capture and display query results in the formats selected by a user. An Explorer engine 110 displays real-time query results. When activated by an analyst-developer, Explorer engine 110 runs EQL queries against the data and includes the data in lenses. A lens describes a data visualization: a query plus a chart option for rendering the query. The EQL language is a real-time query language that uses data flow as a means of aligning results. It enables ad hoc analysis of data stored in EdgeMarts. A user can select filters to change query parameters and can choose different display options, such as a bar chart, pie chart or scatter plot—triggering a real-time change to the display panel—based on a live data query using the updated filter options. An EQL script consists of a sequence of statements that are made up of keywords (such as filter, group, and order), identifiers, literals, or special characters. EQL is declarative: you describe what you want to get from your query. Then, the query engine will decide how to efficiently serve it.

A runtime framework with an event bus 135 handles communication between a user application 166, a query engine 140, and an Explorer engine 110, which generates lenses that can be viewed via a morphing engine 125. A disclosed live dashboard builder engine 115 designs dashboards, displaying multiple lenses developed using the Explorer engine 110 as real-time data query results. That is, an analyst can arrange display panels for multiple sets of query results from the Explorer engine 110 on a single dashboard. When a change to a global filter affects any display panel on the dashboard, the remaining display panels on the dashboard get updated to reflect the change. Accurate live query results are produced and displayed across all display panels on the dashboard.

The Explorer engine 110 provides an interface for users to choose filtering, grouping and visual organization options; and displays results of a live query requested by a user of the application 166 running on a user computing device 165. The query engine 140 executes queries on read only pre-packaged data sets—the EdgeMart data structures 150. The Explorer engine 110 produces the visualization lens using the filter controls specified by the user and the query results served by the query engine 140.

Explorer engine 110, query engine 140, and live dashboard builder engine 115 can be of varying types including a workstation, server, computing cluster, blade server, server farm, or any other data processing system or computing device. In some implementations, Explorer engine 110 can be communicably coupled to a user computing device 165 via different network connections, such as the Internet. In some implementations, query engine 140 can be communicably coupled to a user computing device 165 via different network connections, such as a direct network link. In some implementations, live dashboard builder engine 115 can be communicably coupled to user computing device 165 via different network connections, such as the Internet or a direct network link.

The runtime framework with event bus 135 provides real time panel display updates to the live dashboard engine 115, in response to query results served by the query engine 140 in response to requests entered by application users 166. The runtime framework with event bus 135 sets up the connections between the different steps of the workflow. When new nodes get removed or added to the dashboard, connections are recomputed dynamically.

The morphing engine 125 receives a request from the event bus 135, and responds with a first chart or graph to be displayed on the live dashboard 115. Segments of a first chart or graph are filter controls that trigger generation of a second query upon selection by a user. Subsequent query requests trigger controls that allow filtering, regrouping, and selection of a second chart or graph of a different visual organization than the first chart or graph.

The morphing engine 125 includes tweening engine 128 and tweening stepper 138 that work together to generate pixel-level instructions—intermediate frames between two images that give the appearance that the first image evolves smoothly into the second image. That is, a shape can be described by a radius and an angle. The tweening engine 128 calculates the locations for the pixels and the tweening stepper 138 delivers an animation projection sequence for morphing a display panel from a first visualization lens to a second visualization option. The projections between the start and destination frames create the illusion of motion that gets displayed on the dashboard when a user updates data choices.

Runtime framework with event bus 135 can be of varying types including a workstation, server, computing cluster, blade server, server farm, or any other data processing system or computing device; and can be any network or combination of networks of devices that communicate with one another. For example, runtime framework with event bus 135 can be implemented using one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, Wi-Fi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

The EL T engine 160 uses an extract, load, transform (EL T) process to manipulate data served by backend system servers to populate the EdgeMart data structures 150. EdgeMart data structures 150 can be implemented using a general purpose distributed memory caching system. In some implementations, data structures can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Various types of on-demand transactional data management systems can be integrated with analytic data stores to provide to data analysts ad hoc access to query the transaction data management systems. This can facilitate rapid building of analytic applications that use numerical values, metrics and measurements to drive business intelligence from transactional data stored in the transaction data management systems and support organizational decision making. Transaction data refers to data objects that support operations of an organization and are included in application systems that automate key business processes in different areas such as sales, service, banking, order management, manufacturing, aviation, purchasing, billing, etc. Some examples of transaction data include enterprise data (e.g. order-entry, supply-chain, shipping, invoices), sales data (e.g. accounts, leads, opportunities), aviation data (carriers, bookings, revenue), and the like.

Most often, the integration process includes accumulating transaction data of a different format than what is ultimately needed for analytic operations. The process of acquiring transaction data and converting it into useful, compatible and accurate data can include three, or more, phases such as extract, load and transform. In some implementations, the integration flow can include various integration flow styles. One such style can be Extract-Transform-Load (ETL), where, after extraction from a data source, data can be transformed and then loaded into a data warehouse. In another implementation, an Extract-Load-Transform (ELT) style can be employed, where, after the extraction, data can be first loaded to the data warehouse and then transformation operation can be applied. In yet another implementation, the integration can use an Extract-Transform-Load-Transform (ETLT) style, where, after the extraction, several data optimization techniques (e.g. clustering, normalization, denormalization) can be applied, then the data can be loaded to the data warehouse and then more heavy transformation operations can occur.

Extraction refers to the task of acquiring transaction data from transactional data stores, according to one implementation. This can be as simple as downloading a flat file from a database or a spreadsheet, or as sophisticated as setting up relationships with external systems that then control the transportation of data to the target system. Loading is the phase in which the captured data is deposited into a new data store such as a warehouse or a mart. In some implementations, loading can be accomplished by custom programming commands such as IMPORT in structured query language (SQL) and LOAD in Oracle Utilities. In some implementations, a plurality of application-programming interfaces (APis) can be used, to interface with a plurality of transactional data sources, along with extraction connectors that load the transaction data into dedicated data stores.

Transformation refers to the stage of applying a series of rules or functions to the extracted or the loaded data, generally so as to convert the extracted or the loaded data to a format that is conducive for deriving analytics. Some examples of transformation include selecting only certain columns to load, translating coded values, encoding free-form values, deriving new calculated values, sorting, joining data from multiple sources, aggregation, denormalization, transposing or pivoting data, splitting a column into multiple columns and data validation.

In some implementations, EL T workflow generates a so-called precursor EdgeMart by performing lightweight transformations on the transaction data. One example of a light-weight transformation is denormalization transformation. A denormalization transformation reintroduces some number of redundancies that existed prior to normalization of the transaction data, according to one implementation. For instance, a denormalization transformation can remove certain joins between two tables. The resulting so-called precursor EdgeMart has lesser degrees of normal norms relative to the transaction data, and thus is more optimal for analytics operations such as faster retrieval access, multidimensional indexing and caching and automated computation of higher level aggregates of the transaction data.

In other implementations, the loaded data can undergo a plurality of heavy-weight transformations, including joining data from two related EdgeMarts, flattening the transaction role hierarchy to enable role-based security, increasing query performance on specific data and registering an EdgeMart to make it available for queries. Depending on the type of transformation, the data in an existing EdgeMart is updated or a new EdgeMart is generated.

In one implementation of the heavy-weight transformations, an augment transformation joins data from two EdgeMarts to enable queries across both of them. For instance, augmenting a "User EdgeMart" with an "Account EdgeMart" can enable a data analyst to generate query that displays all account details, including the names of the account owner and creator. Augmentation transformation creates a new EdgeMart based on data from two input EdgeMarts. Each input EdgeMart can be identified as the left or right EdgeMart. The new EdgeMart includes all the columns of the left EdgeMart and appends only the specified columns from the right EdgeMart. Augmentation transformation performs a left, outer join, where the new EdgeMart includes all rows from the left EdgeMart and only matched rows from the right EdgeMart. In another implementation, queries can be enabled that span more than two EdgeMarts. This can be achieved by augmenting two EdgeMarts at a time. For example, to augment three EdgeMarts, a first two EdgeMarts can be augmented before augmenting the resulting EdgeMart with a third EdgeMart.

In some implementations, a join condition in the augment transformation can be specified to determine how to match rows in the right EdgeMart to those in the left EdgeMart. The following example illustrates a single-column join condition. To augment the following EdgeMarts based on single-column key, an "Opportunity" is assigned as the left EdgeMart and an "Account" is assigned as the right EdgeMart. Also, "Oppty Acct" is specified as the relationship between them.

| Opportunity EdgeMart | Account EdgeMart |
|---|---|
| ID | *ID |
| Opportunity_ Name | Account_Name |
| Amount | Annual_Revenue |
| Stage | Billing_ Address |
| Closed Date | |
| *Account ID | |

Upon running an ELT workflow job, an "OpptyAcct" prefix is added to all account columns and the EdgeMarts are joined based on a key defined as "Opportunity.Account_ID=Account.ID." After running the ELT workflow job to augment the two input EdgeMarts, the resulting EdgeMart includes the following columns:

| Opportunity-Account EdgeMart |
|---|
| ID |
| Opportunity_ Name |
| Amount |
| Stage |
| Closed Date |
| Account ID |
| Oppty Acct.Account_ Name |
| Oppty Acct.Annual_ Revenue |
| Oppty Acct.Billing_ Address |

In other implementations, different heavy-weight transformations can be applied, including flatten transformation to create role-based access on accounts, index transformation to index one dimension column in an EdgeMart, Ngram transformation to generate case-sensitive, full-text index based on data in an EdgeMart, register transformation to register an EdgeMart to make it available for queries and extract transformation to extract data from fields of a data object.

In some implementations, user computing device 165 can be a personal computer, a laptop computer, tablet computer, smartphone or other mobile computing device, personal digital assistant (PDA), digital image capture devices, and the like. Application 166 can take one of a number of forms, running in a browser or as an application, including user interfaces, dashboard interfaces, engagement consoles, and other interfaces, such as mobile interfaces, tablet interfaces, summary interfaces, or wearable interfaces. In some implementations, it can be hosted on a web-based or cloud based server in an on premise environment. In one implementation, application 166 can be accessed from a browser running on a computing device. The browser can be Chrome, Internet Explorer, Firefox, Safari, Opera, and the like. In other implementations, application 166 can run as an engagement console on a computer desktop application.

In other implementations, environment 100 may not have the same elements or components as those listed above and/or may have other/different elements or components instead of, or in addition to, those listed above, such as a web server and template database. The different elements or components can be combined into single software modules and multiple software modules can run on the same hardware.

Morphing and Replay

Figure 2:
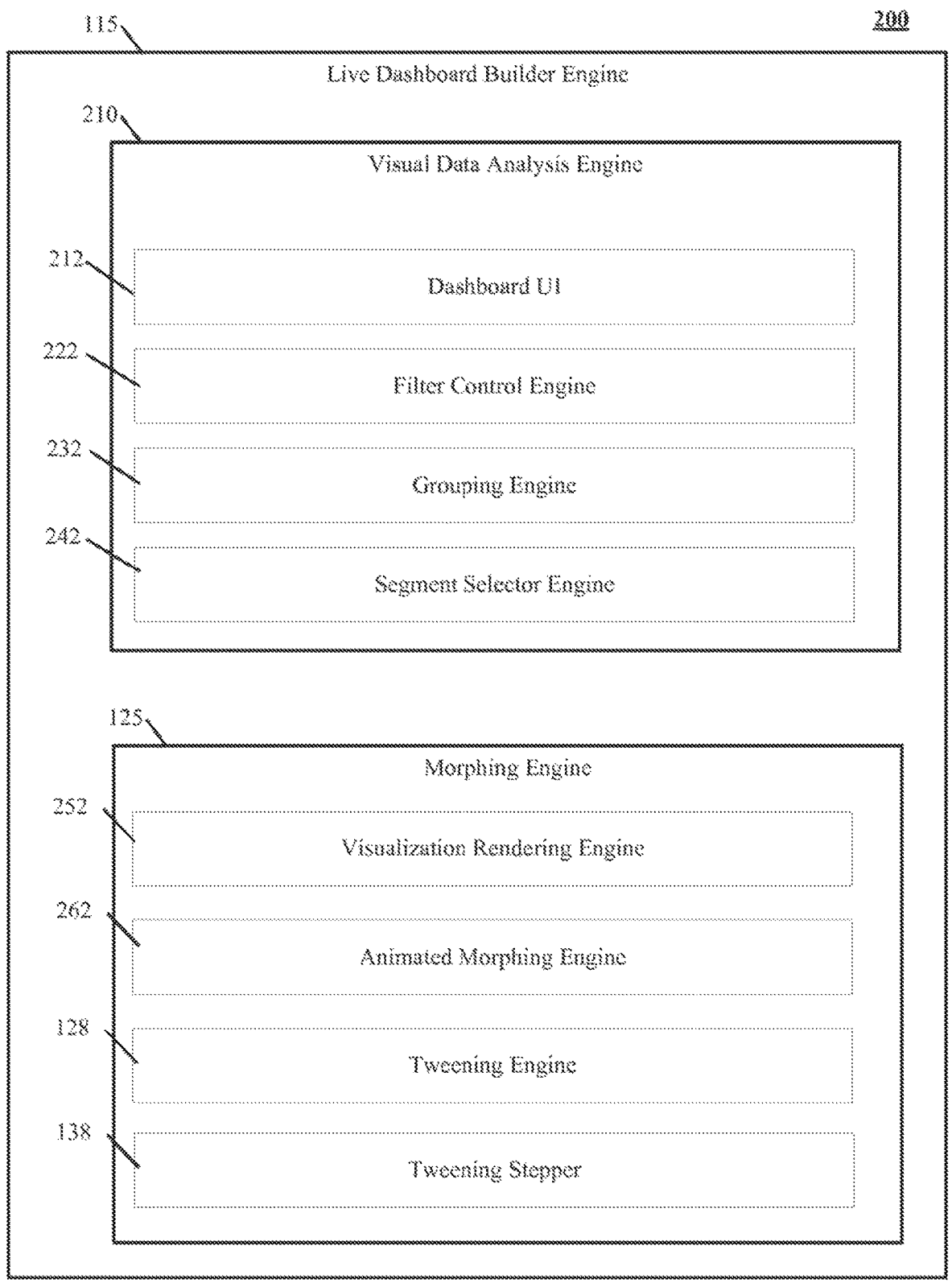
FIG. 2 shows a block diagram for a live dashboard implementation.

FIG. 2 shows a block diagram for the live dashboard builder 115, which includes, but is not limited to, a visual data analysis engine 210 and a morphing engine 250. A visual data analysis engine 210 conveys analysis results via a dashboard UI 212, for display on the dashboard. A grouping engine 232 monitors which data fields are to be displayed in a specific visual organization, such as a pie chart or bar chart. A segment selector engine 242 processes filter controls for the charts, graphs and plots. That is, the segment selector engine 242 signals requests for changes to filtering, grouping and variations in visual organization—such as a transformation from a bar chart to a pie chart—to the filter control engine 222. Query requests use the signal received from the segment selector engine 242.

The morphing engine 250 delivers an animated sequence that transforms a display panel from a first grouping to a second appearance, or visual organization, based on results of a second query. A visualization rendering engine 252 combines information from both the visual data analysis engine 210 and the filter control engine 222, and renders dashboard updates to the dashboard UI 212. An animated morphing engine 262 morphs a first chart or graph from a first appearance in a first sort order through an animation sequence to a second sort order that corresponds to the sorting control signal.

Replay engine 118 uses the workflow engine to capture all the events being fired and their timestamp. The replay function later re-fires the same events in the proper order—replaying the events recorded via the workflow engine.

Dashboard Object Implementation

Advanced dashboards are created by directly modifying the source files that define the dashboards. In one implementation, a dashboard JSON file defines the components that a dashboard includes and describes how the components are connected together. The following sample JSON file defines a dashboard that uses a number widget to display the count of rows in an EdgeMart. This JSON file defines one widget, called "number_1".

```
{
    "name_lc": "simple example dashboard",
    "state": {
        "widgets": {
            "number_ 1 ": {
                "params": {
                    "title": "",
                    "textColor": "#000",
                    "measureField" : "count",
                    "fontSize": 36,
                    "step": "step_1"
                },
                "type": "NumberWidget",
                "pos": {
                    "w": 300,
                    "y": 40,
                    "h": "auto",
                    "x": 40
                }
            }
        },
```

This JSON file also defines one step, called "step_1.

```
        "steps": {
            "steps_ I": {
                "isFacet": true,
                "start": null,
                "query": {
                    "values": [ ],
                    "order": [ ],
                    "pigql": null,
                    "dimensions": [ ],
                    "measures": [
                        [
                            "count",
                            "*"
                        ],
                        "aggregateFilters": [ ],
                        "groups": [ ],
                        "filters": [ ],
                        "formula": null
                }
                "extra": {
                    "chartType": "hbar"
                },
                "selectMode": "single",
                "useGlobal": true,
                "em": "0Fb400000004CH2CAM",
                "type": "aggregate",
                "isGlobal": false
            },
            "cards": { }
        }
    }
    "_uid": "OFK400000004CGOGA2",
    "_createdBy": {
        "_type": "user",
        "profilePhoto Url": "https://myorg/profilephoto/005/T",
        "name": "Insights DashEditor",
        "_uid": "00540000000Hew7 AAC"
    },
    "folder": {
        "_type": "folder",
        "_uid": "00540000000Hew7 AAC"
    },
    "_container": {
        "_container": "OFK 400000004CGOGA2",
        "_type": "container"
    },
```

The "EdgeMarts" section of the JSON file lists the EdgeMarts that the dashboard uses.

```
"_type": "dashboard",
"EdgeMarts": {
    "emNme": {
        "_type": "Edge Mart",
        "uid": "0Fb400000004CH2CAM"
    }
},
"_createdDateTime": 1406060540,
"_permissions": {
    "modify": true,
    "view": true
}
"description": "",
"_url": "/insights/internal_ api/v 1.0/ es Obj ect/lens/OFK
400000004CGOGA2/j son",
"name": "Simple example dashboard",
"_lastAccessed": 1406060541,
"_files": { }
}
```

In the code above, the steps section includes all of the queries clipped from the Explorer. In one implementation, each step has a name that is used to link it to a widget that is defined elsewhere in the JSON file. The steps section of a dashboard JSON file can have a plurality of properties. In one implementation, an "em" property refers to the alias of the EdgeMart that the step uses. In another implementation, an "extra" property specifies the extra information about the step. Also, an "isFacet" property indicates whether the step is connected to other steps used in the dashboard (true) or not (false). In some implementations, a global filter can filter all other steps in the dashboard that have their "useGlobal" property set to true, and that reference the same EdgeMart. Further, a "query" property refers to the query that the step uses. In some implementations, it can be in EQL or compact form. A "selectmode" property determines the selection interaction for charts and selectors. In one implementation, the different charts can be none, single and single required. In another implementation, the selectors can be single, single required or refreshed. In addition, a "start" property identifies the default start value or values for a step. This value can be used when a dashboard is initialized or refreshed, according to one implementation. Further yet, a "type" property designates a type of the step, including at least one of grain, aggregate, multi and static. A "useGlobal" property indicates whether the step uses the dashboard's global filter (true) or not (false).

Referring to the above code again, the code's widgets section defines all the widgets that appear in the dashboard. In one implementation, each widget in the dashboard is assigned a name in the code. The different properties of the widgets section of a dashboard JSON file include at least one of "params," "pos" and "type." In one implementation, "params" property identifies the different widget parameters, which vary depending on the type of widget. Further, the step that a widget is attached to is defined by its step element. The "pos" property determines a position of the top left corner of the widget, which is specified by x and y. In addition, each widget's width is specified as w and height as h. In some implementations, widget measurements are made in pixels. Moreover, the "type" property specifies one of the other supported widget types such as NumberWidget, ChartWidget, ValuesTable, CompareTable, PillBox, ListSelector or Text Widget.

The code above also includes a query section of a dashboard JSON file. A "pigql" property of the query section refers to an EQL query. EQL language is a real-time query language that uses data flow as a means of aligning results and allows for ad hoc analysis of data stored in EdgeMarts. Also, a "measures" property specifies quantities that can be measured, for example, sum, amount, unit sales of a product or cost of inventory items. In one implementation, the measures can be specified as "measures": [["count", "*"]]. A "dimensions" property is an attribute, or a set of attributes, by which the measures are divided into sub-categories. In one implementation, the dimensions are specified as "dimensions": [["Department", "*" ]]. Moreover, a "values" property is used with a grain step type in a step for a raw data table widget. In one implementation, values lists all of the columns to include in a grain or raw data table. For example:

```
"step grain": {
    "type": "grain",
    values
    "em": "opp",
    "query": {
        "values": ["Amount", "Owner-Name", "Name", "Account-
        Name", "StageName",
        "ForecastCategory", "Current Age", "Time to Win"],
    }
}
```

Further, a "filters" property applies filter conditions to the data. Following is an example of a filter condition to include only rows with destination "SFO", "LAX", "ORD", or "DFW"—"filters": [["dest", ["SFO", "LAX", "ORD", "DFW"}]]. A "groups" property determines how dimensions are grouped. For example, "groups": ["carrier" ]. The following code shows one example of filtering an EdgeMart named "opportunity" based on 2011, 2012 and 2013 closing years:

```
step global_ filters:
    type: "aggregate"
    em: "opp"
    query:
        filters: [
            ["CloseDate Year", ["2013 ", "2012",
            "2011 "]]
        ]
    isGlobal: true
```

In other implementations, other filter widgets can be defined such as representative filter (owner-name), year filter (closedate-year), amount filter (sum), product filter (product), region filter (region), account filter (account-name), stage name filter (closed-won), open opportunities filter (lead, prospect, proposal/quote, contract/negotiations), quarterly bookings filter (closedate-quarter), win loss filter (closed-won, closed-lost), owner by role filter (owner-user-role-name), quotas by roles filter (role, closed year), cogroup filter (owner by role, quotas by role), user role filter (owner, userrole, name) and quotas by userrole filter (closed year, role).

Further yet, an "order" property sets the sort order as "order": [[-1, {"ascending": false}]], according to one example. In this example, a -1 value indicates that the ordering is done for the first measure. To order the results in ascending order, the ascending is set to true, in one implementation. In another implementation, to order the results in descending order, the ascending is set to false. In yet another implementation, empty brackets are specifies, like this "order":[ ], to avoid imposing a specific order. In addition, a "limit" property determines a number of results that are returned. In one example, the limit is set to return ten results by "limit": 10. A "formula" property is used with a multi type step in a step for a compare table, according to one implementation. In some implementations, a multi type step can include more than one subquery and mathematical operators such as *, /, −, +, (, and) can be used to create a formula to reference other subqueries in the step.

In one implementation, a plurality of selector widgets can be used to stratify the data in the dashboard based on different categories. In one example, a group selector widget lets user indicate whether they want to group by account or product. When a user makes a selection, the dashboard is updated accordingly. In one implementation, the part of the query that controls the filtering is –q=filter q by 'Account-Name' in {{selection(step Account_Owner_Name_2)}}. The step that is named step_Account_Owner_Name_2 is configured as a selection binding so as to pick up the current selection state. Because it is within the double braces, the value of that selection can be substituted and used in the query. The part of the query that controls the grouping is:

```
q =group q by { { single_quote(value(selection(step_StageName_3)))}
};
q = foreach q generate { {
single_quote(value(selection(step_StageName_3)))
} } as { {
value(selection(step_StageName_3))} }, sum('Amount') as
'sum_Amount',
count( ) as 'count'";
```

If a user selects Product category in the group selector widget, the actual query that is passed to the query engine includes:
q=group q by 'Product';
q=foreach q generate 'Product' as "Product", sum ('Amount') as
'sum_Amount', count( ) as
'count';

In other implementations, other selector widgets can be defined such as representative selector (owner-name), year selector (closedate-year), amount selector (sum), product selector (product), region selector (region), account selector (accountname), stage name selector (closed-won), open opportunities selector (lead, prospect, proposal/quote, contract/negotiations), quarterly bookings selector (closedate-quarter), win loss selector (closed-won, closed-lost), owner by role selector (owner-userrole-name), quotas by roles selector (role, closed year), cogroup selector (owner by role, quotas by role), user role selector (owner, userrole, name) and quotas by userrole filter (closed year, role).

In one implementation, the different filters and selectors are represented as different widgets. In some implementations, this is achieved by—specifying a type of the widget such as list selector widget, range selector widget, chart selector widget, pillboxwidget, values table widget, number widget and action button widget (explore); setting two-dimension (x,y) or three-dimension (x, y, z) positions and height (h) and width (w) of the widget; specifying if the widget is expandable (true) or not (false); setting a title of the widget (string); identifying the step that uses widget (this links the widget to the respective filter or selector included in the identified step); specifying a select mode of the widget (single, multi-select); and setting a measure of the widget (sum, account). In other implementations, the widget types are further stratified into various geometrical constructs like a vertical bar chart (vbar), a horizontal bar chart, a pie chart, a line chart, time and a scatter plot. The following code shows one example of defining a widget in a. In this example, a sales representative selector in a step named "step_all_salesreps" is linked to a sel salesreps widget titled "salesrep selector" and shaped as a pie chart:

```
# sales representative selector
    step_ all_ salesreps:
        type: "aggregate"
        em: "opp"
        query:
            groups: ["Owner-Name"]
            measures: [ ["sum", "Amount"] ]
            order: [ [−1, ascending: false] ]
        extra:
            chartType: "pie"
        isFacet: true
        useGlobal: true
widgets
    sel salesreps:
        type: "ChartWidget"
        pos:
            x: 310
            y:70
            w: 470
            h:380
        params:
            expanded: false
            title: "salesrep selector"
            step: "step_ all_ salesreps"
            ChartType = "pie"
            instant: true
            multiSelect: false
            measureField: "sum Amount"
```

After the steps are defined, they are bound to the widgets using different types of bindings, such as selection binding, results binding and filter binding. When a user makes a selection in a dashboard, that selection values can be used to update other steps and widgets to make the dashboard interactive. Further, when a dashboard is build using the dashboard builder UI, all the dashboard components are faceted. In one implementation, the "isFaceted" property for each step enables bidirectional selection bindings between steps of the same EdgeMart. In some implementations, facet bindings are set up for all the steps marked with "isFaceted"=true as follows:

```
initFacets: –>
    #map: em url –>array of step names faceted for this em
    facetStepsByEmMap = { }
    # The faceted steps are grouped together by EdgeMart
    # All the faceted steps for a given EdgeMart are faceted together
    for name, step of@_stepsByName
        delete step.query.facet_ filters if step.query
        if step .isF acet
            type= step.type
            @_ throwError(LC .getLabel "ErrorMsg",
            "invalidStepForFacet",
            type, name,
            JSON.stringify(RuntimeEngine.V AUD FACET_ TYPES))
            unless type in RuntimeEngine.V ALID FACET_ TYPES
            @_throw Error(LC. getLabel "ErrorMsg",
            "invalidFacetedStaticStep", name) if type is "static"
            and (not step.dim or not step.em)
            emUrl = @_getEmUrlForStep step
            facetStepsByEmMap[emUrl] ?= [ ]
            facetStepsByEmMap[emUrl].push name
    for emUrl, facetSteps of facetStepsByEmMap
        for mainStepName in facetSteps
            mainStep = @_stepsByName[mainStepName]
```

In some implementations, a dashboard JSON file is directly modified to manually specify the relationships between the various step to facilitate—selection bindings between steps of different EdgeMarts, unidirectional selection binding and selection binding for a static step. In some implementations, all parts of a step can include a selection binding to the results of a prior query. In an aggregate query, the fields that can be included in a selection binding include group, measure, filters, sort and limit.

In other implementations, the results binding is used to filter a step using the values resulting from another step across multiple EdgeMarts. In one example, results binding enables filtering of opportunities by top-selling products, as shown in the code below:

```
step_ all_ salesreps:
    type: "aggregate"
    em: "opp"
    query:
        groups: ["Owner-Name"]
        filters: [
            ["StageName", ["5 - Closed-Won"]]
            ["Products", " { { results( step_ top5 _products) } } "]
        ]
        measures: [ ["sum", "Amount"] ]
```

If a step is constrained by a particular set of filters, filter binding can be use to constrain another step by the same filter values, according to some other implementations. In one implementation, filter binding is applied on steps that reference different EdgeMarts. The following step is constrained by a CloseDate Year of 2014, according to the following code:

```
step_ owner_ by _role:
    type: "aggregate"
    em: "opp"
    query:
        groups: ["Owner-UserRole-Name", "CloseDate Year"]
        filters: [
            ["CloseDate Year", ["2014"]]
        ]
        measures: [ ["sum", "Amount"] ]
```

To constrain subsequent steps by the same filter dimension and values, the appropriate dimension, step, and dimension name can be referenced within filters as follows:

```
step_ quota filtered_ by _role:
    type: "aggregate"
    em: "quota"
    query:
        filters: [
            ["Closed Year", " { { filter( step_ opp_ owner role, 'CloseDate Year')}}"]
```

In one implementation, bindings are calculated for all the steps using the following code:

```
_computeBindings: ->
    for name, step of@_stepsByName
        if step.multiBindings
            bindings= @_inferBindings step, @_stepNames, @ctx.ns
            step.multiBindings.bind bindings
```

In another implementation, if a binding originates from a step that accumulates event parameters, then previously fired bound events are injected into the multi-binding as follows:

```
for eventName of bindings
    eventParts = eclair.utils.getEventParts eventName
    bindingStep =
        if eventParts.name is 'runtime'
            @
        else
            @_stepsByName[eventParts.name]
```

In yet another implementation, a "RuntimeEventDispatcher" saves event parameters, which reinject the value into the step as follows:

```
if bindingStep instanceof RuntimeEventDispatcher
    value= bindingStep.argsForEvent
        eventParts. type
    value= value[O] if _.isArray value
    step .multiBindings. params [ eventParts.name
        + ":" + eventParts.type] =value
```

Given a step and hashmap of stepNames, the necessary bindings are inferred and the hashmap are returned using the following code:

```
_inferBindings: (step, stepNames, ns) ->
    # dry run to get the input types
    bindingsArray = ["runtime:start"]
    if step.query
        bindingCtx =
            results: (step)-> bindingsArray.push
                "# {step}:# {RuntimeEngine. STEP_ EVENT_ RE SUL TS}"
            filter: (step)-> bindingsArray.push
                "# {step}:# {RuntimeEngine. STEP_ EVENT_ BIND IN GS_ D ONE}"
            selection: (step)-> bindingsArray.push
                "# {step}:# {RuntimeEngine. STEP_ EVENT_ SELE CTI ON}
                "
            facet_selection: (step)-> bindingsArray.push
                "# {step}:# {RuntimeEngine. STEP_ EVENT_ SELE CTI ON}
                ",
            value: ->#this doesn't affect the bindings
            single_quote: ->#this doesn't affect the bindings
            sum: (step) -> bindingsArray.push
                "# {step}:# {RuntimeEngine. STEP_ EVENT_ RE SUL TS}"
            min: (step)-> bindingsArray.push
                "# {step}:# {RuntimeEngine. STEP_ EVENT_ RE SUL TS}"
            max: (step) -> bindingsArray.push
                "# {step}:# {RuntimeEngine. STEP_ EVENT_ RE SUL TS}"
        bindingCtx = Klass.extend(bindingCtx, stepNames)
```

At run time, a step is determined for a particular widget based on the corresponding binding configuration. In one implementation, this is achieved by using the following code:

```
# get step used for widget
step=
    if params.step then @_getStep params.step
    else null
if step
    params.selectMode = step.selectMode
```

Once the step is determined, the corresponding widget is loaded into the dashboard using the following switch statement, according to one implementation:

```
widget=
    switch type
        when "Number Widget" then new runtime.widgets.NumberWidget args
        when "ValuesTable" then new runtime.widgets.ValuesTable args
        when "CompareTable" then new runtime.widgets.CompareTable args
        when "Chart Widget" then new runtime.widgets.ChartWidget args
        when "PillBox" then new runtime.widgets.PillBox args
        when "Box Widget" then new runtime.widgets.Box Widget args
        when "TextWidget" then new runtime.widgets.TextWidget args
        when "ActionButton" then new runtime.widgets.ActionButton args
        when "ListSelector", "Range Selector", "DateSelector",
        "GlobalFiltersWidget", "LinkWidget", "YoutubeWidget"
            @renderReactComponent type, args, pos
        when "Card"
            cardName = params.card
            cardTemplate = @_getCardTemplate cardName
            new runtime.widgets.CardWidget {name, params, cardTemplate,
            parentRuntime: @}
        else
            @_ throwError(LC .getLabel "ErrorMsg", "invalidWidgetType", type)
```

In other implementations, the visualization of the dashboard, such as assignment of colors to different dimension values; nesting of the results as groups with corresponding current coding; and visualization effects such as a "waterfall" effect representing transformation of one widget type to another can be achieved by using the following code:

```
#map of dim values which need to be colored (the key is the dim value,
the value is true)
    colorDim ValuesMap = { }
# nest the results using group, and optional color, dimensions
    rowKeyFct = utils.keyFct(groups)
    groups= utils.nest(results, [ rowKeyFct, utils.keyFct([ colorDim])])
# waterfall effect
    is Waterfall = @type is "waterfall"
```

Morphing Examples

Figure 3:
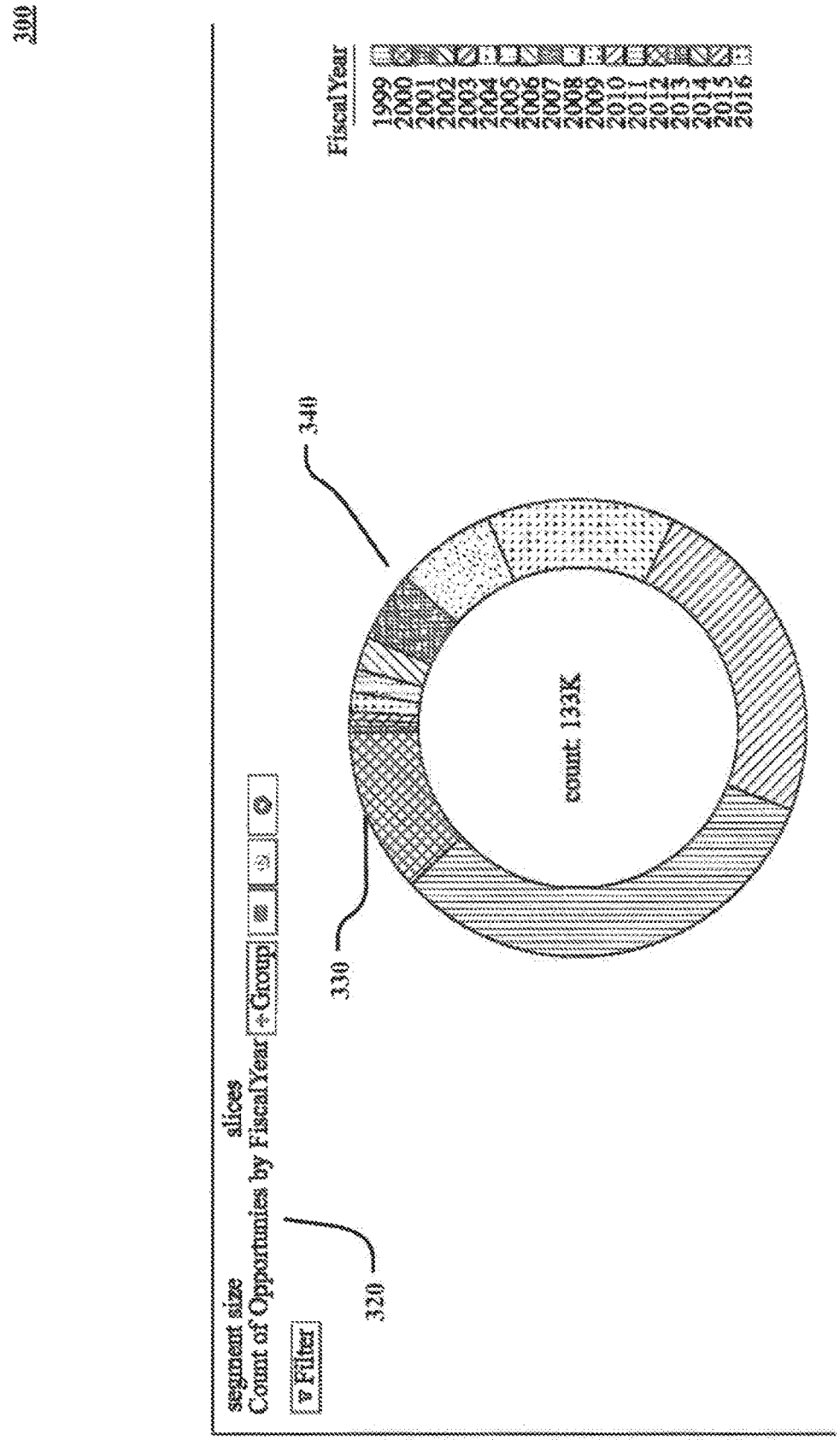
FIG. 3 shows an example pie chart visualization of opportunity by fiscal year.

Analysis of data can include filtering, regrouping, and choosing and adding visualization lenses. FIG. 3 shows query results for a count of opportunities by fiscal year 320 for an example analytic data structure—an opportunity EdgeMart 150. In this context, an opportunity refers to an opportunity to win a sale, as shown in pie chart 340. Note that dates in the following examples extend to 2016 to cover dates that opportunities are expected to close.

Regrouping Example: Pie Chart to Three Pie Charts

Figure 4:
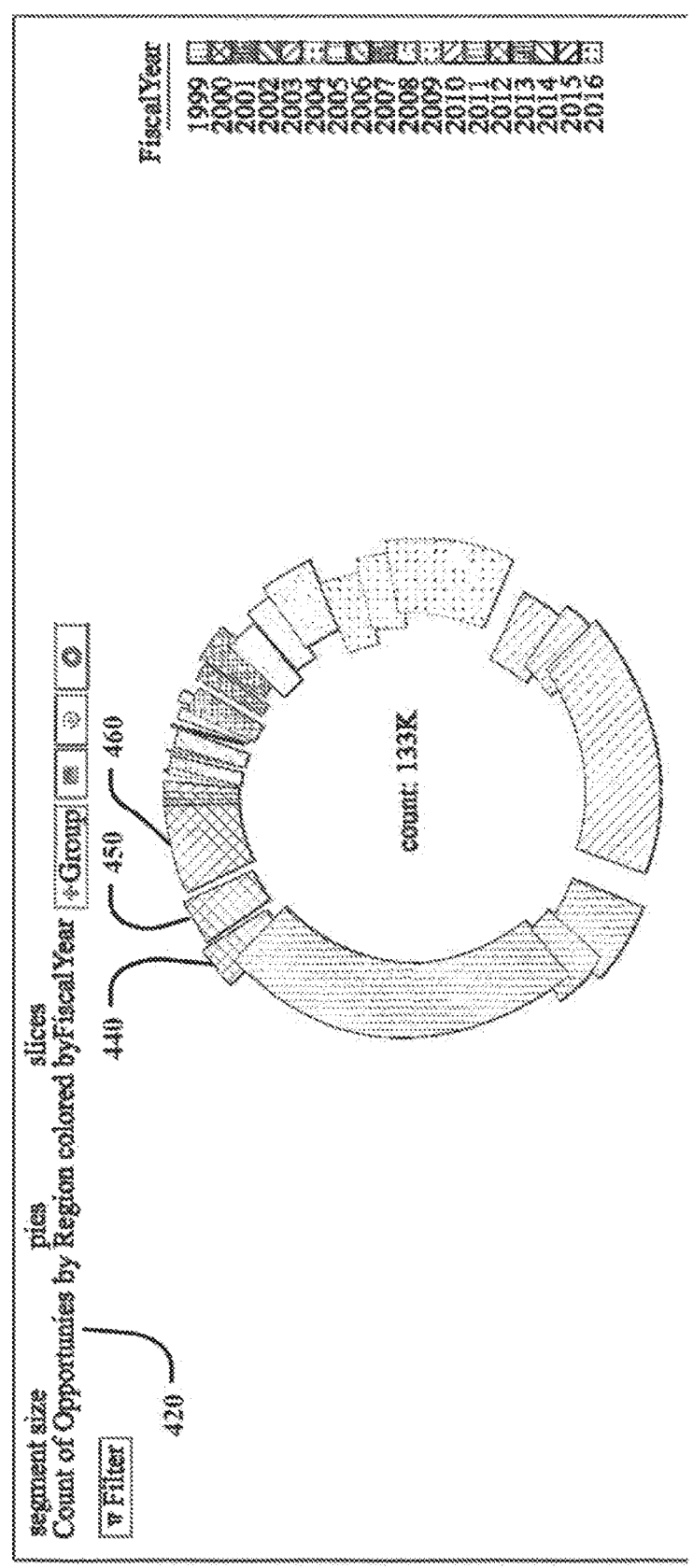
FIG. 4 shows an example pie chart visualization of opportunity by region by fiscal year, as an animation sequence begins.

An analyst may regroup the view shown in pie chart 340 to view opportunities by region, as well as fiscal year. FIG. 4 shows the data from pie chart 340—as segments begin to regroup to show a count of opportunities by region, coded by fiscal year 420. An animated projection of segments morphs the display panel from a first appearance as a single pie chart of count opportunities for all regions displayed by fiscal year, to a second appearance that filters and regroups the count of opportunities for each of three regions.

Figure 5A:
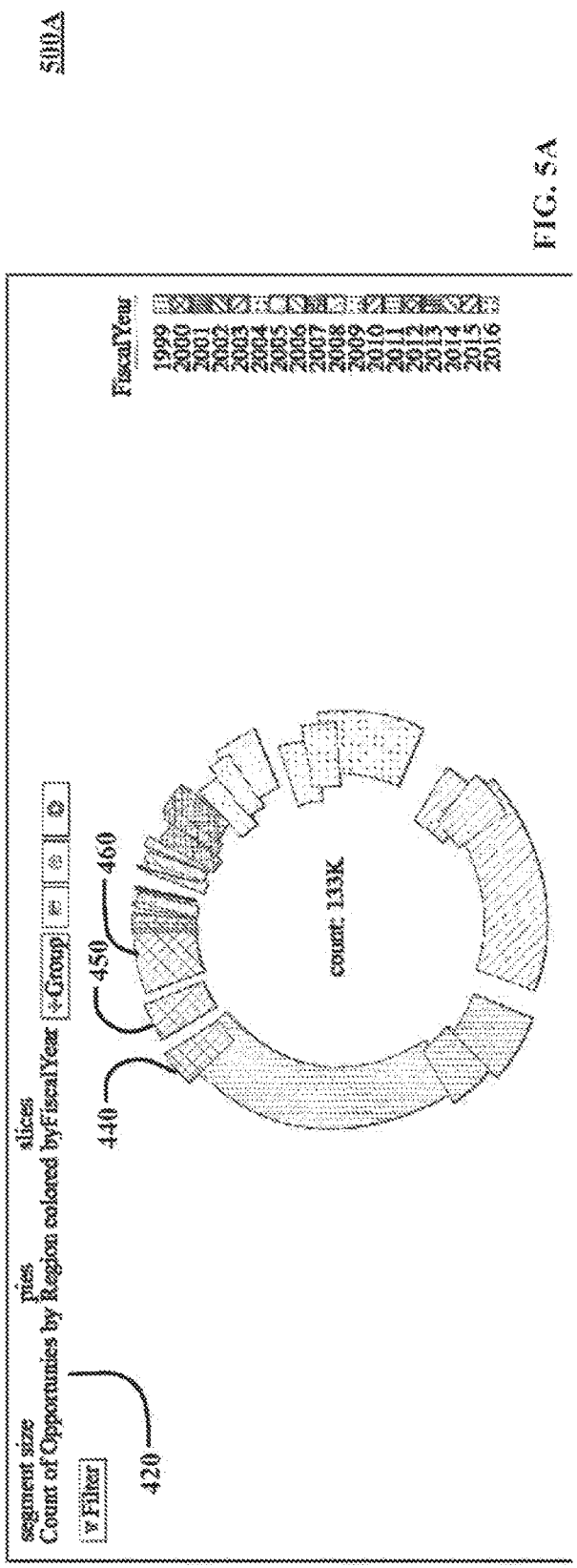
FIG. 5A through FIG. 5L show an animation progression for pie chart visualization of count of opportunities by region and fiscal year, morphing from a bar chart lens to a visualization option of a pie chart for each of three regions.
Figure 5B:
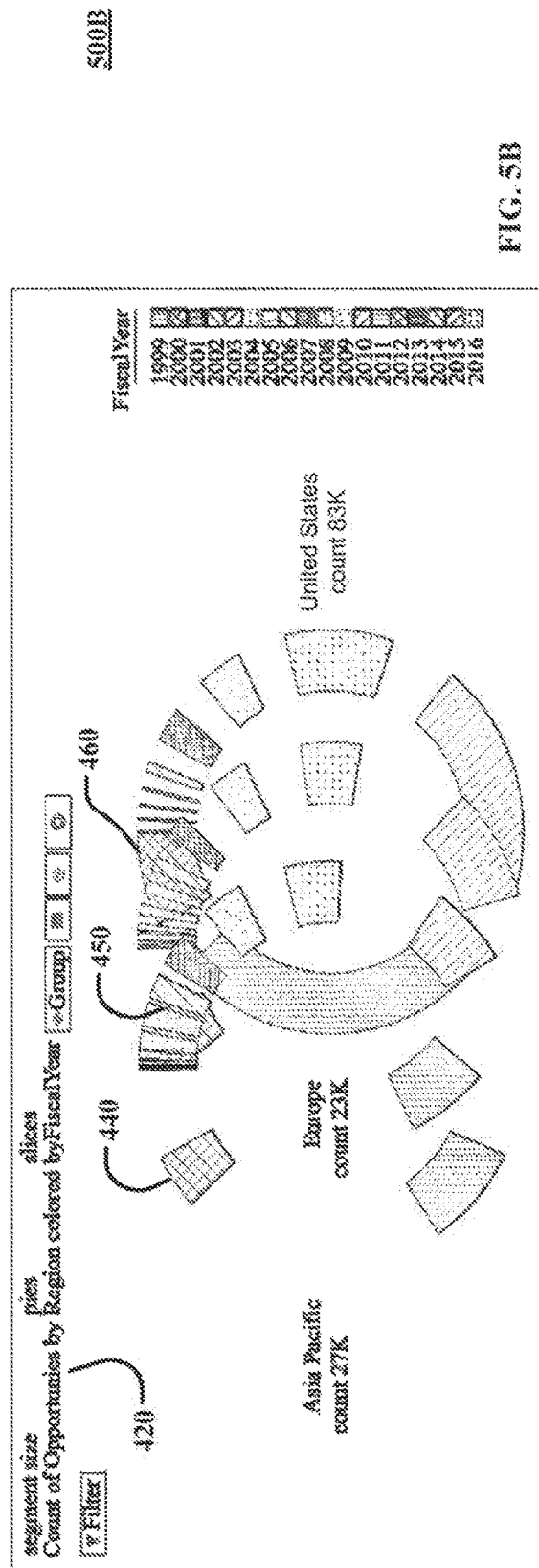
Figure 5C:
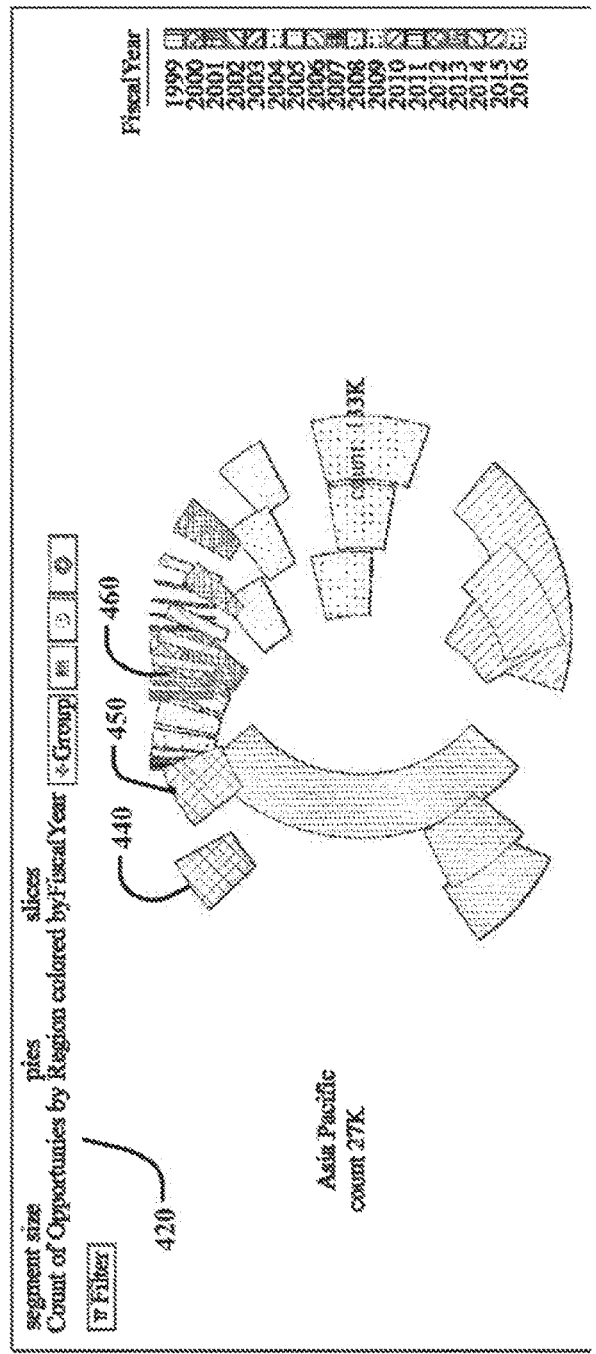
Figure 5D:
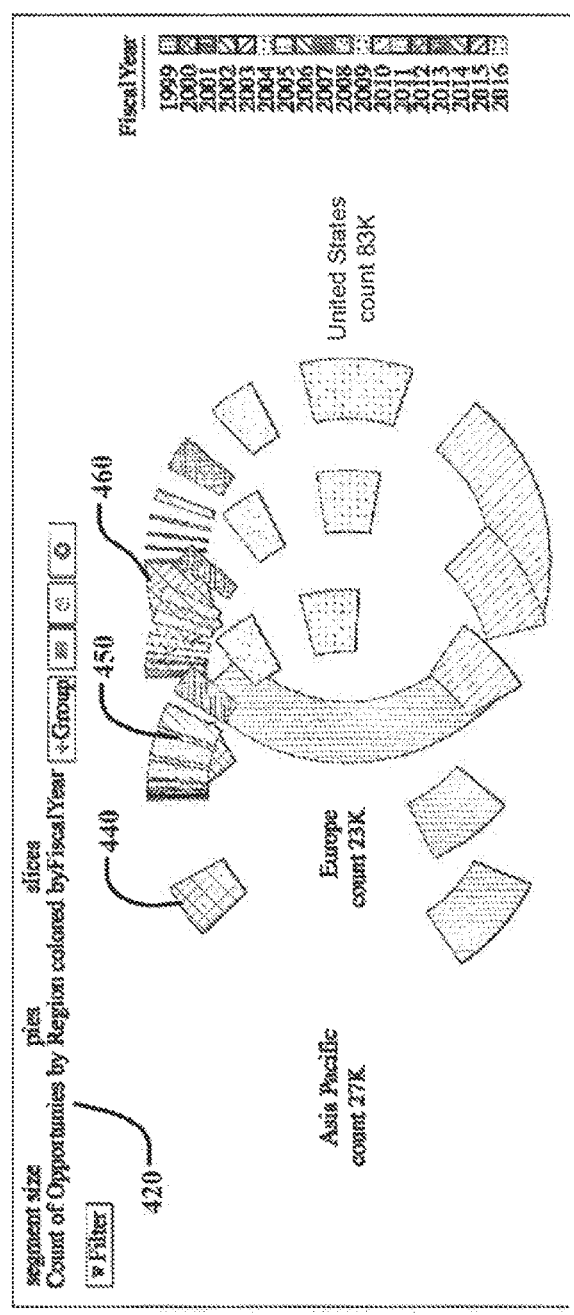
Figure 5E:
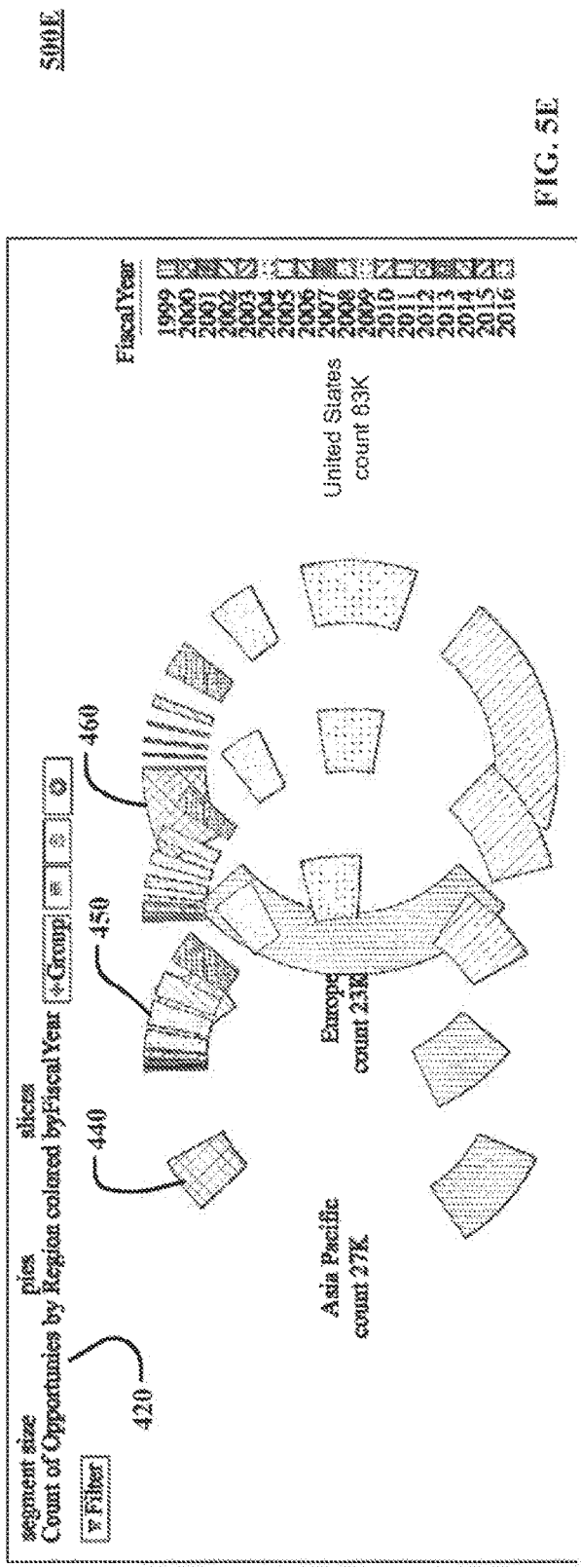
Figure 5F:
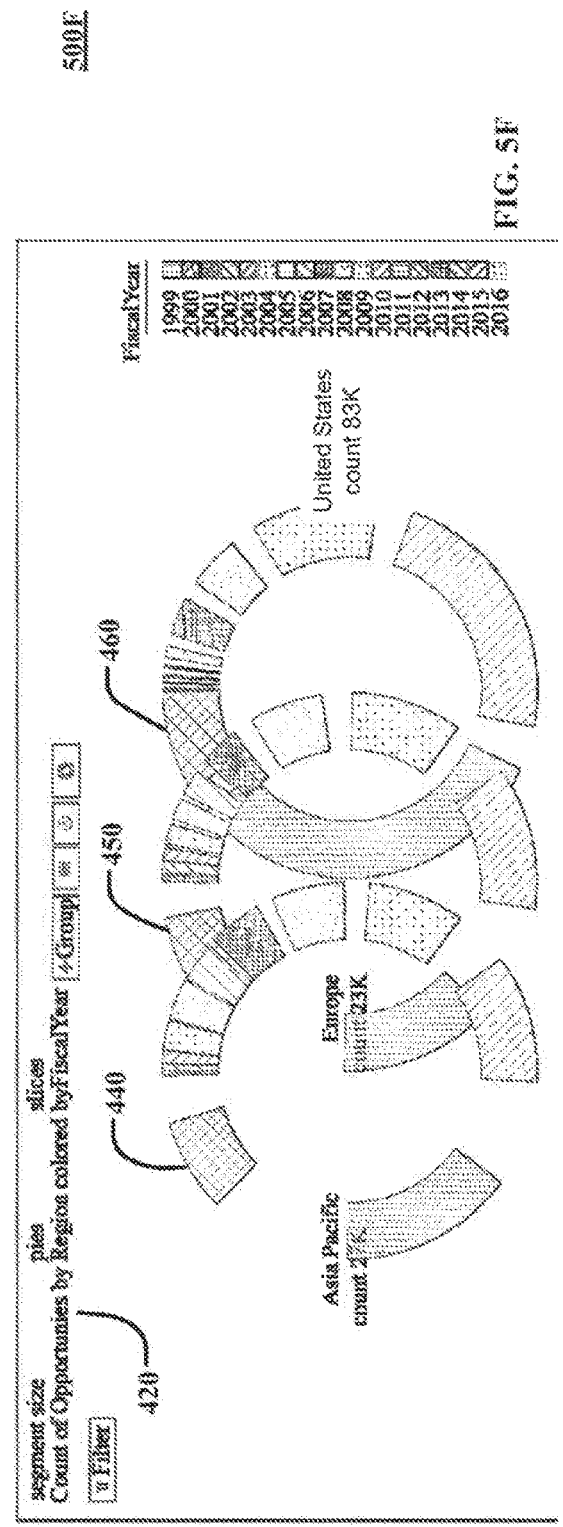
Figure 5G:
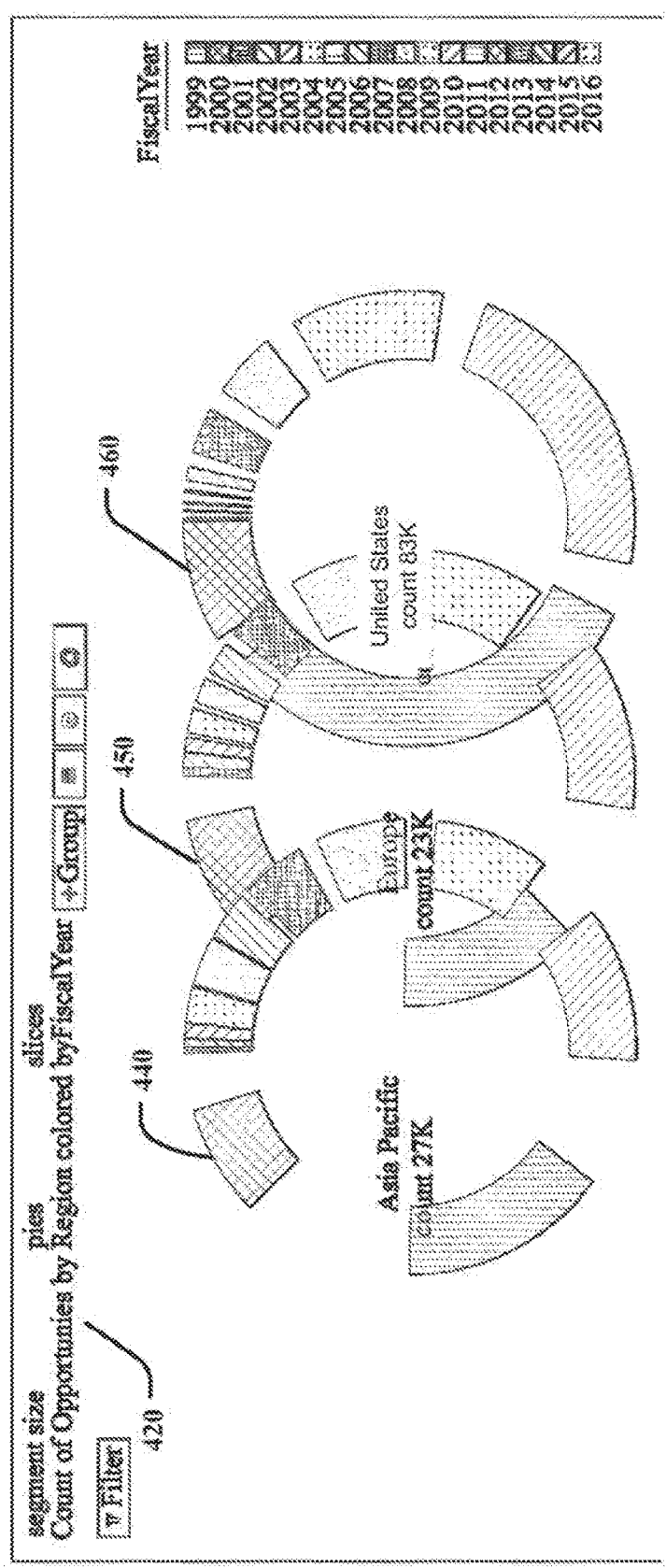
Figure 5H:
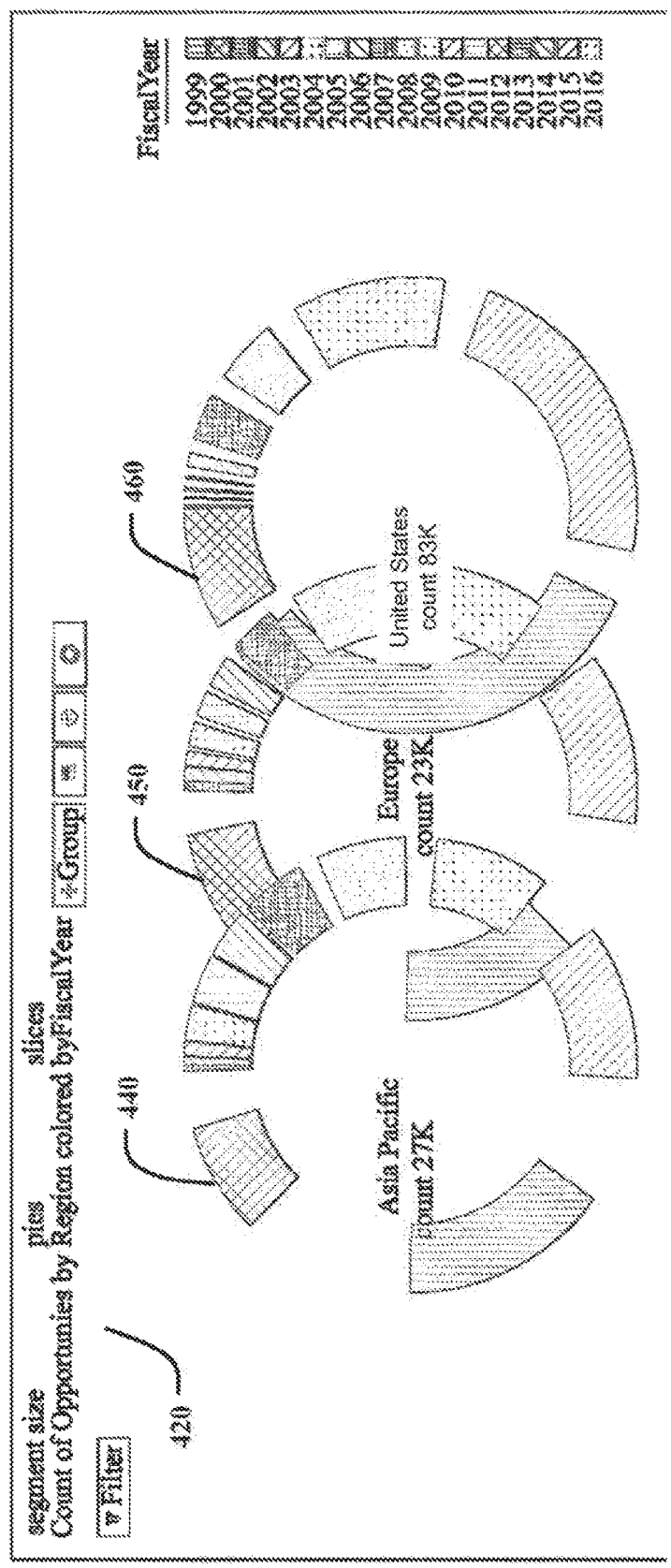
Figure 5I:
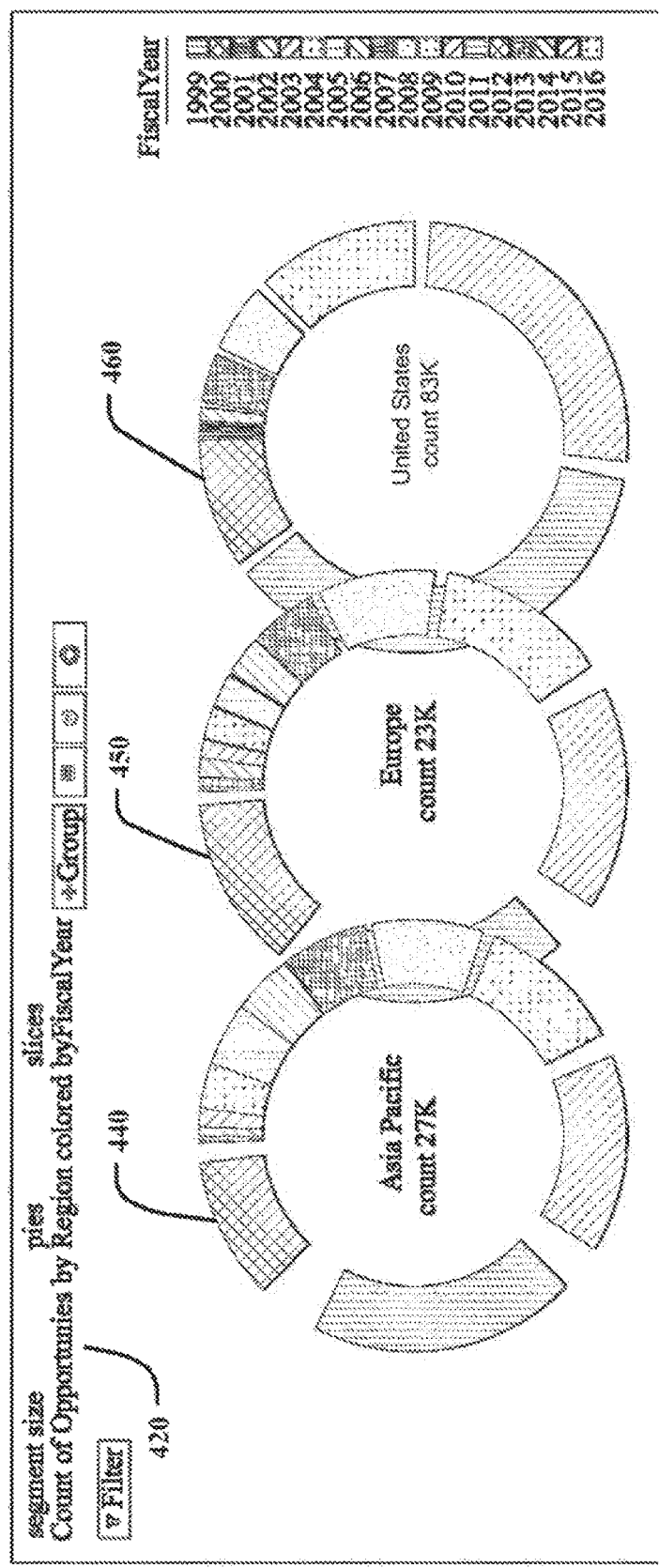
Figure 5J:
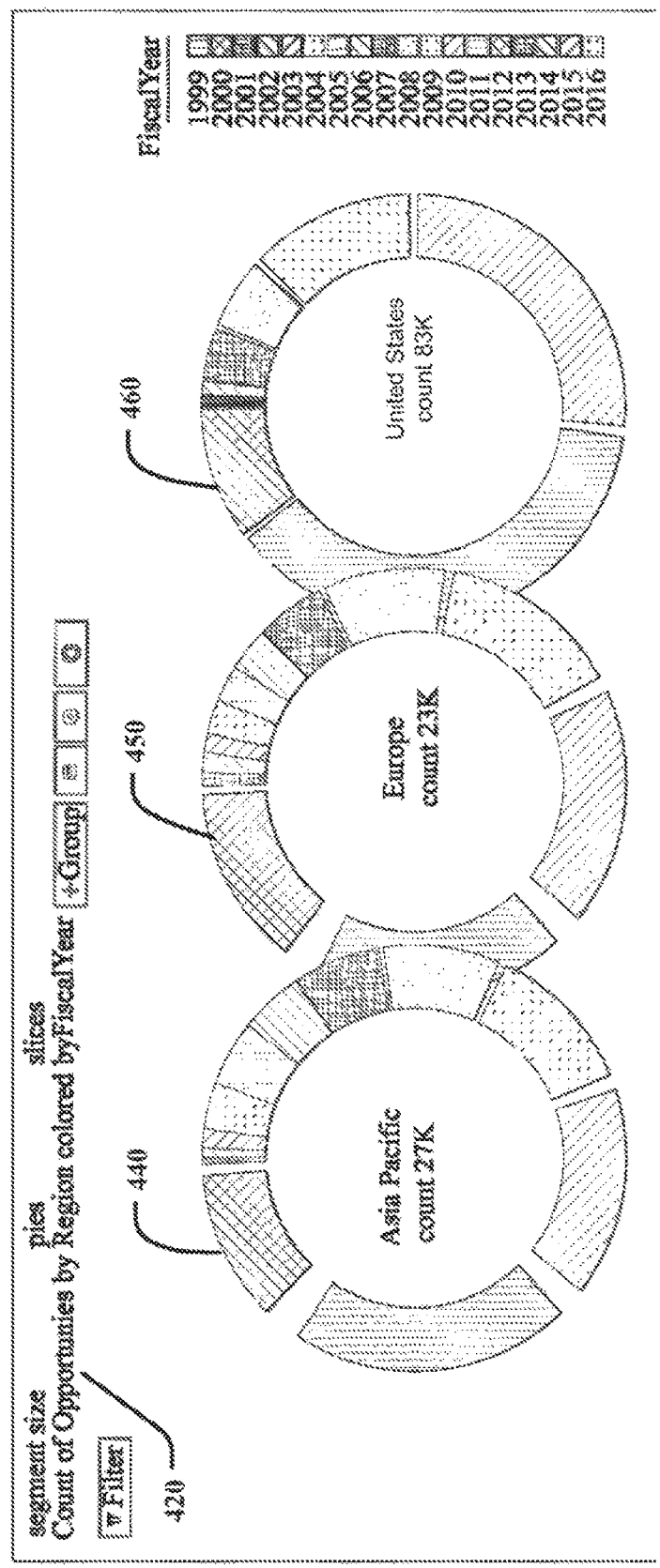
Figure 5K:
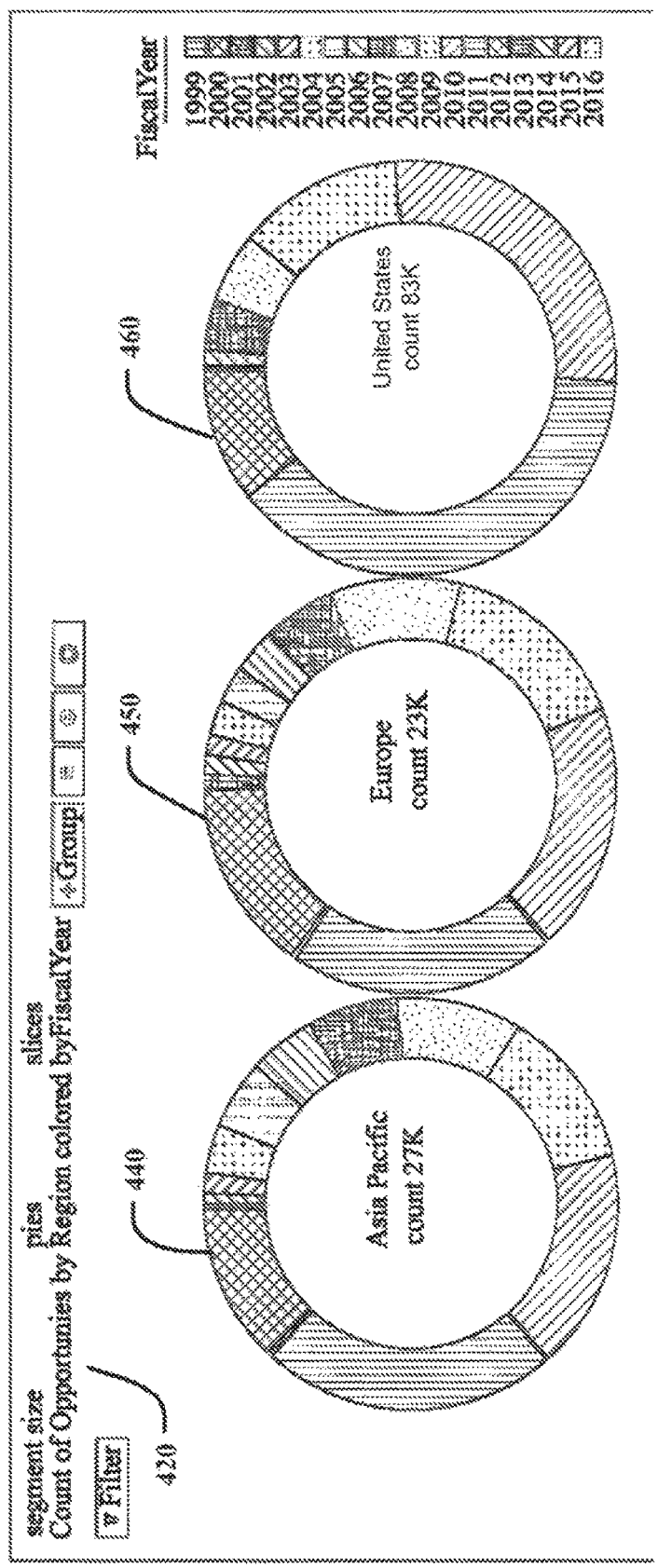
Figure 5L:
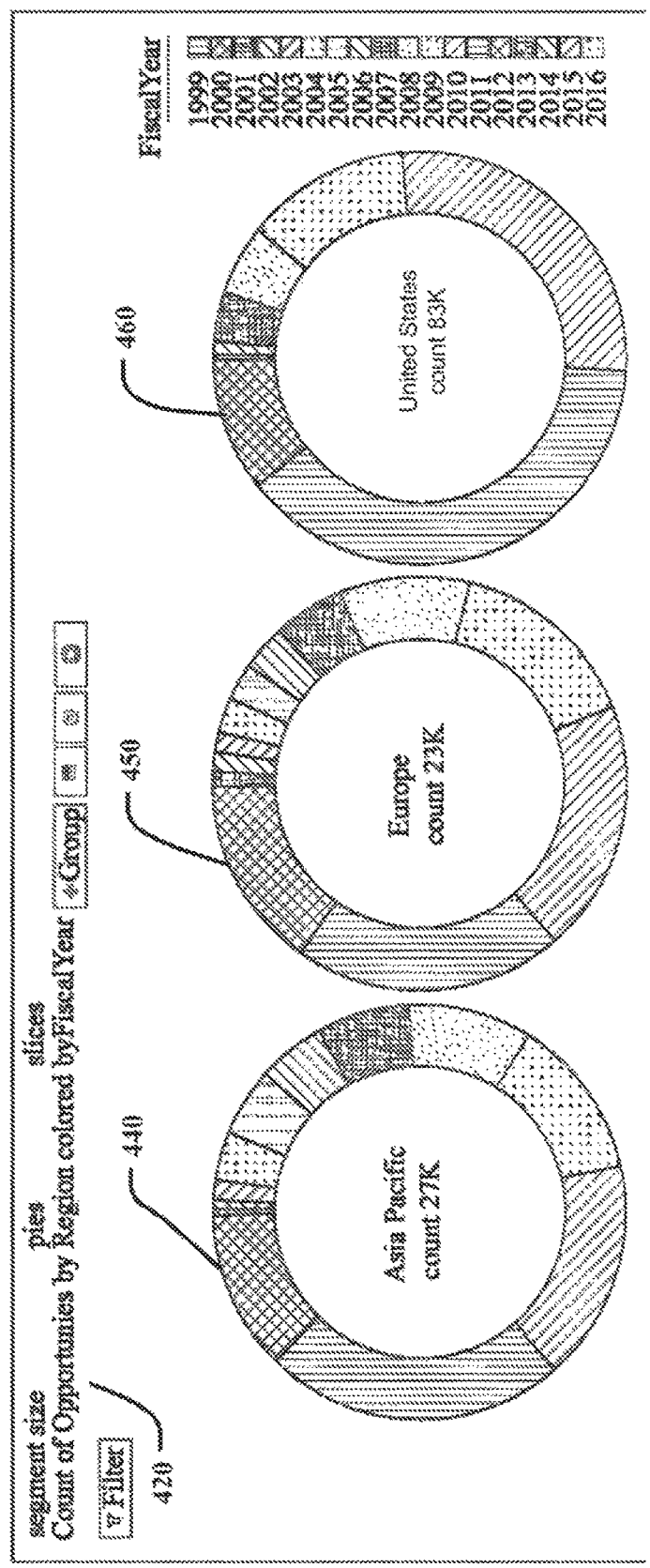

FIG. 5A through FIG. 5L show transitional panels in an animation progression for segments of pie chart 340. For example, the analyst can follow the year 2012 opportunity data segment 330 in FIG. 5B through FIG. 5L. As part of the animation progression, opportunity data segment 330 subdivides and regroups, morphing to segments for Asia Pacific 440, Europe 450 and United States 460—representing the opportunities for the year 2012 for each of the 3 respective regions. Similarly, the analyst can follow the animation progression for any of the fiscal years represented in the pie chart 340. In FIG. 5L we see opportunity counts for Asia Pacific 440, Europe 450 and the United States 460, with data counts coded by fiscal year in three separate pie charts.

Visualization Lens Change Example: Bar Chart to Three Pie Charts

Figure 6A:
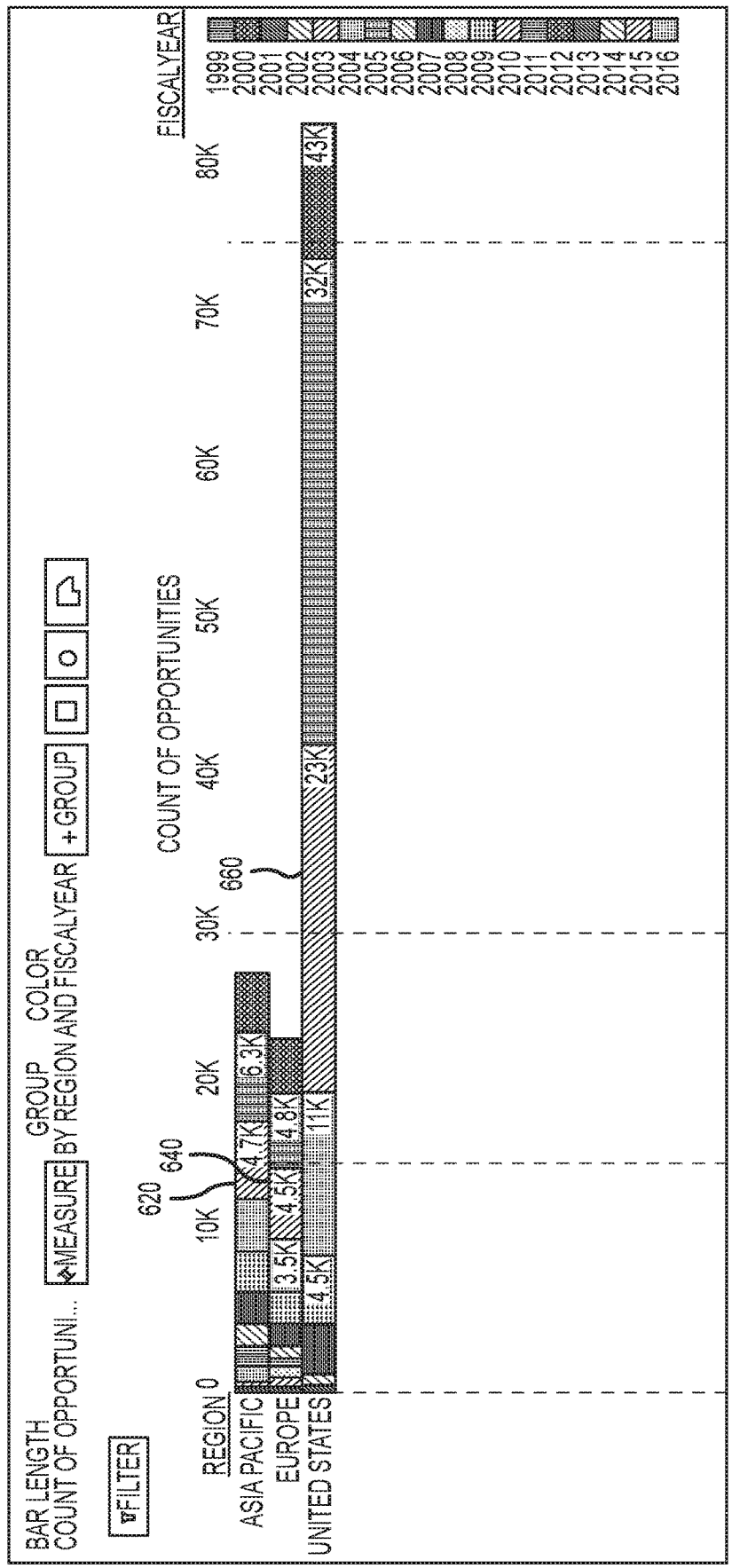
FIG. 6A through FIG. 6N show an animation sequence for a count of opportunities by region and fiscal year, morphing from a bar chart lens to a visualization option with a pie chart for each of three regions.
Figure 6B:
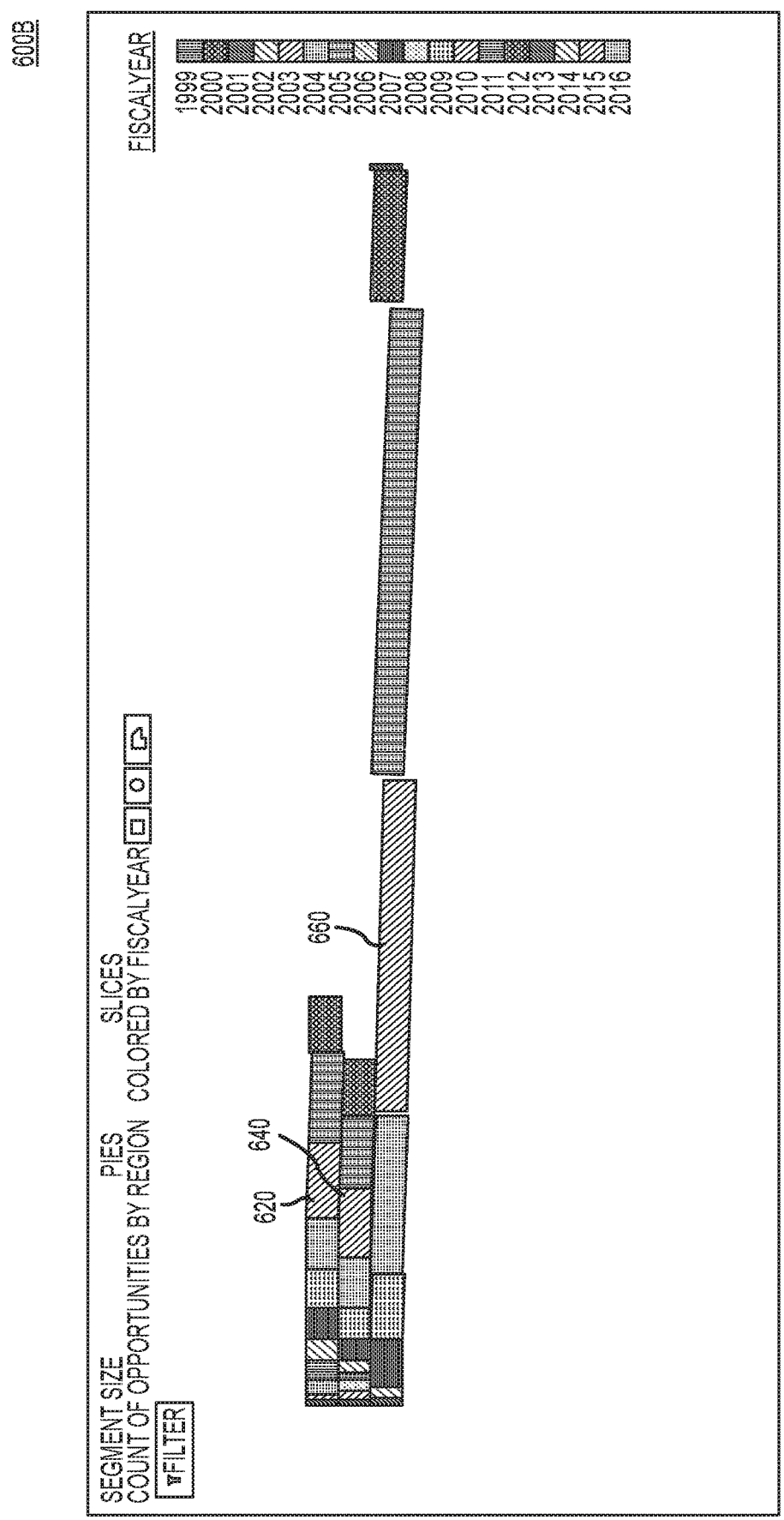
Figure 6C:
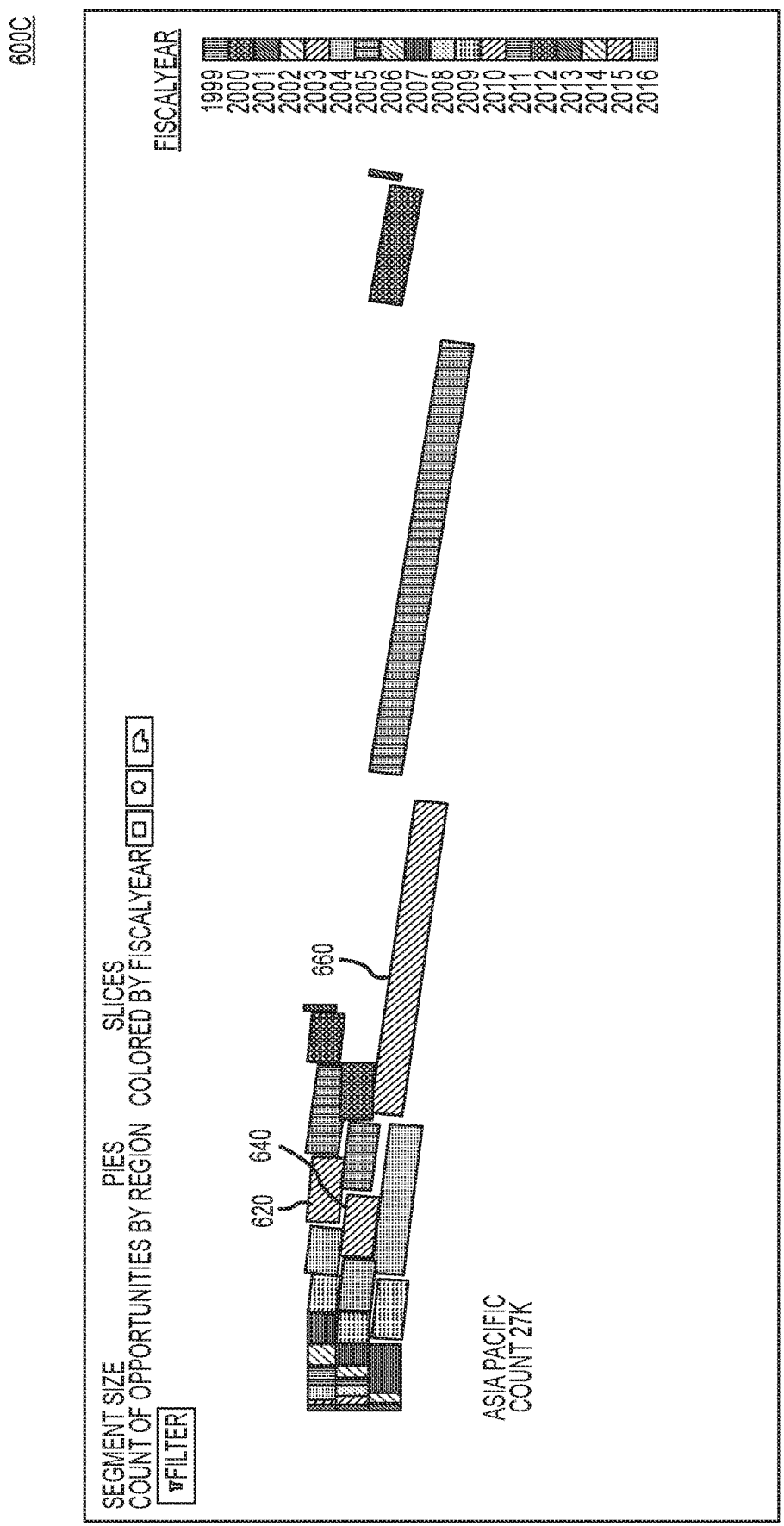
Figure 6D:
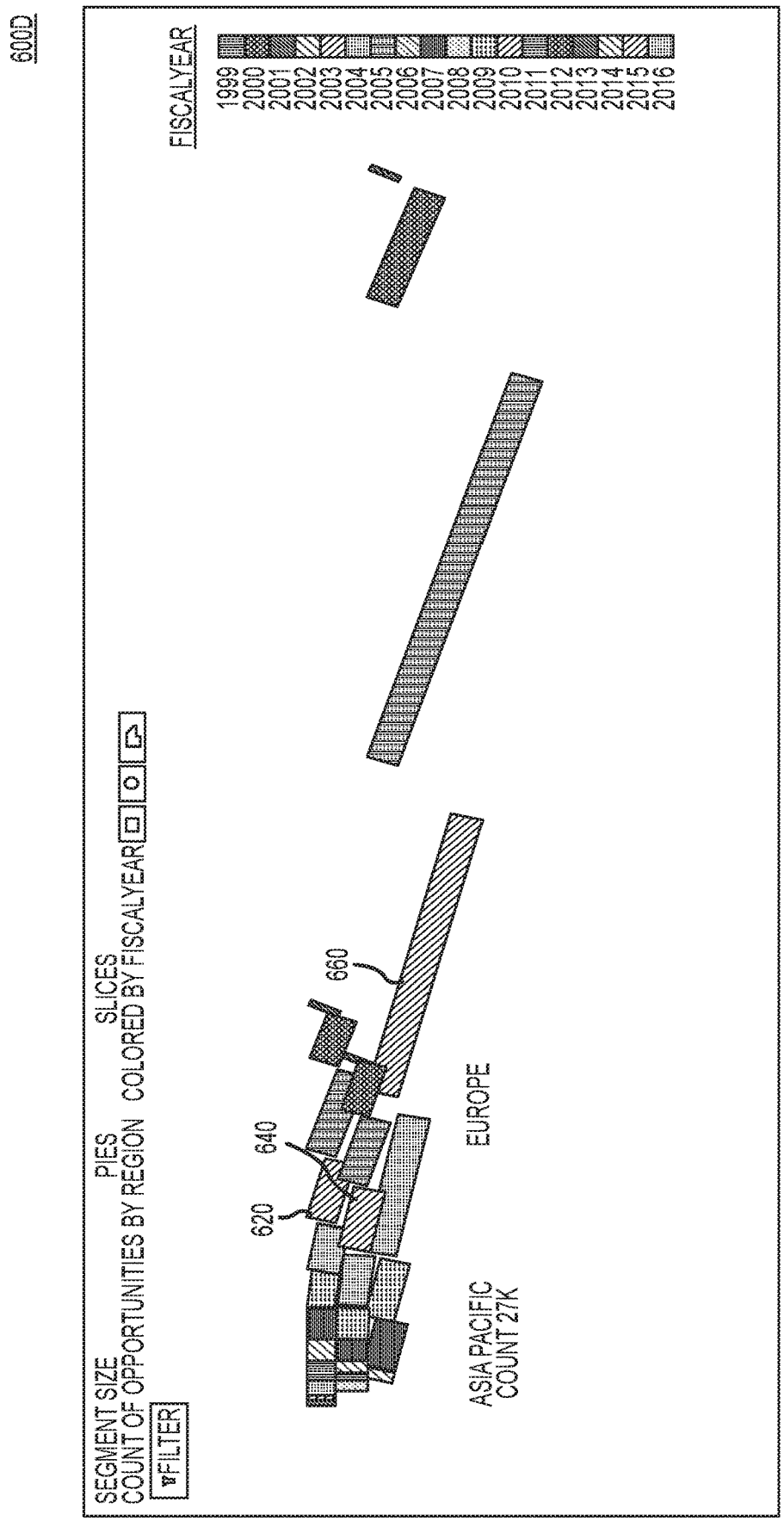
Figure 6F:
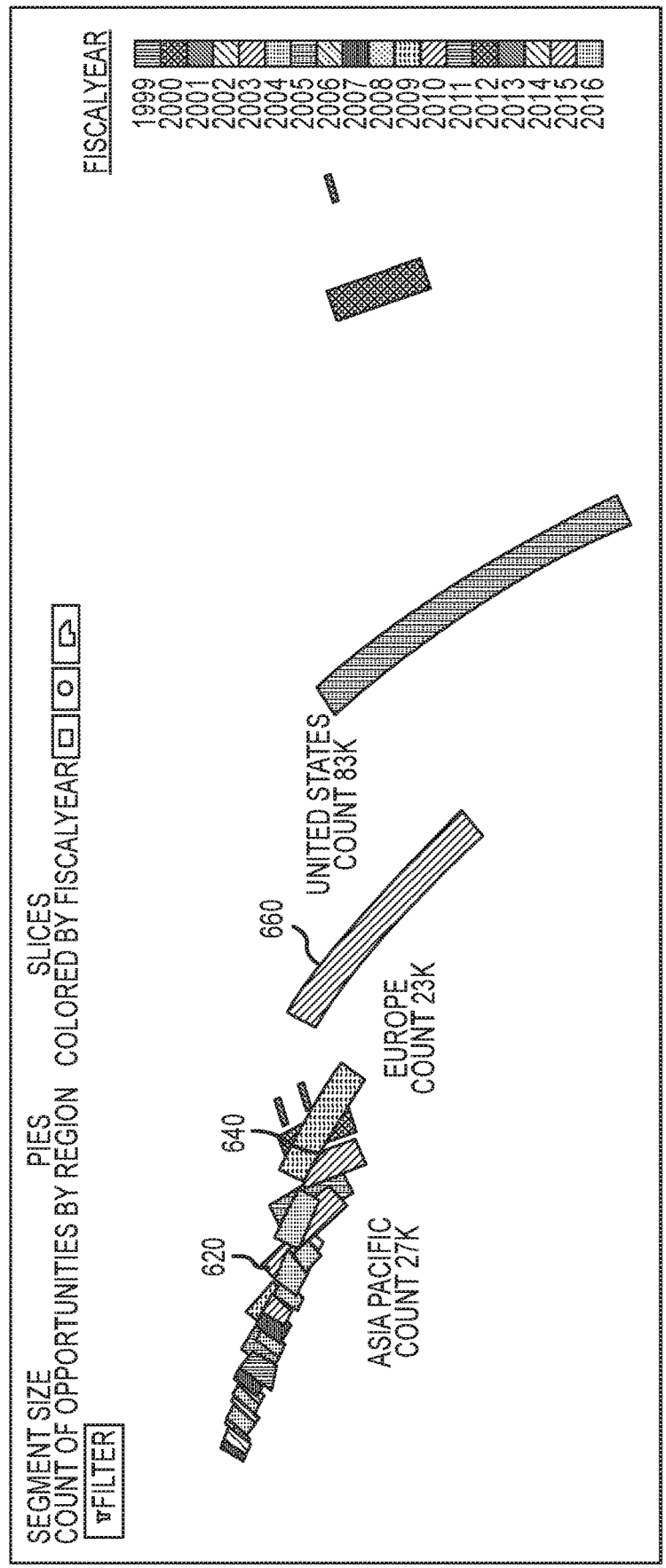
Figure 6G:
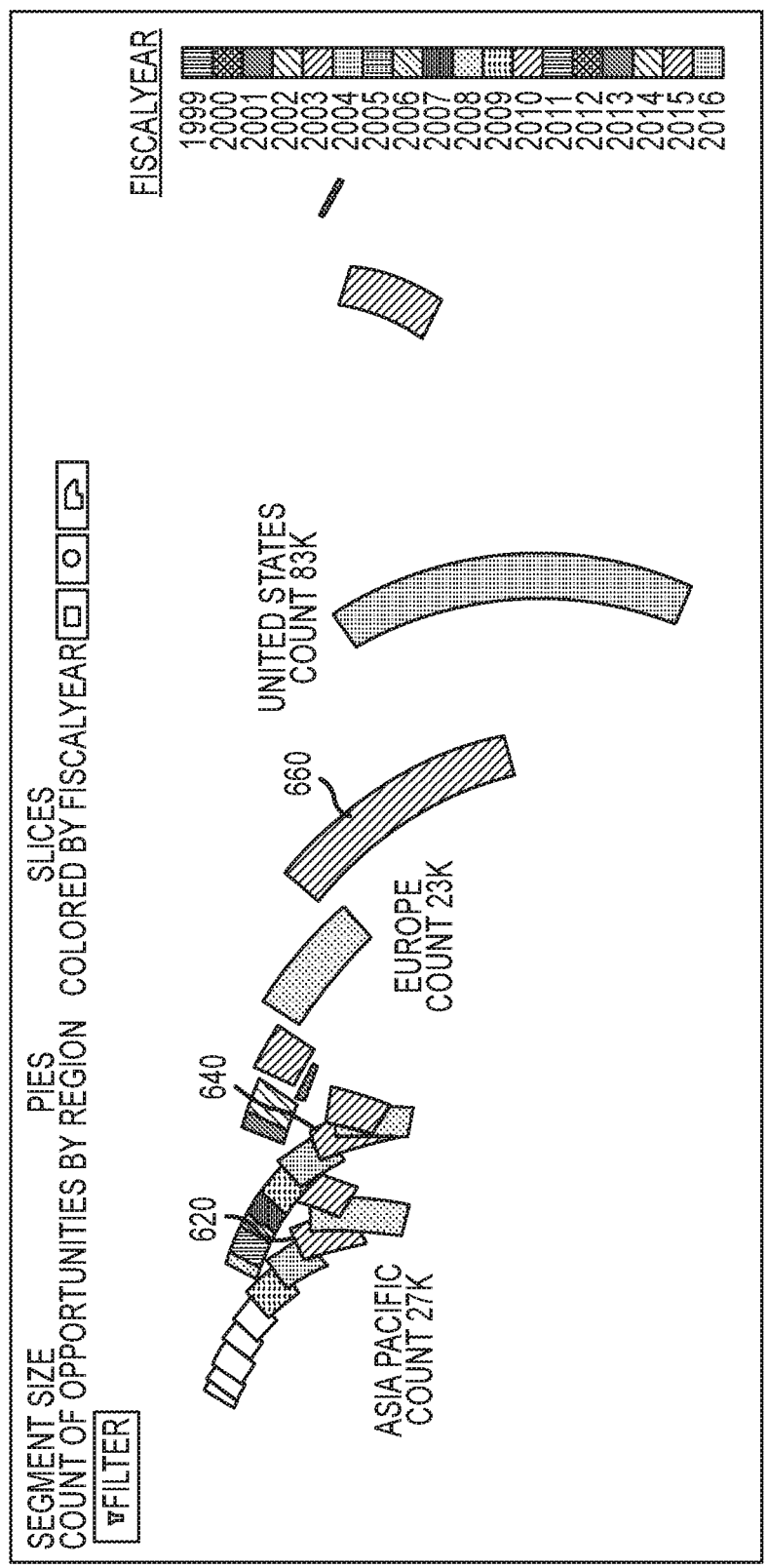
Figure 6H:
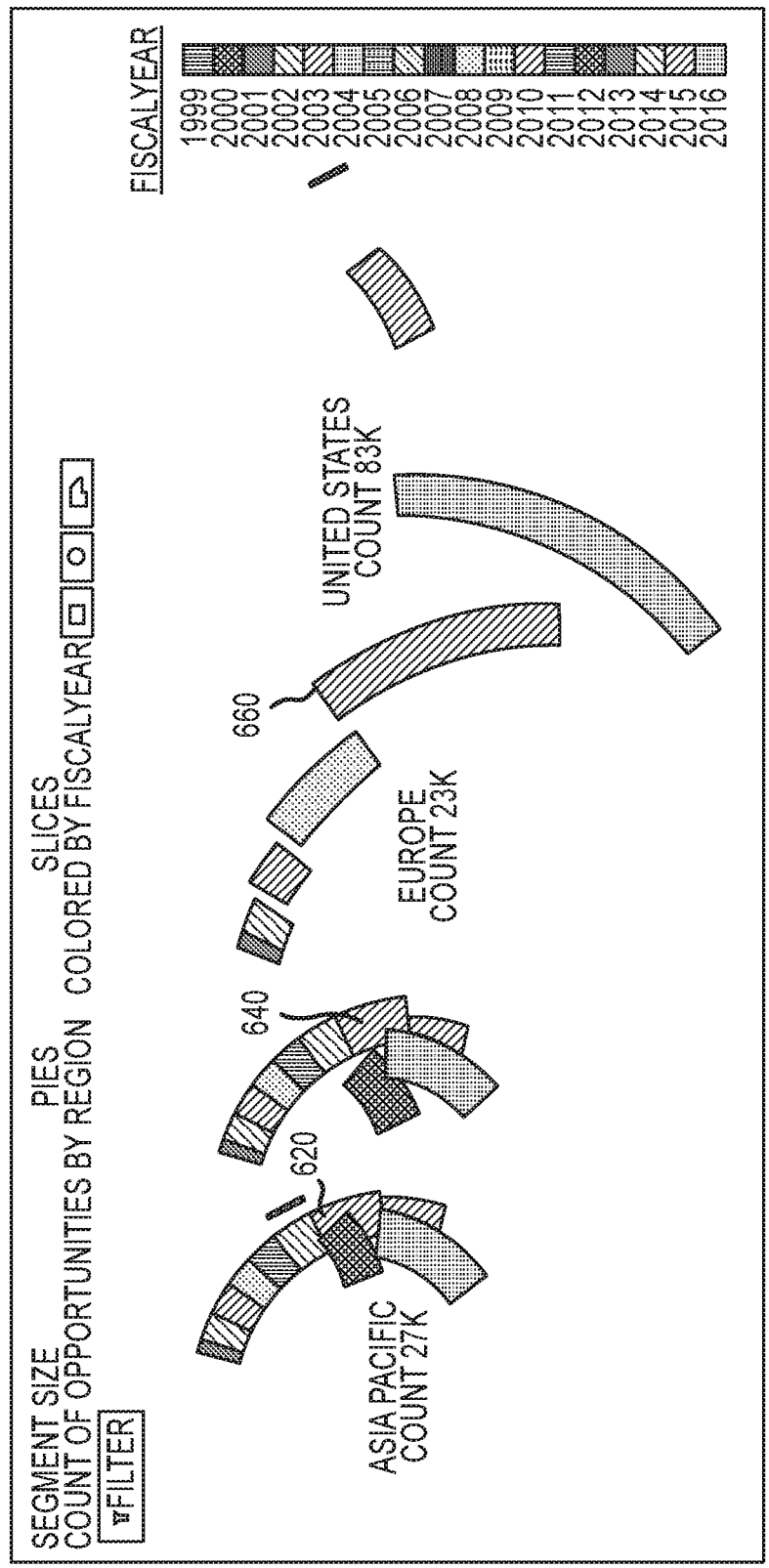
Figure 6I:
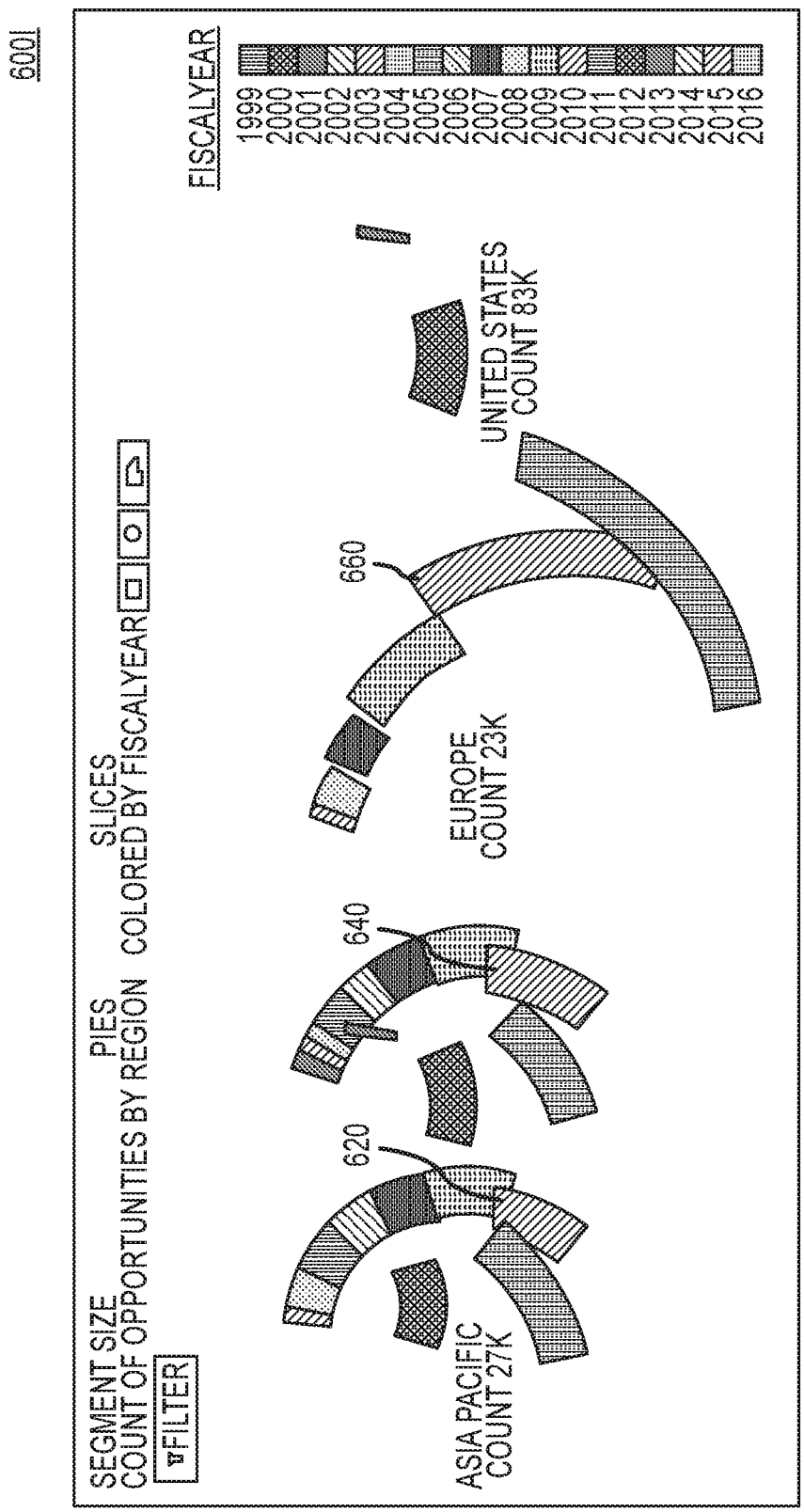
Figure 6J:
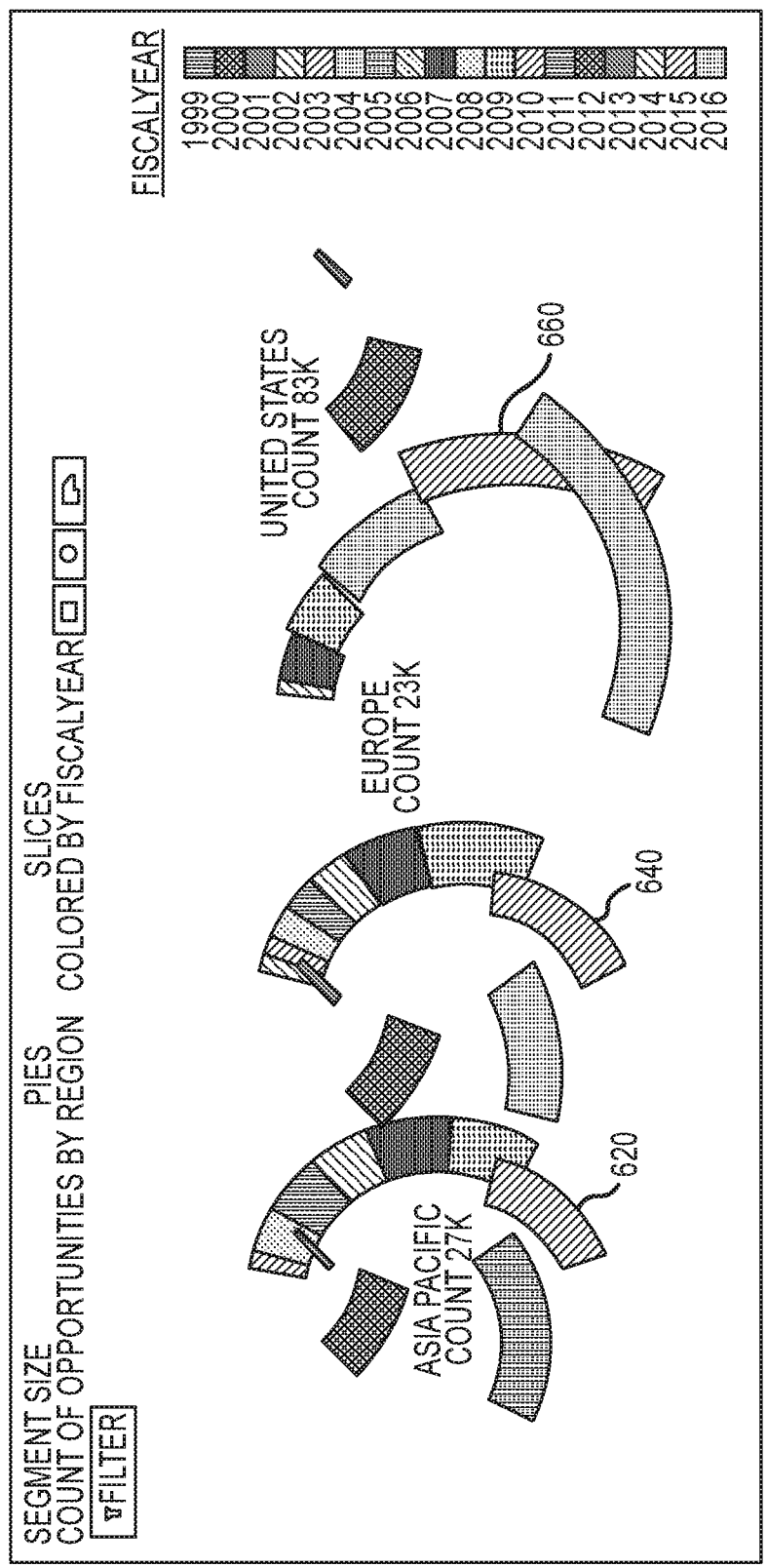
Figure 6K:
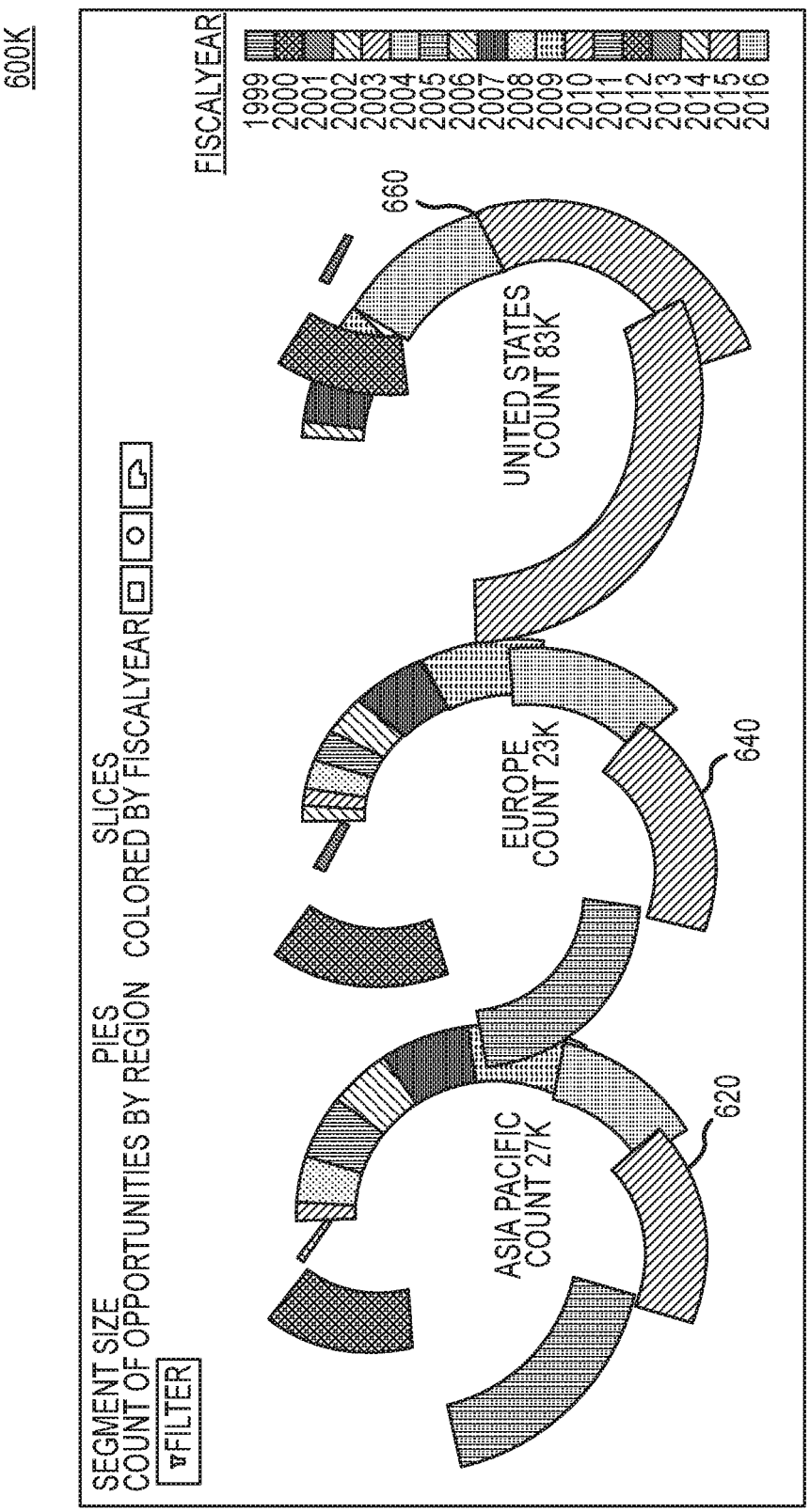
Figure 6L:
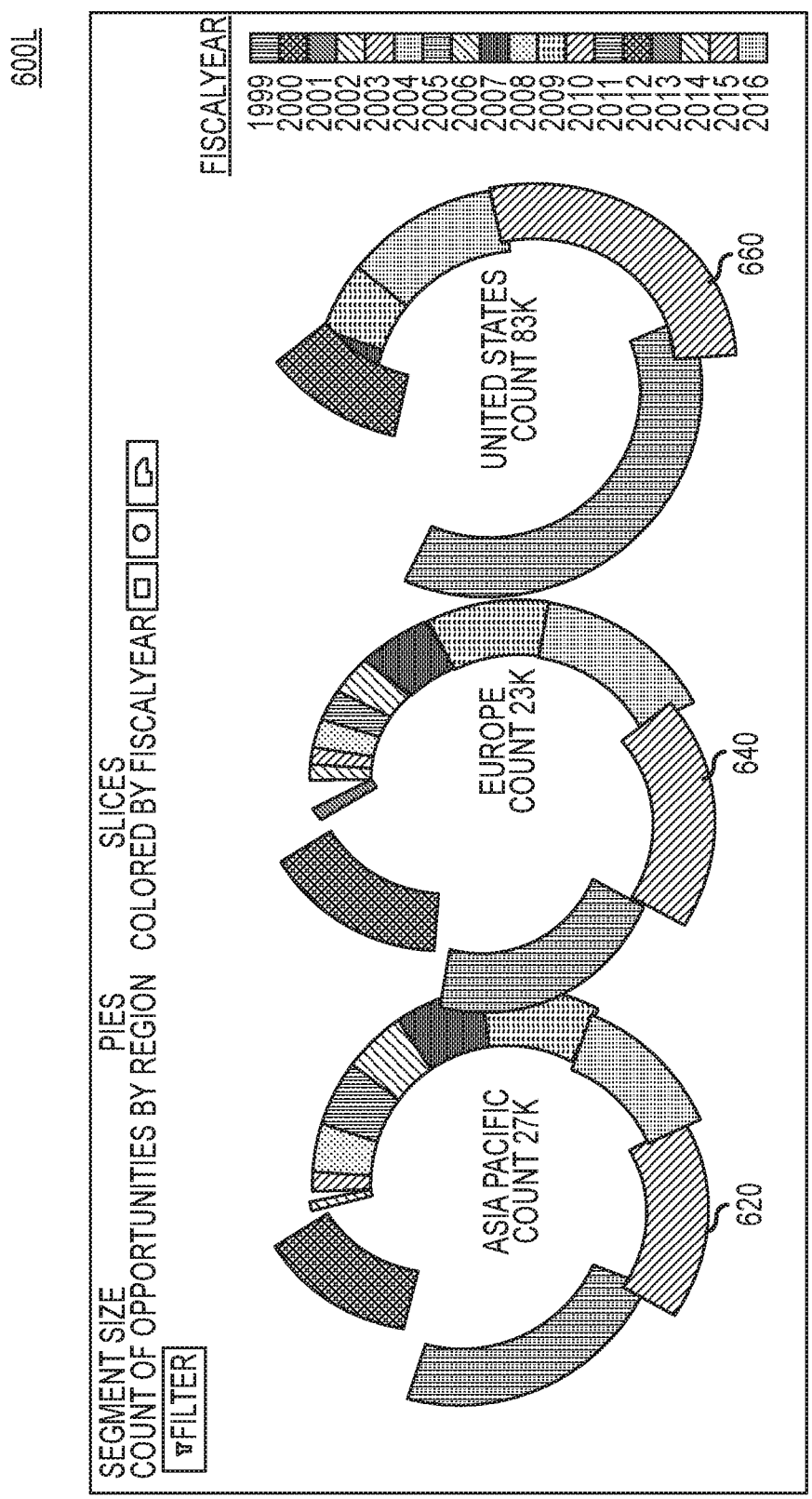

The morphing engine 250 can also implement data visualization lens changes. For example, a data analyst may want to present opportunity data by region by fiscal year for a team meeting, using different visualization options. FIG. 6A shows a single bar chart that represents a count of opportunities by region by fiscal year. An analyst may choose to present this data as a series of three pie charts: one for each region, by fiscal year.

Figure 6N:
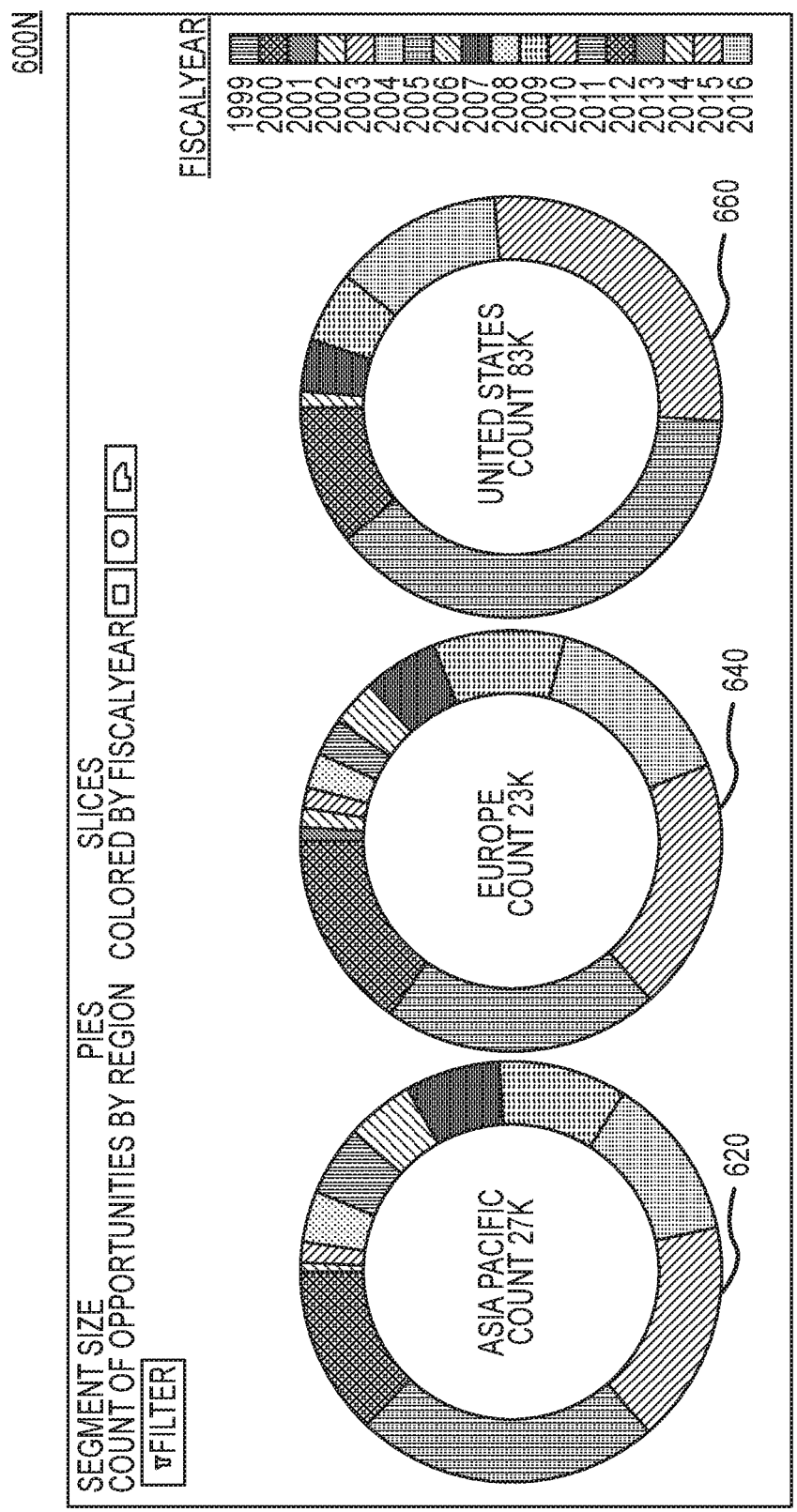

FIG. 6A through FIG. 6N show animation projections for the morphing action, from an initial appearance through an animation sequence to a second appearance. Animating the projection of segments of a bar chart into sub-arcs of three pie charts, the segments curve and reposition during the animation, for the regional data by fiscal year. The analyst can follow the animation progression for any of the fiscal years represented in the pie chart 340. For example, in FIG. 6A through FIG. 6N, the 2012 opportunity counts for Asia Pacific 620, Europe 640, and United States 660 are tagged. The analyst can also review sales histories for the different regions over time, considering the fiscal year details of the regional data.

Dashboard Animation

Figure 7A:
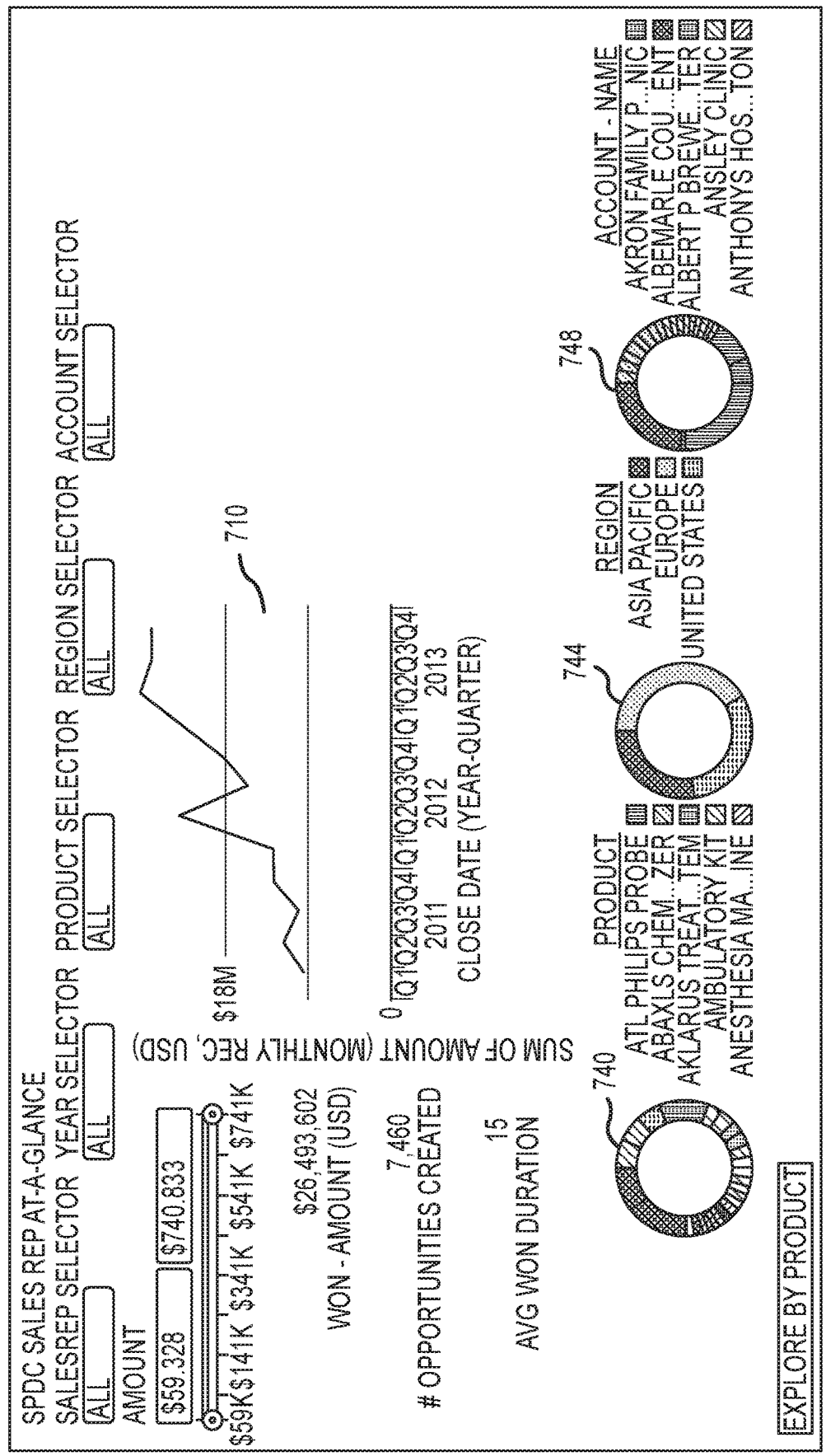
FIG. 7A shows an example dashboard with four display panels.
Figure 7B:
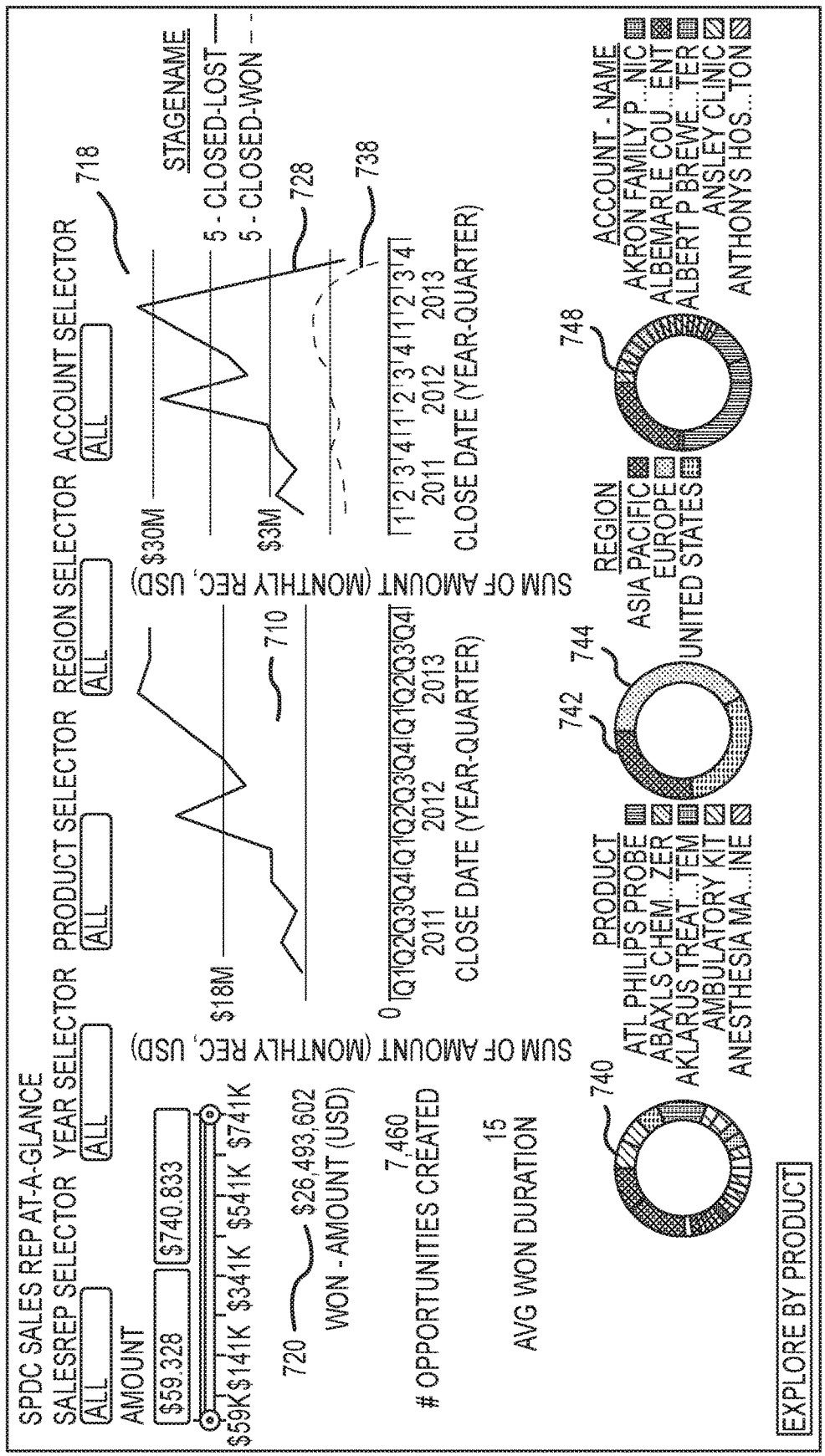
FIG. 7B shows an example dashboard with five display panels.

Analysts can use a live dashboard to review sales data. For example, FIG. 7A shows a sales rep at-a-glance dashboard that includes a graph of amount received in dollars by close date (year-quarter) 710 along with 3 pie charts that show the breakdown by product chart 740, region chart 744 and account name chart 748. To drill down and learn more, an analyst can add a visualization lens for sums won and sums lost as a function of the close date 718. FIG. 7B shows the sales rep at-a-glance dashboard with this new visualization lens for sums won and sums lost as a function of the close date 718 added—a plot of the amount received in dollars, filtered by opportunities lost 738 and opportunities won (sales) 728. The analyst benefits from seeing that the story being told is well represented in graphs of actual data, immediately upon adding the new graph panel to the dashboard. Mistakes in panel configuration and size issues with visualization are immediately apparent.

Dashboard Widget and Query Step Examples

Figure 7C:
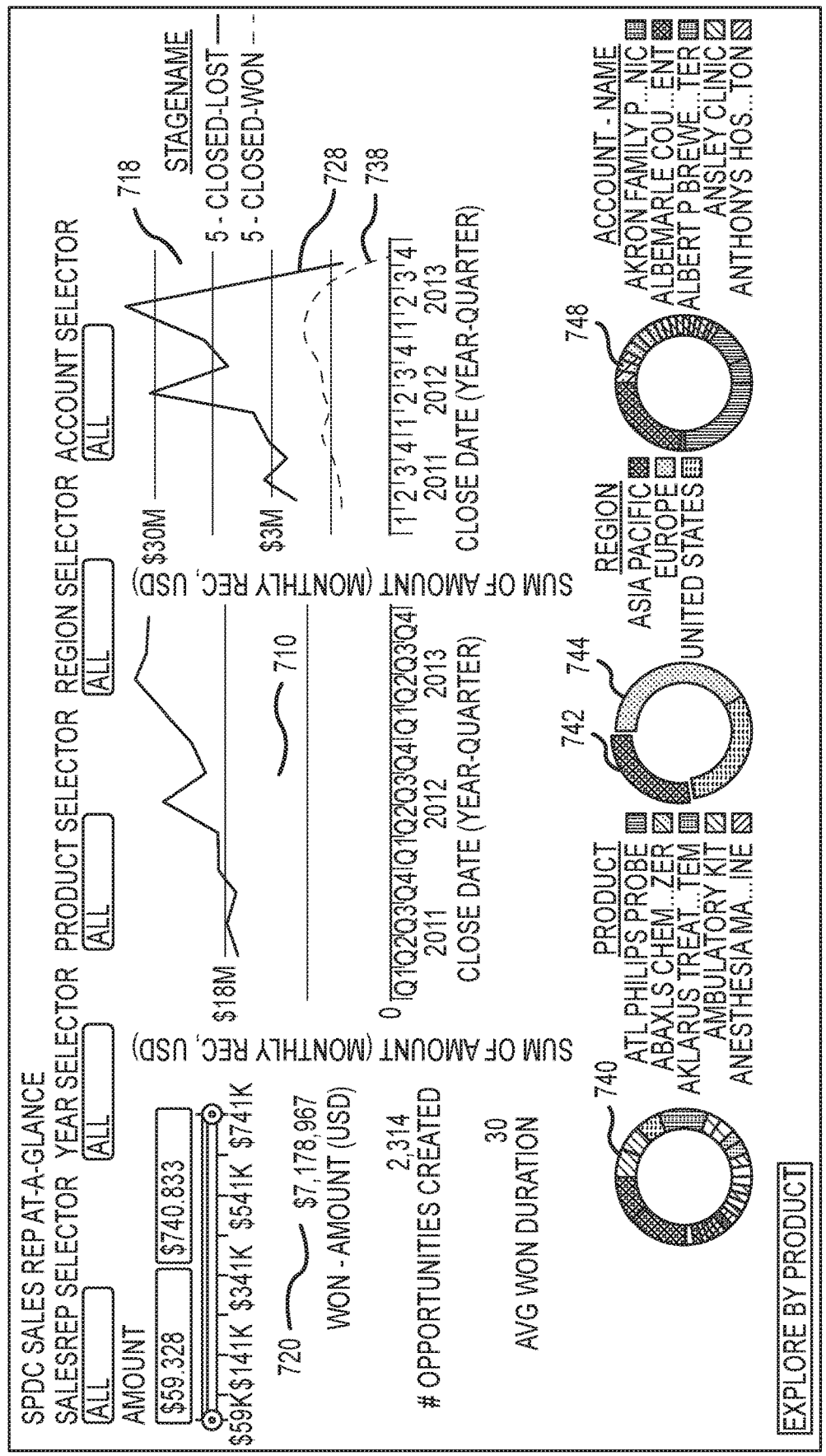
FIG. 7C shows an example dashboard with a specific region selected on one of the five display panels.
Figure 7D:
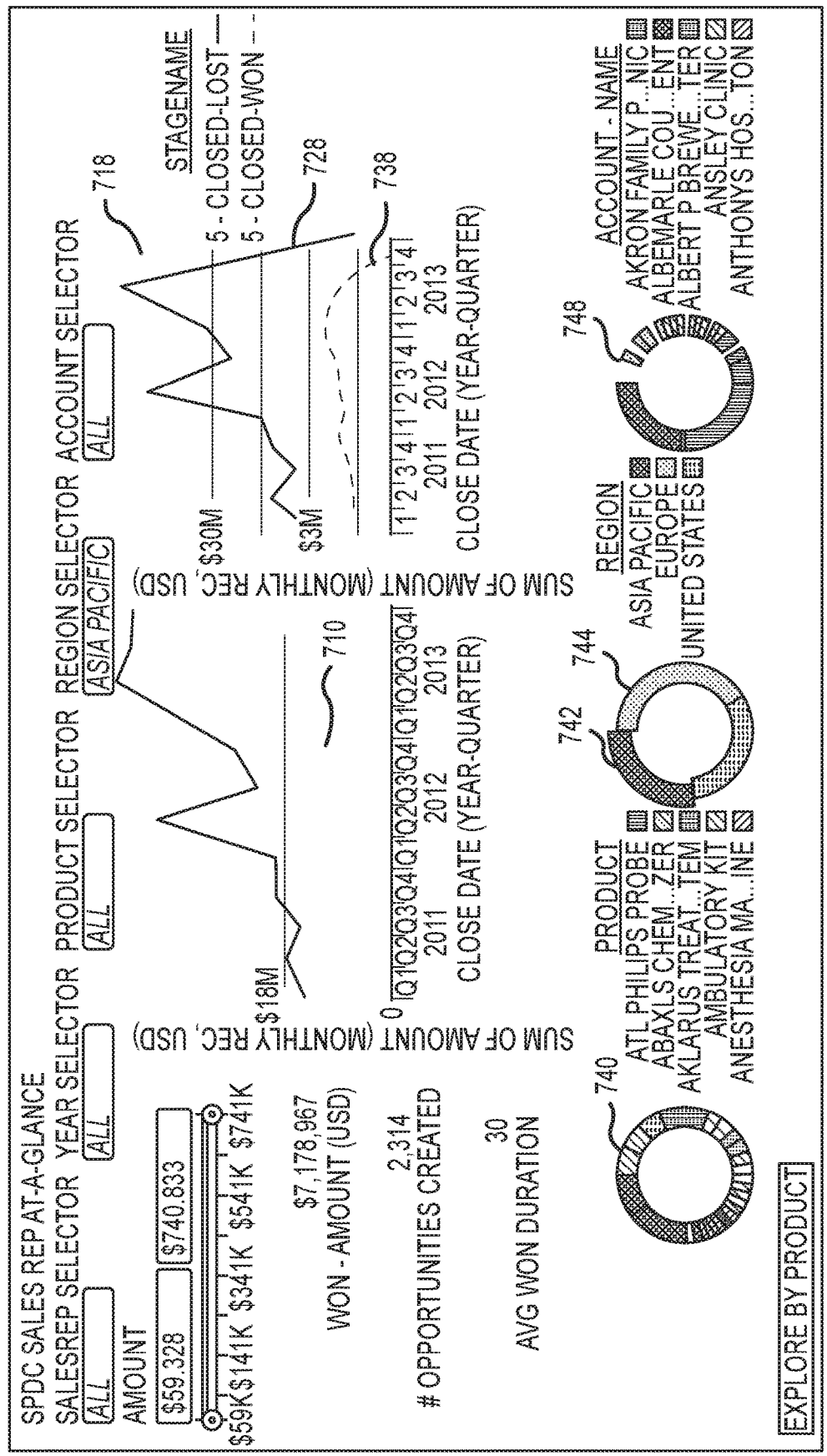
FIG. 7D through FIG. 7M shows an animation sequence for dashboard with a specific region segment selected on one of the five display panels.
Figure 7E:
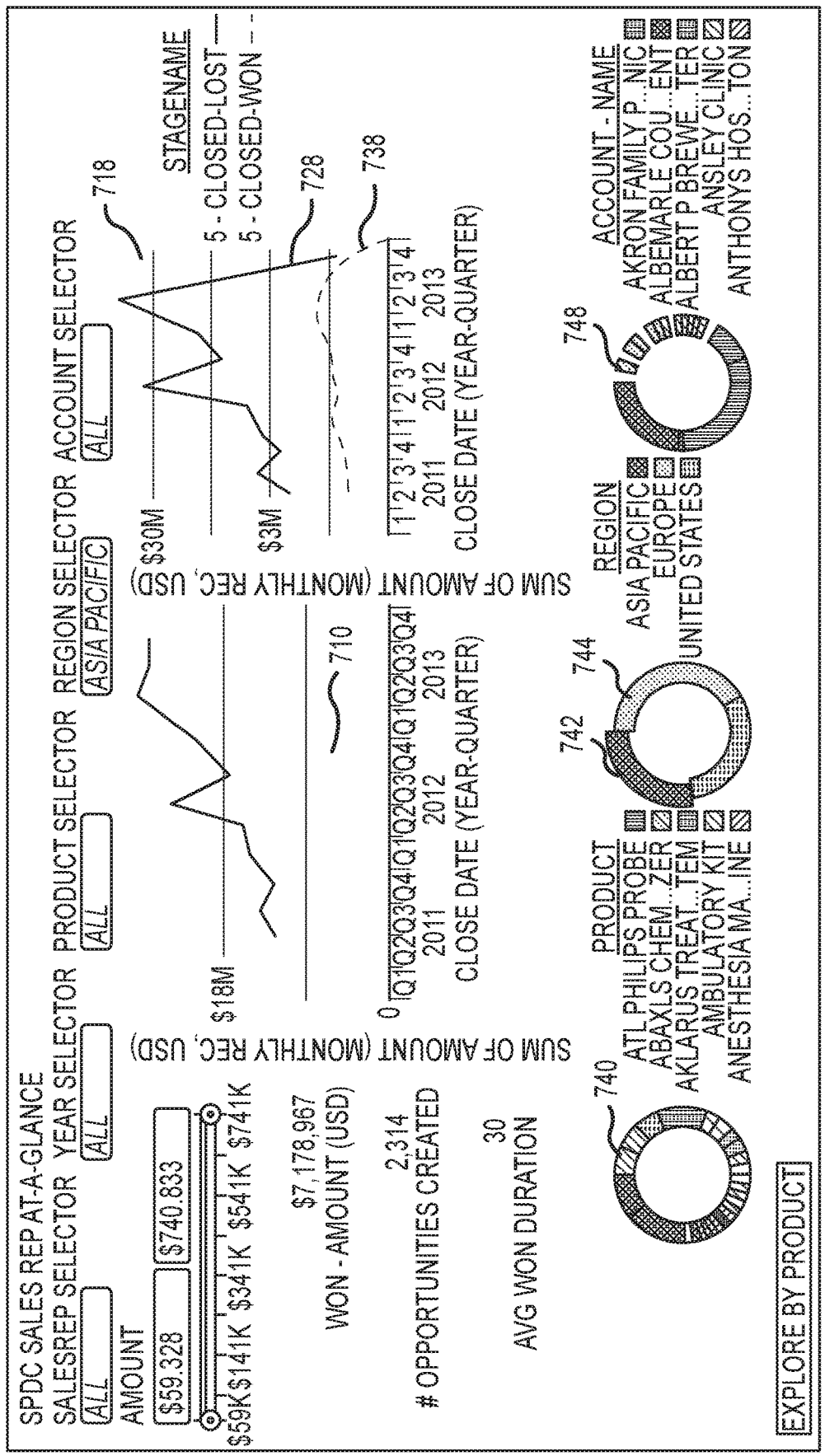
Figure 7F:
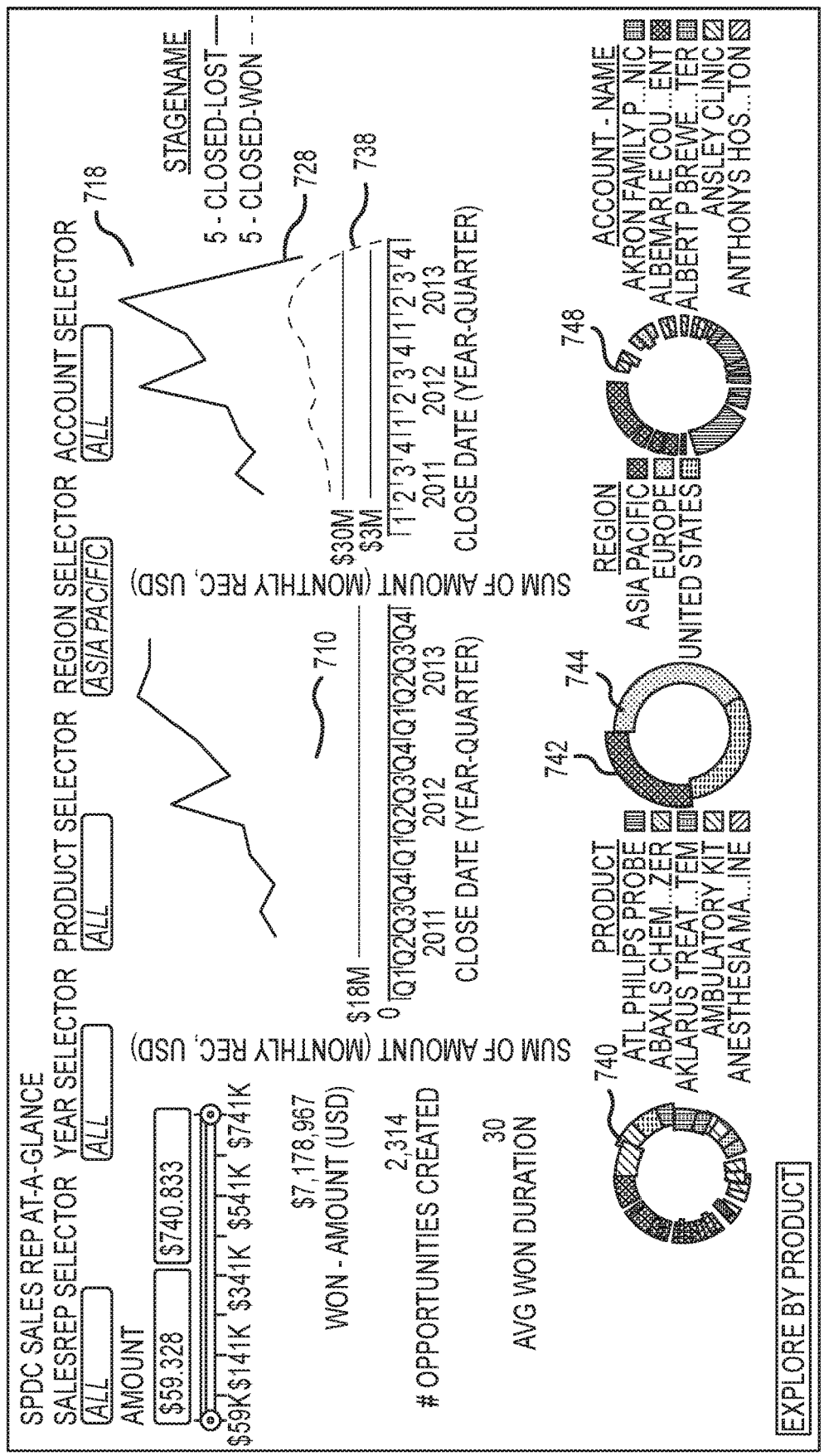
Figure 7G:
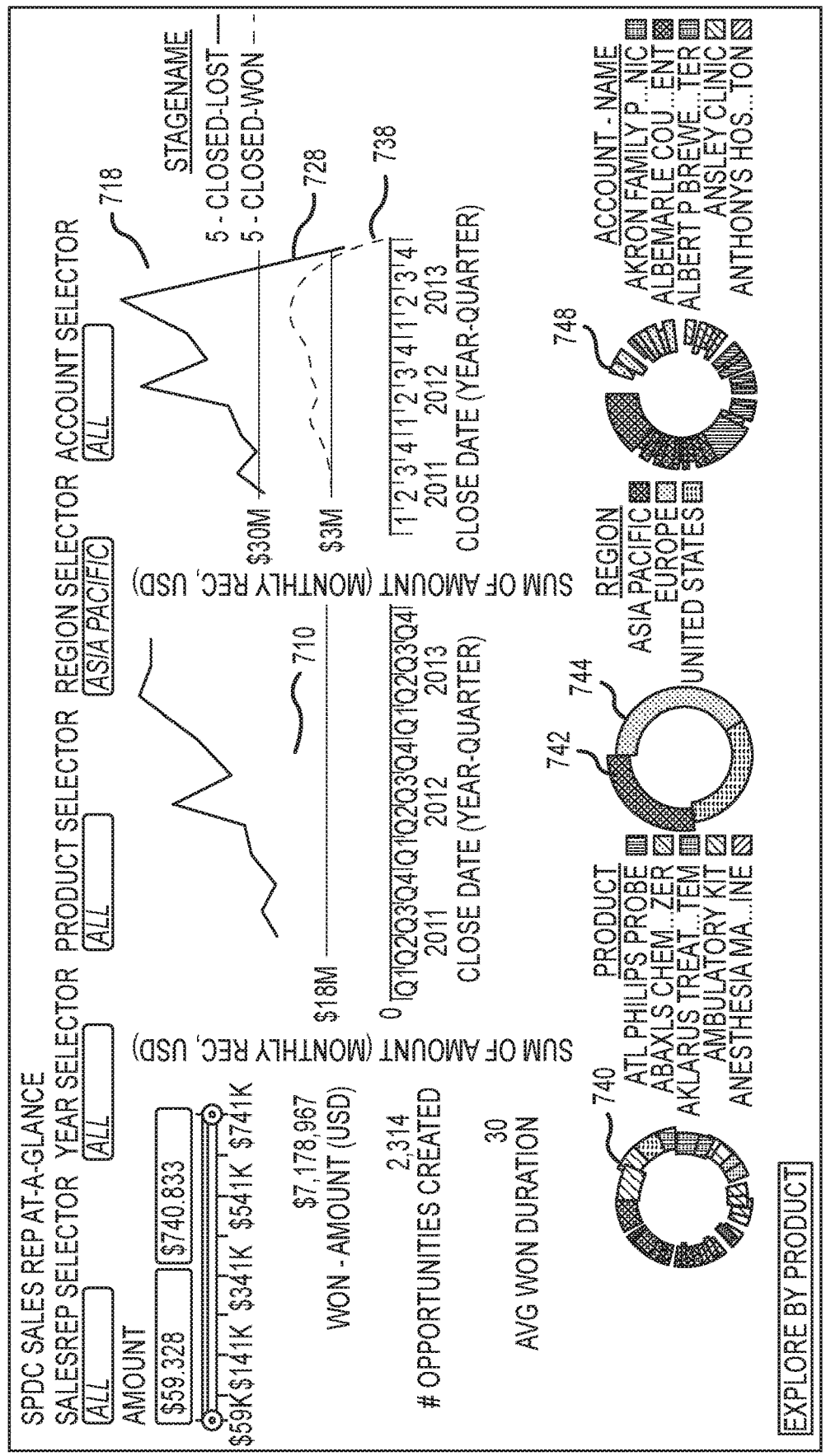
Figure 7H:
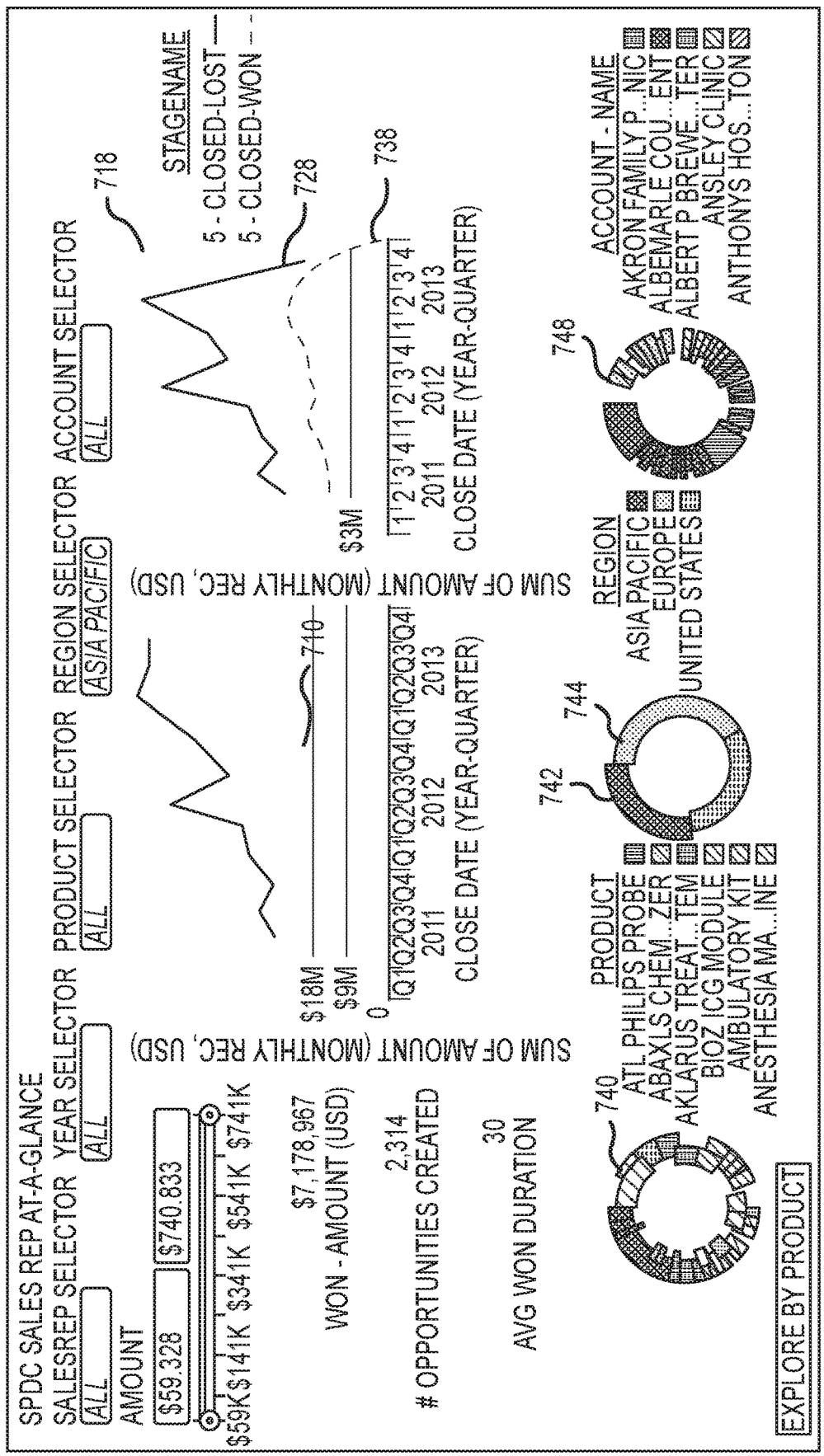
Figure 7I:
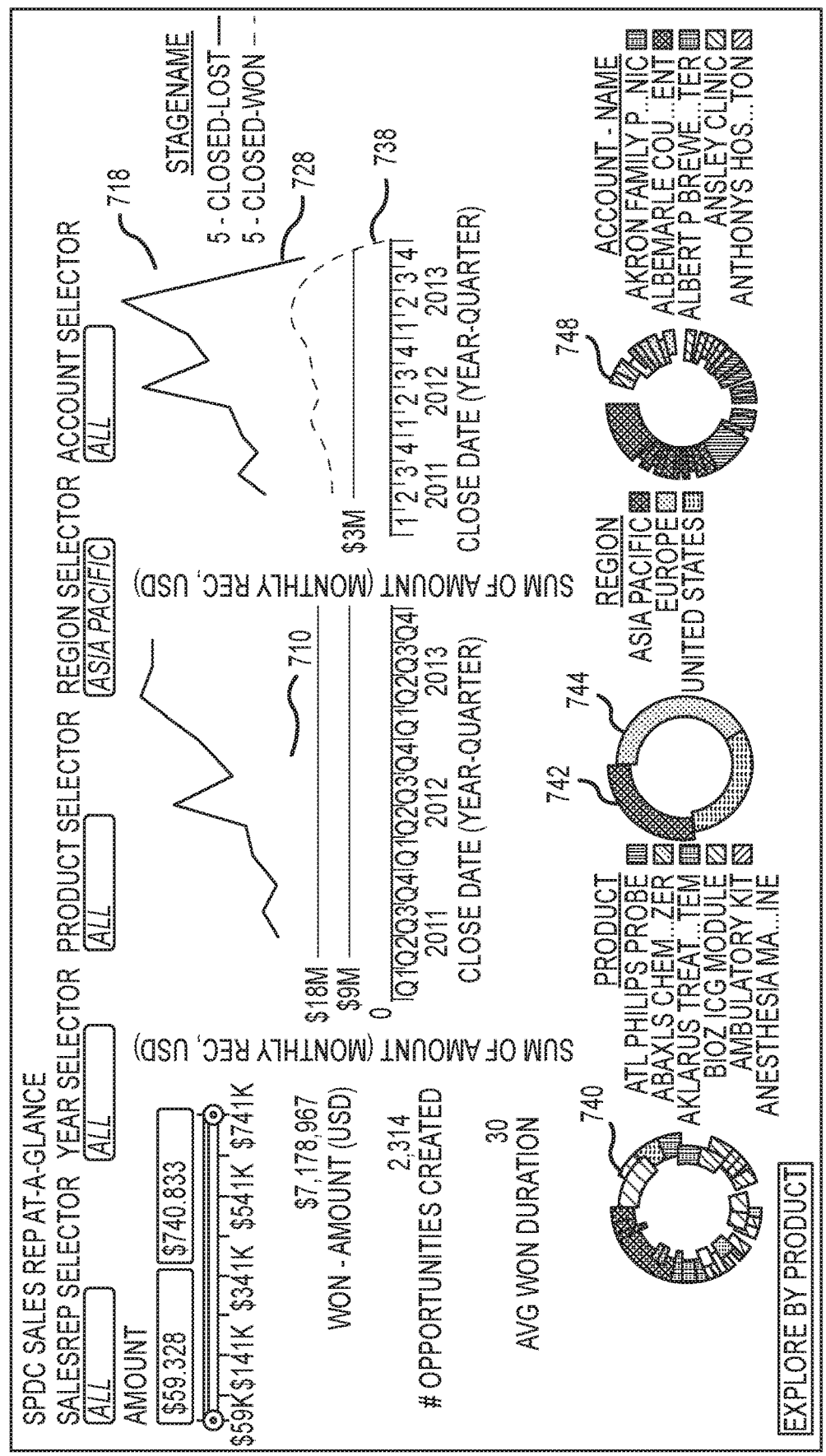
Figure 7J:
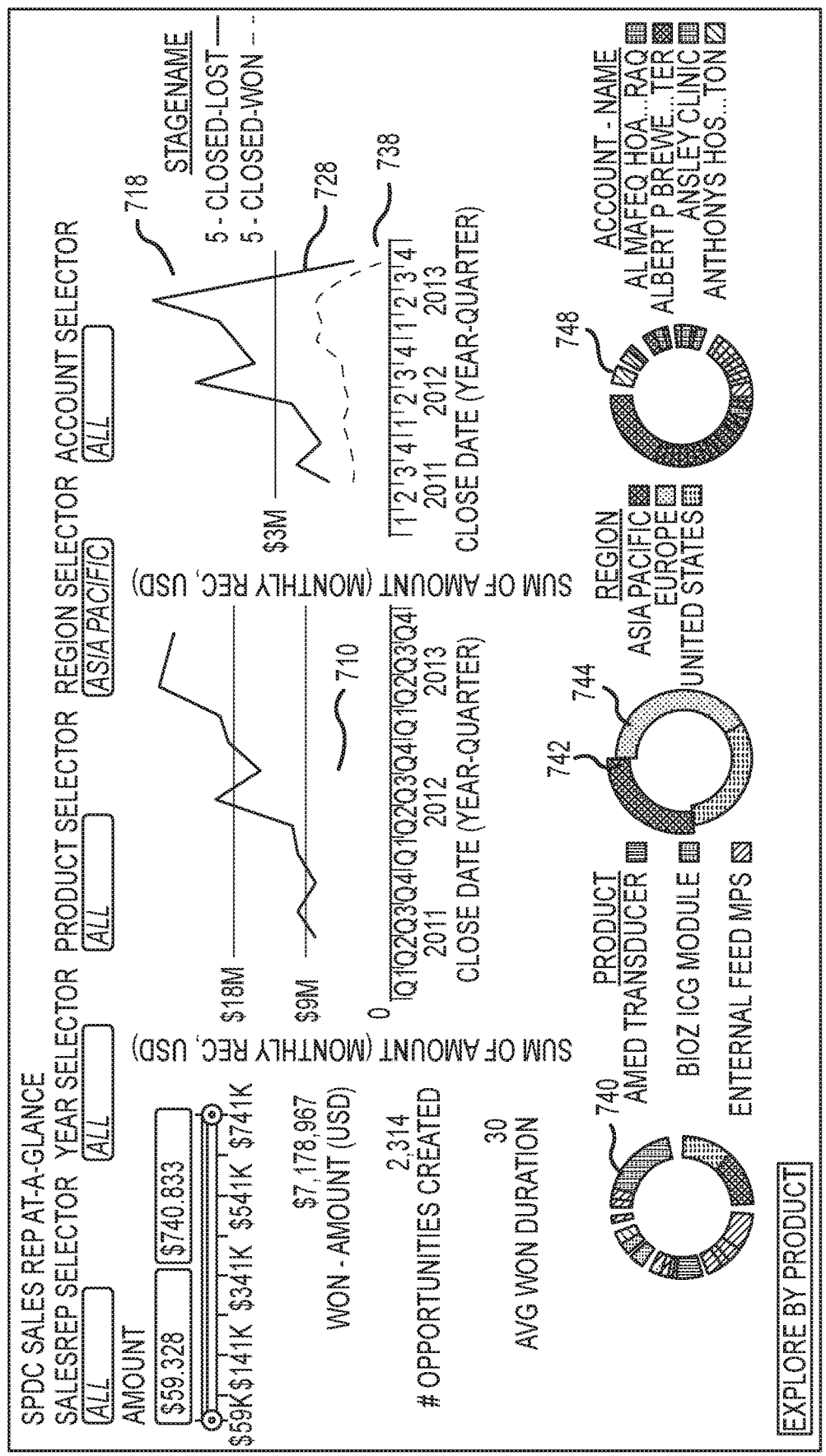
Figure 7K:
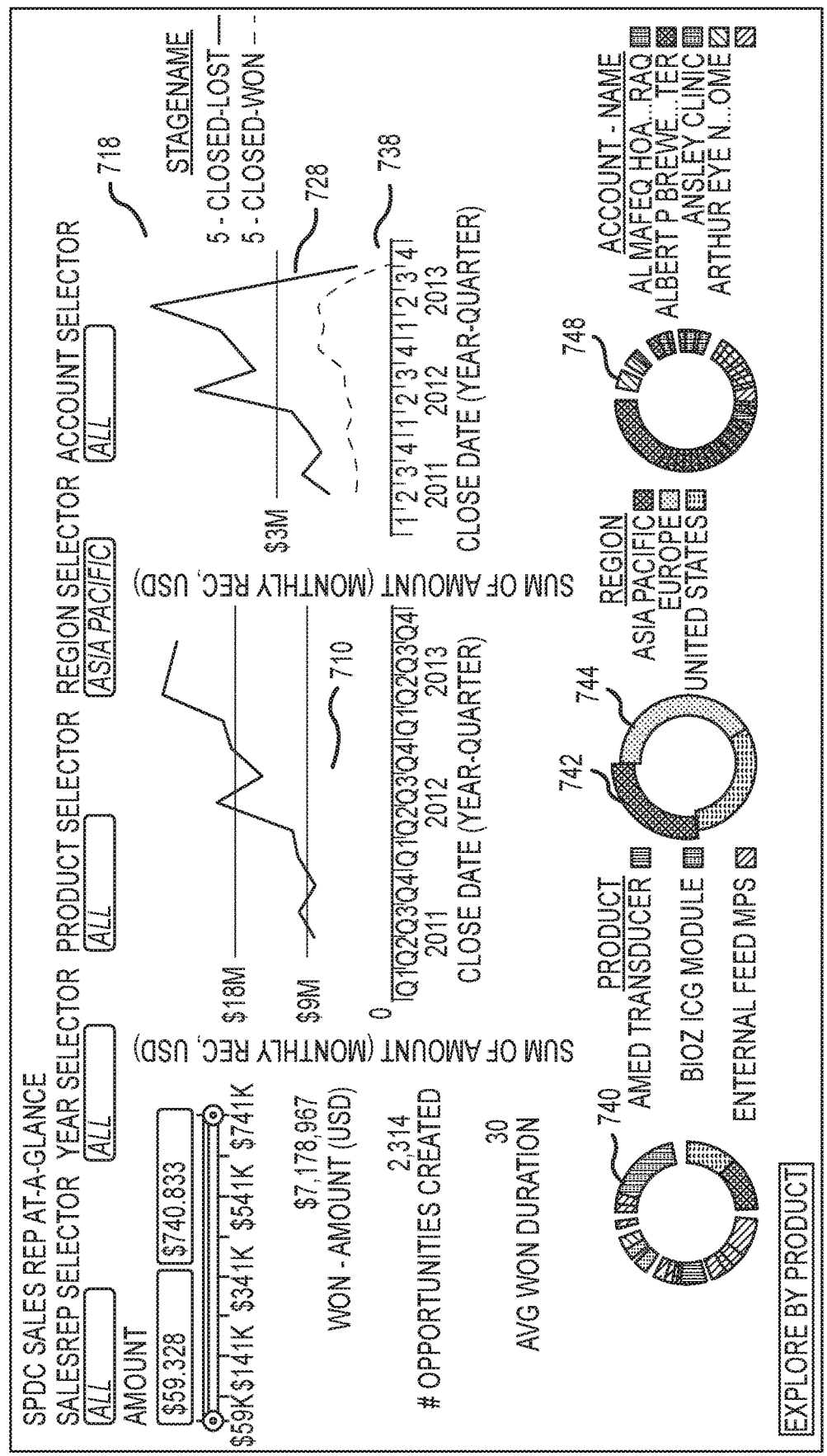
Figure 7L:
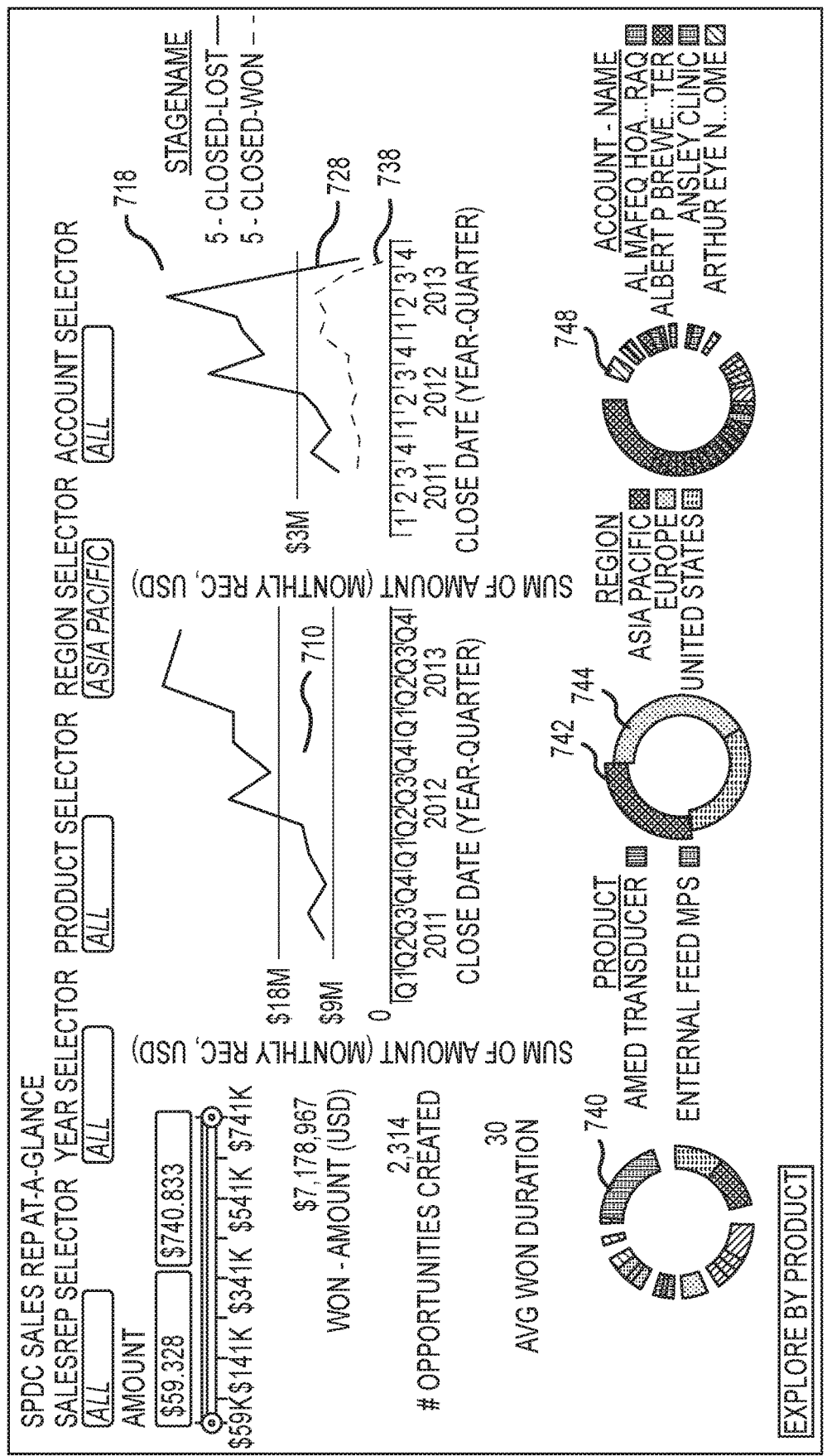
Figure 7M:
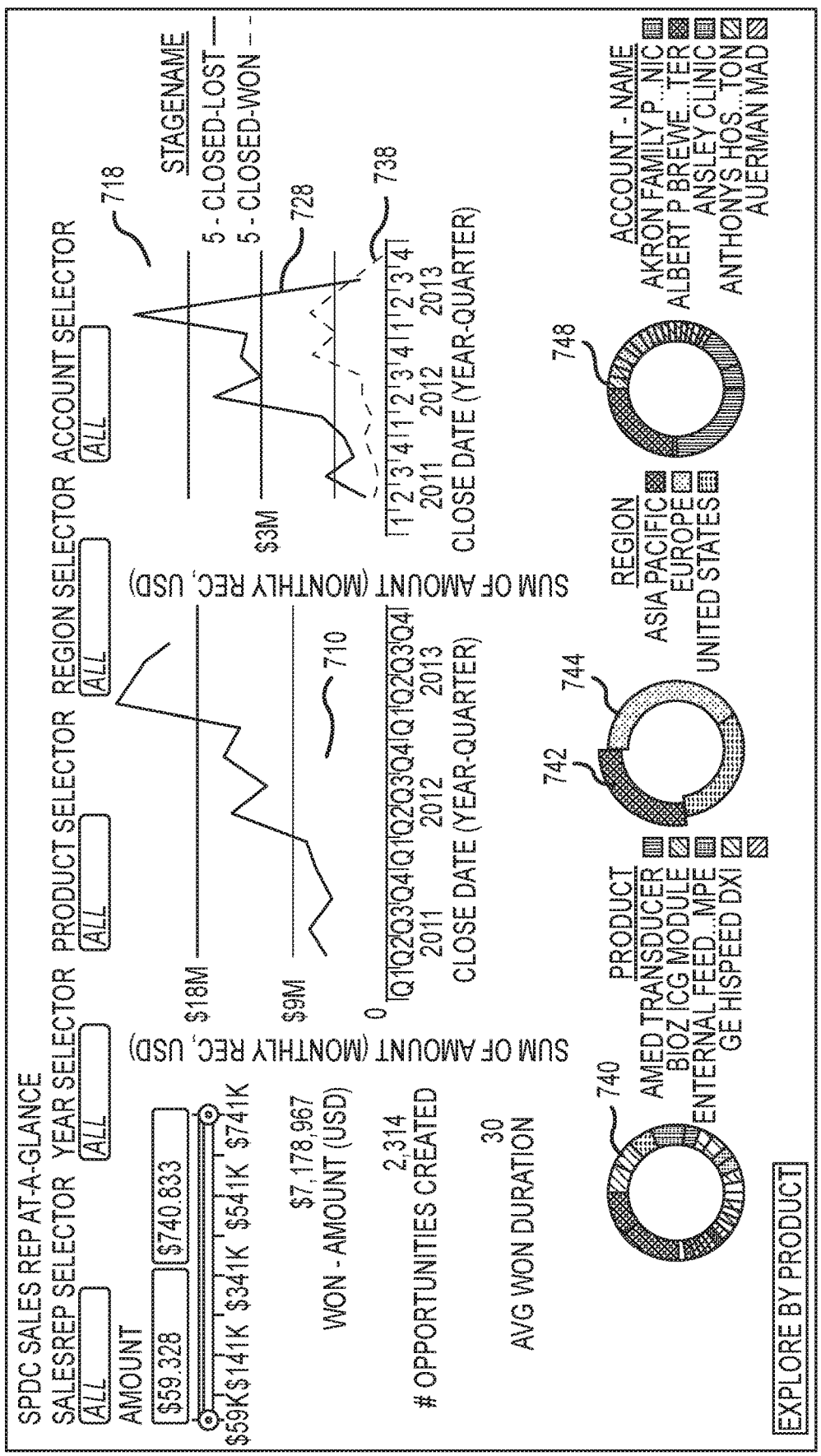

In a disclosed implementation of a dashboard shown in FIG. 7C, sales rep at-a-glance, steps and widgets describe visualization lenses. Examples of widget and step code for various widget types are included next. For example, code for the widget for the Won-Amount 720 display panel shown in FIG. 7C:

```
number sum amount: - -
    type: "NumberWidget"
    pos:
        x: 10
        y:240
    params:
        step: "step_ selected_ salesreps"
        title: "Won - Amount (USD)"
        measureField: "sum Amount"
```

For some implementations of the Won-Amount 720 display panel shown in FIG. 7C, the step_selected_salesreps step is associated with the number widget described above. Example JSON code for the step_selected_salesreps step:

```
Closed- Won
    step_ selected_ salesreps:
        type: "aggregate"
        em: "opp"
        query:
            filters: [
                ["StageName", ["5 - Closed-Won"]]
            ]
            measures: [ ["sum", "Amount"], ["avg", "Open Duration"] ]
]
        extra:
            chartType: "hbar"
        isF acet: true
        useGlobal: true
```

As another widget and step example, a graph of sums won and sums lost as a function of the close date 718 can be implemented using JSON code for a list selector type widget:

```
sel_regions:
    type: "ListSelector"
    pos:
        x:600
        y: 10
    params:
        expanded: false
        title: "region selector"
        step: "step_ all_regions"
        instant: true
        multiSelect: false
        measureField: "sum Amount"
```

Example JSON code for the closed-won step associated with the list selector widget for the visualization lens that renders sums won and sums lost as a function of the close date 718 is listed below.

```
#win loss
    step_ win_ loss:
        type: "aggregate"
        em: "opp"
        query:
            groups: [["CloseDate Year", "CloseDate Quarter"], "StageN ame"]
            filters: [
                ["StageName", ["5 - Closed-Won", "5 - Closedmeasures: Lost"]]
            ]
            measures: [["sum", "Amount"]]
        extra:
            chartType: "time"
        isFacet: true
        useGlobal: true
```

A region chart 744 can be implemented using the chart widget, pie_regions, shown below.

```
pie regions:
    type: "ChartWidget"
    pos:
        x:640
        y:490
        w: 320
        h:200
    params:
        step: "step_all_regions"
        chartType: "pie"
        legend: true
```

Example JSON code for selecting all regions of a graph, using a region query step for the chart widget:

```
# region selector
    step_ all_ regions:
        type: "aggregate"
        em: "opp"
        query:
            groups: ["Region"]
            measures: [ ["sum", "Amount"] ]
            order: [ [-1, ascending: false] ]
        extra:
            chartType: "pie"
        selectMode: "single"
        isFacet: true
        useGlobal: true
```

Example code for a selector widget for selecting a region on the dashboard such as the Asia Pacific segment 742 of the region chart 744 is listed below.

```
sel_ amount_ expanded:
    type: "RangeSelector"
    pos:
        x: 10
        y:70
    params:
        title: "Amount"
        step: "step_ all_ amounts_ expanded"
        instant: true
```

Example JSON code for the region selector step for selecting a region such as the Asia Pacific segment 742 of the region chart 744:

```
# amount selector
    step_all_amounts_expanded:
        type: "aggregate"
        em: "opp"
        query:
            measures: [ ["sum", "Amount"] ]
        isF acet: true
        useGlobal: true
```

In example JSON code, a range selector widget can specify a change amount. For example, a sel_amount_expanded widget is attached to the amount selector step.

```
sel_amount_expanded:
    type: "RangeSelector"
    pos:
        x: 10
        y: 70
    params:
        title: "Amount"
        step: "step_all_amounts_expanded"
        instant: true
```

In the example JSON code, an amount selector query step works in conjunction with a range selector widget:

```
# amount selector
    step_all_amounts_expanded:
        type: "aggregate"
        em: "opp"
        query:
            measures: [ ["sum", "Amount"] ]
        isF acet: true
        useGlobal: true
```

Dashboard Morphing Example

To understand more about sales opportunities during the selected group of fiscal years, the analyst reviews the dashboard. If the analyst-developer wants to drill into a specific region, they can select a segment—for example the Asia Pacific segment 742 of the region chart 744. Then, the product chart 740 and account name chart 748 update without user action—without the user needing to shift from a develop or edit mode into a display mode. For example, the Won amount 720 in FIG. 7C shows the amount for the Asia Pacific region: $7,187,967, instead of the total amount won for all regions shown in 25 FIG. 7B: $26,493,602. When the analyst selects the panel segment, the change also gets applied to the graph of amount received in dollars by close date (year-quarter) 710 and the opportunities won (sales) 728 and opportunities lost 738 as a function of the sums won and sums lost as a function of the close date 718. Examples of additional options for drill down for a region include but are not limited to owner name, owner region, owner user role, product, and stage name.

FIG. 7D through 7M show the animation results for a second query based on the selected Asia Pacific segment 742. The display visualizations morph from an initial appearance through an animation sequence to a second appearance that corresponds to the results of the second query. That is, the selected Asia Pacific segment 742 pops out slightly on the region chart 744, initiates a regrouping control signal and responsively, the system generates a second query based on the selected regrouping, subdividing segments of the product chart 740 and the account name chart 748 to correspond to results of the second query. The segments morph from an initial appearance through an animation sequence to a second appearance that corresponds to the results of the second query.

System Flow

Figure 8:
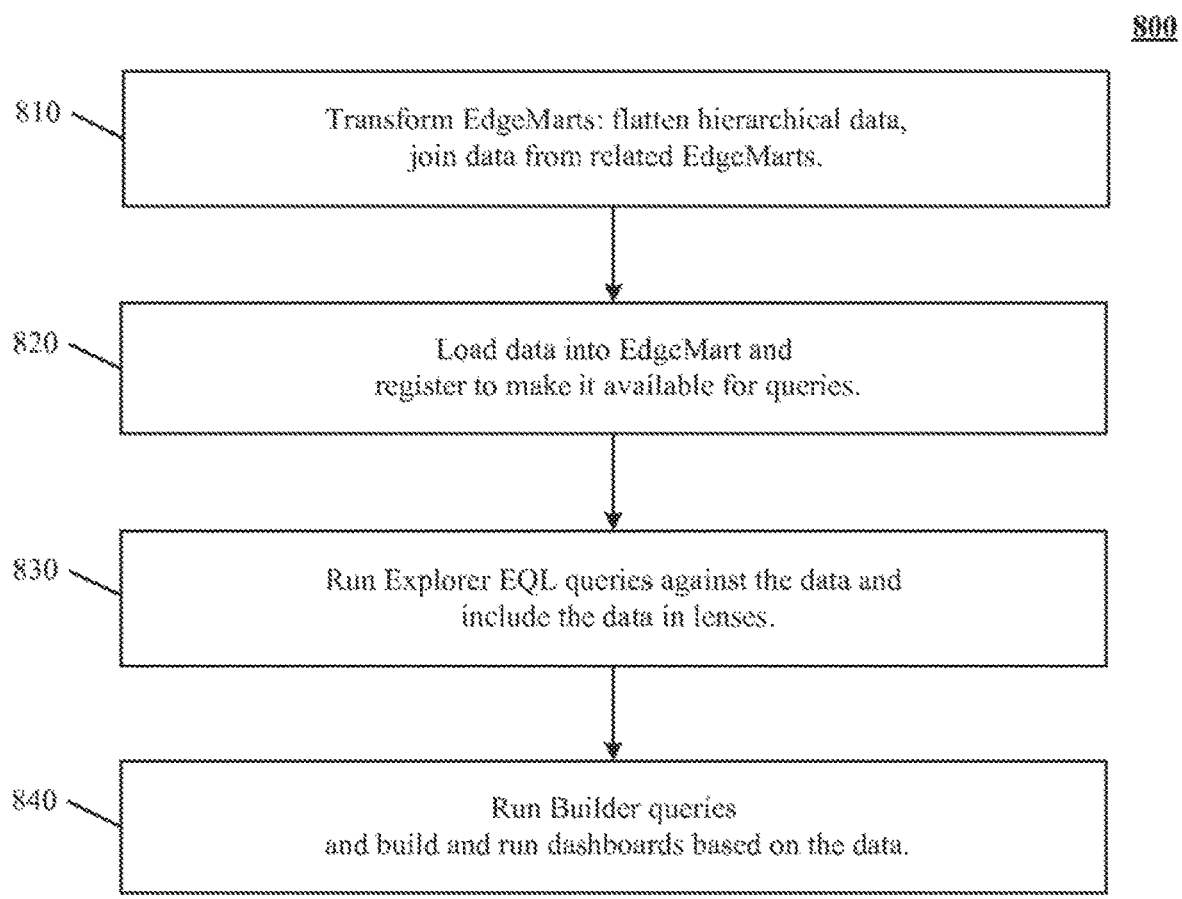
FIG. 8 shows an overview of the flow for implementing animated informational morphing replay for live data rendering on a live dashboard, with flexible display options.

FIG. 8 shows an overview of the flow for implementing animated informational morphing replay for live data rendering on a live dashboard, with flexible display options. Back-end systems and methods transform EdgeMarts: flattening hierarchical data, joining data from related EdgeMarts, and increasing query performance on specific data 810. Transformed data gets loaded into an EdgeMart database and the EdgeMart gets registered 820 to make it available for queries.

From a front end perspective, Explorer EQL queries run against the EdgeMart data and the data results are rendered in lenses 830. Analyst-developers can then run Builder queries and build and run dashboards based on the data 840.

Flowchart for Visual Data Analysis with Animated Information Morphing Replay

FIG. 9 illustrates a flowchart of one implementation 900 of visual data analysis with animated informational morphing replay. Flowchart 900 can be implemented at least partially with a database system, e.g., by one or more processors configured to receive or retrieve information, process the information, store results, and transmit the results. For convenience, this flowchart is described with reference to the system that carries out a method. The system is not necessarily part of the method. Other implementations may perform the steps in different orders and/or with different, fewer or additional steps than the ones illustrated in FIG. 9. The actions described below can be subdivided into more steps or combined into fewer steps to carry out the method described using a different number or arrangement of steps.

At action 910, the disclosed apparatus receives a query against an analytic data structure with a first grouping and returns results of the query in data that represents a first chart or graph. At action 920, the apparatus receives a segment selection filter signal and a regrouping control signal and responsively generates a second query based on the selected segment and regrouping, subdivides the selected segment to correspond to results of the second query; and morphs the selected segment from an initial appearance through a first animation sequence to a second appearance that corresponds to the results of the second query, and returns data that represents the first animation sequence.

At action 930, the disclosed apparatus receives a regrouping control signal and responsively generates a third query based on the selected regrouping; subdivides 15 segments of the first chart or graph to correspond to results of the third query; morphs the segments from an initial appearance through a second animation sequence to a third appearance that corresponds to the results of the second query; and returns data that represents the second animation sequence.

At action 940, the disclosed apparatus records the received control signals and the queries to rerun against the analytic data structure; and responsive to a replay request signal, replays the received control signals and the queries and with the animated morphing and returns data that represents the animation sequences.

Flowchart for Declarative Specification of Queries, Formats and Bindings

Figure 10:
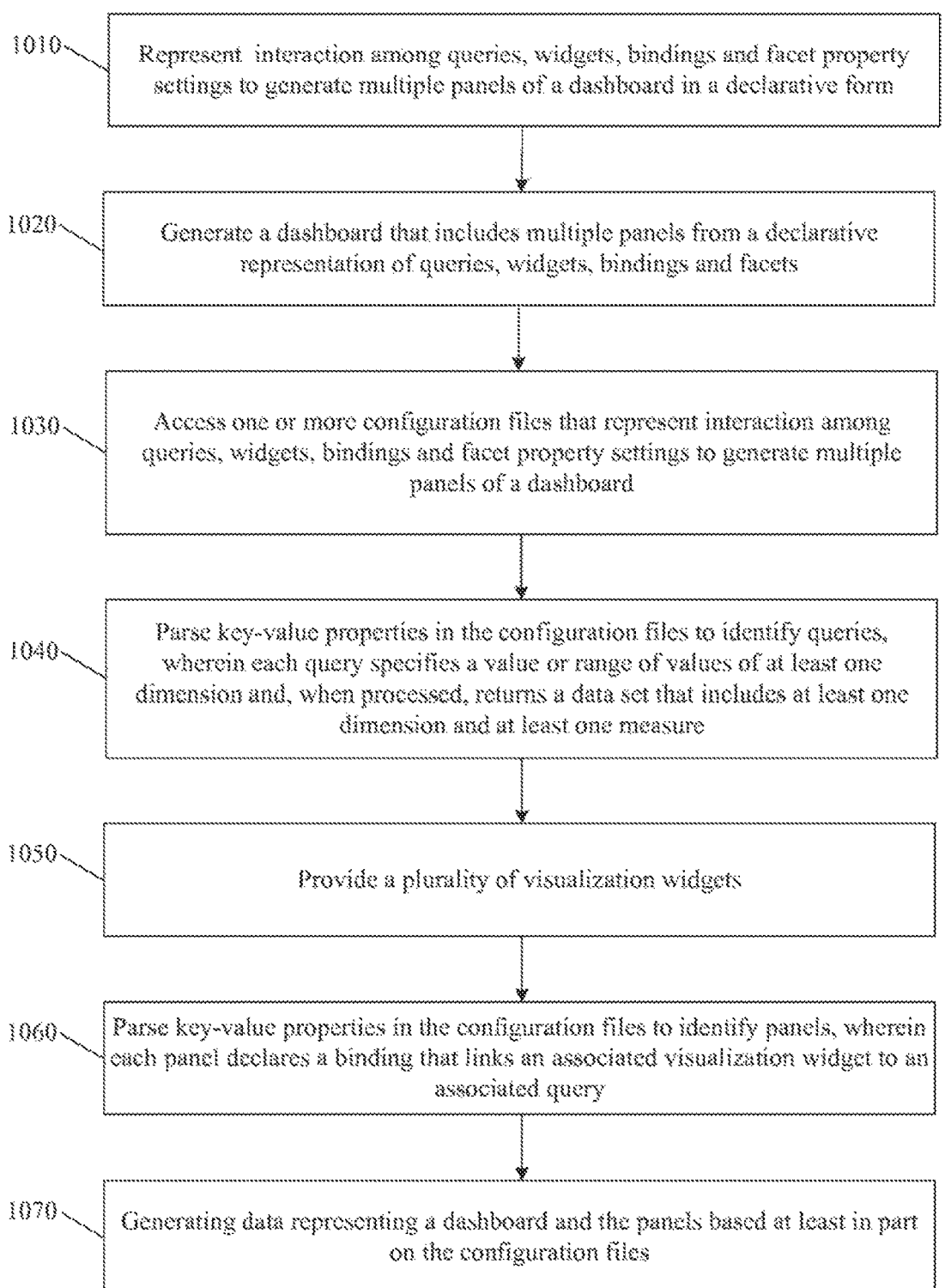
FIG. 10 illustrates a flowchart of one method of representing queries, widgets, bindings and facets combined in panels on a dashboard.

FIG. 10 illustrates a flowchart of one method 1000 of representing queries, widgets, bindings and facets combined in panels on a dashboard. Flowchart 1000 can be implemented at least partially with a database system, e.g., by one or more processors configured to receive or retrieve information, process the information, store results, and transmit the results. For convenience, this flowchart is described with reference to the system that carries out a method. The system is not necessarily part of the method. Other implementations may perform the steps in different orders and/or with different, fewer or additional steps than the ones illustrated in FIG. 10. The actions described below can be subdivided into more steps or combined into fewer steps to carry out the method described using a different number or arrangement of steps.

At action 1010, a method includes representing interaction among queries, widgets, bindings and facet property settings to generate multiple panels of a dashboard in a declarative form. At action 1020, the method includes generating a dashboard that includes multiple panels from a declarative representation of queries, widgets, bindings and facets. At action 1030, the method includes accessing one or more configuration files that represent interaction among queries, widgets, bindings and facet property settings to generate multiple panels of a dashboard. At action 1040, the method includes parsing key-value properties in the configuration files to identify queries, wherein each query specifies a value or range of values of at least one dimension and, when processed, returns a data set that includes at least one dimension and at least one measure. At action 1050, the method includes providing a plurality of visualization widgets. At action 1060, the method includes parsing key-value properties in the configuration files to identify panels, wherein each panel declares a binding that links an associated visualization widget to an associated query. At action 1070, the method includes generating data representing a dashboard and the panels based at least in part on the configuration files.

Flowchart for Dashboard Builder with Live Data Updating

Figure 11:
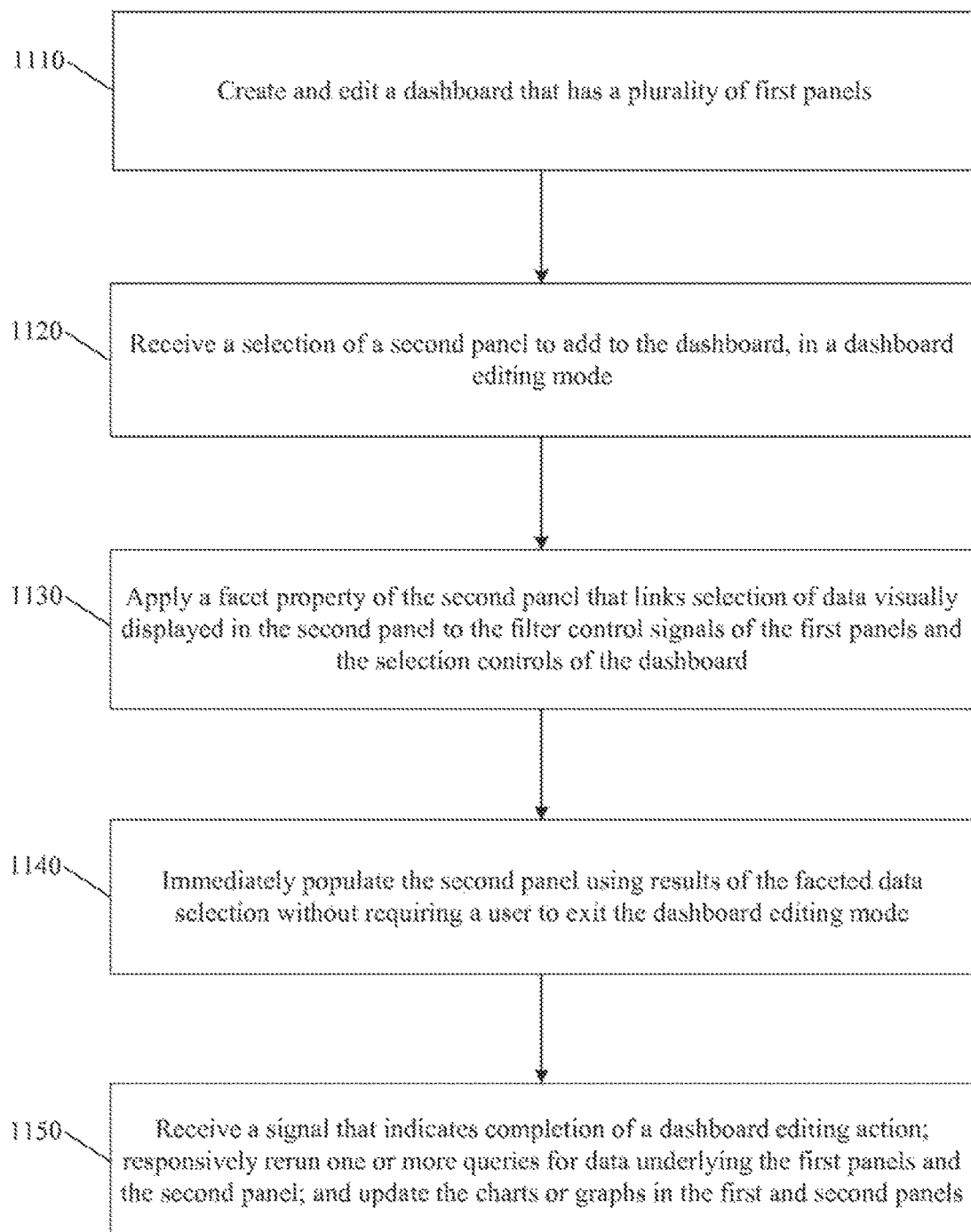
FIG. 11 is a flowchart showing a method of one implementation of a dashboard builder with live data updating without exiting an edit mode.

FIG. 11 illustrates a flowchart of one method 1100 of implementing a dashboard builder with live data updating without exiting an edit mode. Flowchart 1100 can be implemented at least partially with a database system, e.g., by one or more processors configured to receive or retrieve information, process the information, store results, and transmit the results. For convenience, this flowchart is described with reference to the system that carries out a method. The system is not necessarily part of the method. Other implementations may perform the steps in different orders and/or with different, fewer or additional steps than the ones illustrated in FIG. 11. The actions described below can be subdivided into more steps or combined into fewer steps to carry out the method described using a different number or arrangement of steps.

At action 1110, the method includes creating and editing a dashboard that has a plurality of first panels. At action 1120, the method includes receiving a selection of a second panel to adding to the dashboard, in a dashboard editing mode. At action 1130, the method includes applying a facet property of the second panel that links selection of data visually displayed in the second panel to the filter control signals of the first panels and the selection controls of the dashboard. At action 1140, the method includes immediately populating the second panel using results of the faceted data selection without requiring a user to exit the dashboard editing mode. At action 1150, the method includes receiving a signal that indicates completion of a dashboard editing action; responsively rerunning one or more queries for data underlying the first panels and the second panel; and updating the charts or graphs in the first and second panels. Particular implementations of apparatus and methods for visual data analysis with animated informational morphing replay that provides live data rendering on a live dashboard, with flexible display options for analyzing data and conveying analysis results, are described in the following section.

Computer System

FIG. 12 is a block diagram of an example computer system 1200 with an apparatus and methods for visual data analysis with animated informational morphing replay that provides live data rendering on a live dashboard, with flexible display options for analyzing data and conveying analysis results. Computer system 1210 typically includes at least one processor 1272 that communicates with a number of peripheral devices via bus subsystem 1250. These peripheral devices can include a storage subsystem 1226 including, for example, memory devices and a file storage subsystem 1236, user interface input devices 1238, user interface output devices 1278, and a network interface subsystem 1276. The input and output devices allow user interaction with computer system 1210. Network interface subsystem 1276 provides an interface to outside networks, including an interface to corresponding interface devices in other computer systems.

User interface input devices 1238 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into computer system 1210.

User interface output devices 1278 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1210 to the user or to another machine or computer system.

Storage subsystem 1226 stores programming and data constructs that provide the functionality of some or all of the modules and methods described herein. These 15 software modules are generally executed by one processor 1272 or in combination with other processors.

Memory 1222 used in the storage subsystem can include a number of memories including a main random access memory (RAM) 1234 for storage of instructions and data during program execution and a read only memory (ROM) 1232 in which fixed instructions are stored. A file storage subsystem 1236 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1236 in the storage subsystem 1224, or in other machines accessible by the processor.

Bus subsystem 1250 provides a mechanism for letting the various components and subsystems of computer system 1210 communicate as intended. Although bus subsystem 1250 is shown schematically as a single bus, alternative implementations of the bus subsystem can use multiple busses. Application server 1220 can be a framework that allows the applications of computer system 1210 to run, such as the hardware and/or software, e.g., the operating system.

Computer system 1210 can be of varying types including a workstation, server, computing cluster, blade server, server farm, or any other data processing system or computing device. Due to the ever-changing nature of computers and networks, the description of computer system 1210 depicted in FIG. 12 is intended only as one example. Many other configurations of computer system 1210 are possible having more or fewer components than the computer system depicted in FIG. 12.

In some implementations, network(s) can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

Particular Implementations

In one implementation, an apparatus is described to analyze data and convey analysis results. The apparatus comprises a computer that includes a processor and a memory coupled to the processor. In addition, the memory includes computer program instructions causing the computer to implement a process. The process includes, receiving a query against an analytic data structure with a first grouping and returning results of the query in data that represents a first chart or graph. The segments of the first chart or graph are filter controls that trigger generation of a second query upon selection. In addition, controls accompanying the first chart or graph implement filtering, regrouping, and selection of a second chart or graph of a different visual organization than the first chart or graph. The process further includes receiving a segment selection filter signal and a regrouping control signal and responsively, generating a second query based on the selected segment and regrouping, subdividing the selected segment to correspond to results of the second query, and morphing the selected segment from an initial appearance through a first animation sequence to a second appearance that corresponds to the results of the second query, returning data that represents the first animation sequence, and receiving a regrouping control signal to responsively generate a third query based on the selected regrouping, subdivide segments of the first chart or graph to correspond to results of the third query, morph the segments from an initial appearance through a second animation sequence to a third appearance that corresponds to the results of the second query, and return data that represents the second animation sequence.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as architecture environment, morphing and replay, dashboard object implementation, morphing examples, system flow, etc.

In addition, the analytic data structure is a read only data structure. The apparatus further includes computer program instructions that cause the computer to implement a process. The process includes recording the received control signals and the queries to rerun against the analytic data structure, responsive to a replay request signal, replaying the received control signals and the queries and with the animated morphing, and returning data that represents the animation sequences.

The apparatus further includes computer program instructions that cause the computer to implement a process. The process includes receiving a sorting control signal and responsively morphing the first chart or graph from an initial appearance in a first sort order through a third animation sequence to a further appearance in a second sort order that corresponds to the sorting control signal, and returning data that represents the third animation sequence.

The apparatus further includes computer program instructions that cause the computer to implement a process. The process includes receiving a sorting control signal, receiving a second chart or graph visual organization signal, responsively morphing the first chart or graph from an initial appearance in a first sort order through a third animation sequence to a further appearance that corresponds to the second chart or graph visual organization and in a second sort order that corresponds to the sorting control signal, and returning data that represents the third animation sequence.

Other implementations may include a non-transitory computer readable storage medium storing instructions executable by a processor to perform any of the processes described above. Yet another implementation may include a system including memory and one or more processors operable to execute instructions, stored in the memory, to perform any of the processes described above.

In one implementation, a method of representing queries, widgets, bindings and facets combined in panels on a dashboard is described. The method includes representing interaction among queries, widgets, bindings and facet property settings to generate multiple panels of a dashboard in a declarative form. Each query specifies a value or range of values of at least one dimension and, when processed, returns a data set that includes at least one dimension and at least one measure. The dimension is supplied to a visualization widget as an independent variable and a function of the measure is supplied to the visualization widget as a dependent variable. A visualization widget, when invoked, accepts as input at least one dimension and at least one measure returned in the data set, generates a specified chart or graph from the dimension and the measure, provides object positions of segments in the specified chart or graph to a tweener to use as ending positions when the tweener is invoked to generate a second view from a first view, and provides the object positions to the tweener to use as starting positions when the tweener is invoked to generate a third view from the second view. Each panel declares a binding that links an associated visualization widget to an associated query. Each panel declares the specified chart or table data visualization into which the data set returned by the associated query will be rendered by the associated visualization widget. The facet property of the panels in the dashboard, when set, links operation of data filtering controls among the panels. The selection of a data filter control in one panel causes the selected data filer to be applied to additional panels that have the facet property set.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as architecture environment, morphing and replay, dashboard object implementation, morphing examples, system flow, etc.

In addition, the analytic data structure is a read only data structure. The apparatus further includes computer program instructions that cause the computer to implement a process. The process includes recording the received control signals and the queries to rerun against the analytic data structure, responsive to a replay request signal, replaying the received control signals and the queries and with the animated morphing, and returning data that represents the animation sequences.

In one implementation, the declarative form of representing the interaction to generate multiple panels of the dashboard is compliant with JSON (JavaScript Object Notation). In one implementation, each panel declares a visualization widget type selected from a group that includes at least one of donut chart, time chart, horizontal bar chart, stacked horizontal bar chart, and scatter plot.

In some implementations, the dashboard further includes a plurality of control widgets, each control widget is declared to have a control widget type selected from a group that includes at least list selector, range selector and date selector types, each control widget selects a value or range of values of at least one associated dimension that is used to generate a query, and execution of the query generated from the control widget is linked to updating data in the panels that have the facet property set.

In some implementations, the dashboard further includes a plurality of control widgets, each control widget selects a value or range of values of at least one associated dimension that is used to generate a query, and execution of the query generated from the control widget is linked to updating data in the panels that have the facet property set. In one implementation, at least some of the panels are declared by six to ten key-value property pairs.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method of generating a dashboard that includes multiple panels from a declarative representation of queries, widgets, bindings and facets is described. The method includes accessing one or more configuration files that represent interaction among queries, widgets, bindings and facet property settings to generate multiple panels of a dashboard and parsing key-value properties in the configuration files to identify queries. Each query specifies a value or range of values of at least one dimension and, when processed, returns a data set that includes at least one dimension and at least one measure. The method further includes providing a plurality of visualization widgets, wherein each visualization widget, when invoked, accepts as input the dimension returned in the data set as an independent variable and the measure as a dependent variable. Each visualization widget further generates a specified chart or graph from the dimension and the measure, provides object positions of segments in the specified chart or graph to a tweener to use as ending positions when the tweener is invoked to generate a second view from a first view, provides the object positions to the tweener to use as starting positions when the tweener is invoked to generate a third view from the second view. The method further includes parsing key-value properties in the configuration files to identify panels, wherein each panel declares a binding that links an associated visualization widget to an associated query. Each panel declares the specified chart or table data visualization into which the data set returned by the associated query will be rendered by the associated visualization widget. At least some of the panels set the facet property. The facet property links operation of data filtering controls among the panels. Selection of a data filter control in one panel causes the selected data filer to be applied to additional panels that have the facet property set. The method further includes generating data representing a dashboard and the panels based at least in part on the configuration files.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as architecture environment, morphing and replay, dashboard object implementation, morphing examples, system flow, etc.

In one implementation, a declarative form of representing the interaction to generate multiple panels of the dashboard in the configuration files is compliant with JSON (JavaScript Object Notation). In another implementation, each panel declares a visualization widget type selected from a group that includes at least one of donut chart, time chart, horizontal bar chart, stacked horizontal bar chart, and scatter plot.

In some implementations, the method further includes parsing key-value properties in the configuration files to identify control widgets. In one implementation, each control widget is declared to have a control widget type selected from a group that includes at least list selector, range selector and date selector types, each control widget selects a value or range of values of at least one associated dimension that is used to generate a query, and execution of the query generated from the control widget is linked to updating data in the panels that have the facet property set.

In other implementations, the method further includes parsing key-value properties in the configuration files to identify control widgets. In one implementation, each control widget selects a value or range of values of at least one associated dimension that is used to generate a query and execution of the query generated from the control widget is linked to updating data in the panels that have the facet property set. In one other implementation, at least some of the panels are declared by six to ten key-value property pairs.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In one implementation, a method of creating and editing of a dashboard that has a plurality of first panels. The method includes receiving a selection of a second panel to add to the dashboard in a dashboard editing mode. In one implementation, the dashboard includes a plurality of faceted first panels, the faceted first panels present data visually in a chart or graph, and the faceted first panels share signals from filtering controls in the first panels and selection controls of the dashboard outside the first panels. The method further includes applying a facet property of the second panel that links selection of data visually displayed in the second panel to the filter control signals of the first panels and the selection controls of the dashboard and immediately populating the second panel using results of the faceted data selection without requiring a user to exit the dashboard editing mode.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as architecture environment, morphing and replay, dashboard object implementation, morphing examples, system flow, etc.

The method further includes receiving a specification of an visualization widget to generate the second panel. In one implementation, the visualization widget, when invoked, accepts as input at least one dimension and at least one measure in the data set. The dimension is supplied to a visualization widget as an independent variable and a function of the measure is supplied to the visualization widget as a dependent variable. The visualization widget further generates a specified chart or graph from the dimension and measure.

The visualization widget of the second panel further includes faceted filter controls backing data segments that, when selected, apply the selected filter to the second panel and to first panels, according to one implementation of the method. The method further includes receiving a selection signal from the second panel faceted filter controls and updating the first panels using results of the faceted filter selection without requiring the user to exit the dashboard editing mode.

The method further includes receiving a signal that indicates completion of a dashboard editing action, responsively rerunning one or more queries for data underlying the first panels and the second panel, and updating the charts or graphs in the first and second panels. In one implementation, the signal that indicates completion of a dashboard editing action is a mouse click on a grouping selection control. In another implementation, the signal includes release of a rubber banding action that visually selects a data subset in a graph of one of the first or second panel.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of animating data visualizations at a live dashboard builder engine, the method comprising:
   receiving a first user input signal indicating a first set of data filtering criteria, wherein the first user input signal triggers generation of a first query comprising the first set of data filtering criteria;
   querying for a first set of data from one or more read-only pre-packaged data sets stored in a general-purpose memory caching system associated with the live dashboard builder engine based at least in part on the first query;
   displaying, in a user interface, an animated widget comprising a first visual organization of the queried first set of data;
   receiving a second user input signal indicating a second set of data filtering criteria, wherein the second user input signal triggers generation of a second query comprising the second set of data filtering criteria;
   querying for a second set of data from the one or more read-only pre-packaged data sets stored in the general-purpose memory caching system associated with the live dashboard builder engine based at least in part on the second query;
   determining an animation sequence for morphing the animated widget from the first visual organization of the queried first set of data to a second visual organization of the queried second set of data based at least in part on the second set of data, wherein the animation sequence comprises a plurality of intermediate visual organizations between the first visual organization and the second visual organization, each intermediate visual organization of the plurality of intermediate visual organizations associated with a relative timestamp within the animation sequence; and
   morphing the animated widget from the first visual organization to the second visual organization according to the determined animation sequence.

2. The method of claim 1, further comprising:
   receiving a third user input signal indicating a third set of data filtering criteria, wherein the third user input signal triggers generation of a third query comprising the third set of data filtering criteria;
   querying for a third set of data from the one or more read-only pre-packaged data sets stored in the general-purpose memory caching system associated with the live dashboard builder engine based at least in part on the third query;
   determining an additional animation sequence for morphing the animated widget from the second visual organization of the queried second set of data to a third visual organization of the queried third set of data based at least in part on the third set of data; and
   morphing the animated widget from the second visual organization to the third visual organization according to the determined additional animation sequence.

3. The method of claim 1, wherein the first set of data filtering criteria comprises a value or a range of values of at least one dimension for the first set of data and the second set of data filtering criteria comprises a value or a range of values of at least one dimension for the second set of data.

4. The method of claim 1, wherein querying for the first set of data and querying for the second set of data comprises:
   parsing a first set of key-value properties in a first configuration file to identify the first query; and
   parsing a second set of key-value properties in a second configuration file to identify the second query.

5. The method of claim 1, further comprising:
generating the animated widget, wherein the animated widget comprises a chart, a graph, or a combination thereof.

6. The method of claim 1, further comprising:
selecting a type of animated widget, wherein the type of animated widget is selected from a group of animated widget types comprising a donut chart, a time chart, a horizontal bar chart, a stacked horizontal bar chart, a scatter plot, or a combination thereof.

7. The method of claim 1, further comprising:
calculating a location in the user interface to display the animated widget, wherein the animated widget is displayed based at least in part on the calculating.

8. The method of claim 1, wherein the animation sequence comprises pixel-level instructions for each intermediate visual organization of the plurality of intermediate visual organizations.

9. The method of claim 1, further comprising:
receiving a third user input signal comprising a user selection of one or more segments of the second visual organization;
identifying a subset of the second set of data corresponding to the one or more segments of the second visual organization;
determining an additional animation sequence for morphing the animated widget from the second visual organization of the queried second set of data to a third visual organization of the identified subset of the second set of data based at least in part on the identified subset of the second set of data; and
morphing the animated widget from the second visual organization to the third visual organization according to the determined additional animation sequence.

10. The method of claim 1, wherein the second user input signal comprises a regrouping control signal for the first visual organization, the method further comprising:
generating the second query based at least in part on the regrouping control signal.

11. The method of claim 1, further comprising:
storing the first user input signal indicating the first set of data filtering criteria in memory; and
storing the first query comprising the first set of data filtering criteria and an indication of the stored first user input signal.

12. The method of claim 11, further comprising:
receiving a third user input signal, wherein the third user input signal is a same user input signal as the first user input signal;
identifying the stored first user input signal in the memory based at least in part on receiving the third user input signal;
retrieving the stored first query from the memory based at least in part on the indication of the stored first user input signal and the identifying; and
querying for a third set of data from the one or more read-only pre-packaged data sets stored in the general-purpose memory caching system associated with the live dashboard builder engine based at least in part on the stored first query.

13. The method of claim 1, further comprising:
storing the animation sequence in memory;
receiving a replay request signal for the animation sequence; and
morphing the animated widget from the first visual organization to the second visual organization according to the stored animation sequence based at least in part on the replay request signal.

14. The method of claim 1, further comprising:
transforming data extracted from a data repository to generate the one or more read-only pre-packaged data sets; and
storing the one or more read-only pre-packaged data sets in the general-purpose memory caching system associated with the live dashboard builder engine for querying.

15. An apparatus for animating data visualizations at a live dashboard builder engine, comprising:
a processor;
memory in electronic communication with the processor;
instructions stored in the memory and executable by the processor to cause the apparatus to;
receive a first user input signal indicating a first set of data filtering criteria, wherein the first user input signal triggers generation of a first query comprising the first set of data filtering criteria;
query for a first set of data from one or more read-only pre-packaged data sets stored in a general-purpose memory caching system associated with the live dashboard builder engine based at least in part on the first query;
display, in a user interface, an animated widget comprising a first visual organization of the queried first set of data;
receive a second user input signal indicating a second set of data filtering criteria, wherein the second user input signal triggers generation of a second query comprising the second set of data filtering criteria;
query for a second set of data from the one or more read-only pre-packaged data sets stored in the general-purpose memory caching system associated with the live dashboard builder engine based at least in part on the second query;
determine an animation sequence for morphing the animated widget from the first visual organization of the queried first set of data to a second visual organization of the queried second set of data based at least in part on the second set of data, wherein the animation sequence comprises a plurality of intermediate visual organizations between the first visual organization and the second visual organization, each intermediate visual organization of the plurality of intermediate visual organizations associated with a relative timestamp within the animation sequence; and
morph the animated widget from the first visual organization to the second visual organization according to the determined animation sequence.

16. The apparatus of claim 15, wherein the instructions are further executable by the processor to cause the apparatus to:
receive a third user input signal indicating a third set of data filtering criteria, wherein the third user input signal triggers generation of a third query comprising the third set of data filtering criteria;
query for a third set of data from the one or more read-only pre-packaged data sets stored in the general-purpose memory caching system associated with the live dashboard builder engine based at least in part on the third query;
determine an additional animation sequence for morphing the animated widget from the second visual organization of the queried second set of data to a third visual organization of the queried third set of data based at least in part on the third set of data; and morph the animated widget from the second visual organization to the third visual organization according to the determined additional animation sequence.

17. The apparatus of claim 15, wherein the instructions are further executable by the processor to cause the apparatus to:

parse a first set of key-value properties in a first configuration file to identify the first query; and parse a second set of key-value properties in a second configuration file to identify the second query.

18. A non-transitory computer-readable medium storing code for animating data visualizations at a live dashboard builder engine, the code comprising instructions executable by a processor to:

receive a first user input signal indicating a first set of data filtering criteria, wherein the first user input signal triggers generation of a first query comprising the first set of data filtering criteria;

query for a first set of data from one or more read-only pre-packaged data sets stored in a general-purpose memory caching system associated with the live dashboard builder engine based at least in part on the first query;

display, in a user interface, an animated widget comprising a first visual organization of the queried first set of data;

receive a second user input signal indicating a second set of data filtering criteria, wherein the second user input signal triggers generation of a second query comprising the second set of data filtering criteria;

query for a second set of data from the one or more read-only pre-packaged data sets stored in the general-purpose memory caching system associated with the live dashboard builder engine based at least in part on the second query;

determine an animation sequence for morphing the animated widget from the first visual organization of the queried first set of data to a second visual organization of the queried second set of data based at least in part on the second set of data, wherein the animation sequence comprises a plurality of intermediate visual organizations between the first visual organization and the second visual organization, each intermediate visual organization of the plurality of intermediate visual organizations associated with a relative timestamp within the animation sequence; and morph the animated widget from the first visual organization to the second visual organization according to the determined animation sequence.

19. The non-transitory computer-readable medium of claim 18, wherein the instructions are further executable by the processor to:

receive a third user input signal indicating a third set of data filtering criteria, wherein the third user input signal triggers generation of a third query comprising the third set of data filtering criteria;

query for a third set of data from the one or more read-only pre-packaged data sets stored in the general-purpose memory caching system associated with the live dashboard builder engine based at least in part on the third query;

determine an additional animation sequence for morphing the animated widget from the second visual organization of the queried second set of data to a third visual organization of the queried third set of data based at least in part on the third set of data; and morph the animated widget from the second visual organization to the third visual organization according to the determined additional animation sequence.

20. The non-transitory computer-readable medium of claim 18, wherein the instructions are further executable by the processor to:

parse a first set of key-value properties in a first configuration file to identify the first query; and parse a second set of key-value properties in a second configuration file to identify the second query.

* * * * *